US012251827B2

(12) United States Patent
Reese

(10) Patent No.: US 12,251,827 B2
(45) Date of Patent: Mar. 18, 2025

(54) EXOSKELETON AND MASTER

(71) Applicant: Marcel Reese, Bielefeld (DE)

(72) Inventor: Marcel Reese, Bielefeld (DE)

( * ) Notice: Subject to any disclaimer, the term of this patent is extended or adjusted under 35 U.S.C. 154(b) by 0 days.

(21) Appl. No.: 17/708,010

(22) Filed: Mar. 30, 2022

(65) Prior Publication Data

US 2022/0219314 A1 Jul. 14, 2022

Related U.S. Application Data

(63) Continuation of application No. 16/313,177, filed as application No. PCT/EP2017/000744 on Jun. 27, 2017, now abandoned.

(30) Foreign Application Priority Data

Jun. 27, 2016 (DE) ...................... 10 2016 007 741.7

(51) Int. Cl.
*B25J 9/00* (2006.01)
*A61H 1/02* (2006.01)
(Continued)

(52) U.S. Cl.
CPC .......... *B25J 9/0006* (2013.01); *A61H 1/0237* (2013.01); *A61H 1/0262* (2013.01);
(Continued)

(58) Field of Classification Search
CPC ...... B25J 9/0006; B25J 9/0048; B25J 9/0057; B25J 9/0069; B25J 9/104; B25J 17/00;
(Continued)

(56) References Cited

U.S. PATENT DOCUMENTS 11,135,119 B2 * 10/2021 Sulzer .................. A61H 1/0266
2003/0115954 A1 * 6/2003 Zemlyakov .......... A63B 21/155
73/379.01
(Continued)

FOREIGN PATENT DOCUMENTS

DE   102010023914   9/2011
DE   102014009028   12/2015
(Continued)

OTHER PUBLICATIONS

Yang et al, "Design of an anthropomorphic lower extremity exoskeleton with compatible joints" 2014 IEEE International Conference on Robotics and Biomimetics (ROBIO 2014), Dec. 5, 2014 IEEE, 1374-1379.
(Continued)

*Primary Examiner* — Zakaria Elahmadi
(74) *Attorney, Agent, or Firm* — JMB DAVIS BEN-DAVID

(57) ABSTRACT

The invention relates to the improvement of exoskeletons and masters thereof and to their use in teleoperative applications in virtual worlds or the real world. Non-actuated exoskeletons can be used to transfer loads from the user, for example, heavy luggage, tools or also the body weight of the user, to the ground and to relieve the joint and muscle system of the user. This can increase the endurance and also effective strength of the user. Motor-driven, actuated exoskeletons can be used in different fields. They can be worn as a freely moveable robotic suit which comprises a built-in energy supply and electronic control. They can also be used to improve the force and endurance of a user whilst the user moves in an unlimited environment. Another use of the fixed exoskeleton is in the field of interaction with virtual worlds or for controlling real robots. In this instance, an exoskeleton can be used to establish a teleoperative connection between the user and the master (virtual avatar or real robot). The (Continued)

user users the exoskeleton to directly transfer control commands to the master. The elements of the user and the master then practically carry out the same movements synchronously. The aim of the invention is to improve exoskeletons and masters of the mentioned type and the associated control units. This can, in particular, be achieved by a favorable realization of rotational axes which define rotational movements of different elements which to a large extent perform a hip movement.

20 Claims, 31 Drawing Sheets

(51) Int. Cl.
  *A61H 3/00* (2006.01)
  *B25J 9/10* (2006.01)
  *B25J 17/00* (2006.01)

(52) U.S. Cl.
  CPC .............. *A61H 3/00* (2013.01); *B25J 9/0048* (2013.01); *B25J 9/0057* (2013.01); *B25J 9/0069* (2013.01); *B25J 9/104* (2013.01); *B25J 17/00* (2013.01); *A61H 2003/007* (2013.01); *A61H 2201/1623* (2013.01); *A61H 2201/163* (2013.01); *A61H 2201/1645* (2013.01); *A61H 2201/165* (2013.01); *A61H 2201/1652* (2013.01); *A61H 2201/1659* (2013.01)

(58) Field of Classification Search
  CPC .. A61H 1/0237; A61H 3/00; A61H 2003/007; A61H 2201/1623; A61H 2201/163; A61H 2201/1645; A61H 2201/165; A61H 2201/1652; A61H 2201/1659
  See application file for complete search history.

(56) References Cited

U.S. PATENT DOCUMENTS

| | | | |
|---|---|---|---|
| 2008/0249438 A1* | 10/2008 | Agrawal | A61H 1/0237 602/23 |
| 2008/0255488 A1* | 10/2008 | Agrawal | A63B 69/0064 623/24 |
| 2011/0167945 A1 | 7/2011 | Yang | |
| 2012/0046578 A1* | 2/2012 | Agrawal | A61H 1/024 601/35 |
| 2016/0206497 A1* | 7/2016 | Deshpande | A61F 2/78 |
| 2017/0156963 A1* | 6/2017 | Tuttemann | A61F 2/64 |
| 2019/0201273 A1* | 7/2019 | Soltani-Zarrin | B25J 9/0006 |
| 2019/0321965 A1* | 10/2019 | Van Engelhoven | B25J 9/104 |
| 2020/0163787 A1* | 5/2020 | Goldfarb | A61F 5/013 |
| 2020/0353308 A1* | 11/2020 | Kim | A61H 1/0229 |

FOREIGN PATENT DOCUMENTS

| | | |
|---|---|---|
| JP | 2009178253 | 8/2009 |
| JP | 2014061113 | 4/2014 |
| WO | 2013186705 | 12/2013 |
| WO | 2013189693 | 12/2013 |
| WO | 2015002850 | 1/2015 |

OTHER PUBLICATIONS

Beil et al, "New mechanism for a 3 DOF exoskeleton hip joint with five revolute and two prismatic joints" 2016 6th IEEE International Conference on Biomedical Robotics and Biomechatronics (BioRob), 20160626 IEEE, 787-792.

* cited by examiner

EXOSKELETON AND MASTER

CROSS-REFERENCE TO RELATED APPLICATIONS

This is a Continuation of U.S. patent application Ser. No. 16/313,177 filed on Dec. 26, 2018, which is the U.S. National Stage of International Patent Application No. PCT/EP2017/000744 filed Jun. 27, 2017, which was published in German under PCT Article 21(2), and which in turn claims the benefit of German Patent Application No. 10 2016 007 741.7 filed Jun. 27, 2016.

FIELD

The present invention relates to the improvement of exoskeletons and of proxies as well as their utilization in teleoperational applications in virtual worlds or the real world.

BACKGROUND

Exoskeletons form a robotic suit which can be fashioned in an anthropomorphic or non-anthropomorphic way. An anthropomorphic mechanism is very similar in its making to the geometry and kinematics of its wearer. Ideally is forms a kind of "second skin" so that each point of the mechanism has a constant relative transformation to a fixed reference point of the user body. The exoskeleton of insects comes very close this ideal. Anthropomorphic exoskeletons can be mounted firmly to the human body at many point or at large areas, without significantly decreasing the range of motion of the user or that forces and tensions between the exoskeleton and the user are present. This allows for example the mounting of body armor or of haptic and tactile input- and output units respectively at the body of the user, the exoskeleton or both. Non-anthropomorphic exoskeletons are generally only mounted to a few points of the user body, for example at the hip and the feet or at the back and the hands. Here the mechanism is fashioned in a way that it follows the movements of the hands or feed and at no time in its workspace touches, with its leg- or arm-mechanism, the body of the user at any other than the mounting points. However, the non-anthropomorphic mechanism as a whole can perform very different movements than the user and can have more or less degrees of freedom than the sum of the degrees of freedom of the moving body parts of the user connected to the mechanism.

Non-actuated exoskeletons can be used to transfer loads which act on the user, e.g. by heavy luggage, tools or also the body weight of the user, onto the ground and thereby relieve the joint and muscular system of the user. By this the endurance of the user and also his effective strength can be increased.

Motor driven, actuated exoskeletons find application in various areas. They can be worn as a freely moving, robotic suit which possess an inbuilt energy supply and electronic control. They can also be used to improve the strength and endurance of the user while he moves untether in his environment. Applications lie in the support of heavy physical work like ship construction, increase of the physical power and the protection (armament) of soldiers, the rehabilitations of sick or the utilization as walking aid for physically impaired persons.

Force- and torque sensors at the joint of the exoskeletons, at contact point between the user and exoskeleton or sensors for the measurement of myoelectrical signals on the skin or implanted in the user can be used to control the motions sequence of the exoskeleton. Especially in the application as a "walking wheelchair" the input of control signals can also be made via a joystick, facial or gaze recognition or through similar manual, acoustic or visual input means. Stationary exoskeletons are used, among other things, for rehabilitation. They allow that the user can be guided though an exactly predetermined motion sequence and, if necessary, to apply forces. In this manner muscles as well as nerves can be stimulated and the mobility of the user can be improved with lasting effect.

Another application of stationary exoskeletons lies in the area of the interaction with virtual worlds or the control of real robots. Here, an exoskeleton can be used to create a tele-operative connection between the user and the proxy (virtual avatar or real robot). Thereby the user uses the exoskeleton to transfer direct control commands to the proxy. Then, the limbs of the user and of the proxy simultaneously execute almost identical motion sequences. At the same time force feedback also can be provided so that the user can also experience the forces which act of the side of the proxy and the forces of the user on his exoskeleton can be applied at the proxy. Here, anthropomorphic exoskeletons have the advantage over non-anthropomorphic ones that really every body part of the user can be used for the haptic interaction (for example not only a hand but also a lower arm or upper arm) and at the same time devices for the relaying of tactile or heat stimuli can be mounted to the user as well as to the exoskeleton.

Especially when the legs of the user are supposed to be used to directly control the legs of a proxy, if applicable with force feedback, and the user in this fashion also has to or can directly control the balance of the proxy, the user in the exoskeleton is mounted to a motion base (DE 10 2010 023 914 A1, "Verfahren and Vorrichtung zur Steuerung eines Statthalters"). Then, the user does not stand on a solid floor anymore but the feet of the exoskeleton display to the user, while walking and running, the properties of the virtual or remote real floor while the user in the exoskeleton is being suspended over the actual floor by the motion base. Then, constant and time depended linear and rotatory acceleration are displayed to the user in the exoskeleton by the motion base. As he will generally use stereoscopic goggles or other suitable means to perceive a realistic visual impression of the virtual or real environment of the proxy, and these impressions are supplemented by the corresponding haptic and if applicable tactile sensations, he has the impression to be act in the place of the proxy in a virtual or remote real environment. Should the user control the proxy in such a way that it does not walk or run, but should instead climbs, robs, craws, or walk on its hands, etc., naturally the floor is not only displayed via the feet but also via other body parts or areas of the exoskeleton. Notably—but not exclusively—this can be the lower legs, knee, upper legs, hands, lower arms, upper arms, head or the back.

In such an application the load bearing capacity of the exoskeleton is of outstanding importance. It has to carry the weight of the user without notably deforming or changing its joint and actuator states significantly. Furthermore, it also has to additionally display great dynamic forces, as they can occur during running or jumping, precisely with smallest reaction times and delays as well as smallest oscillations and actuator deflection. Furthermore, it is desirable that the actuators of the exoskeleton can give in when the forces that the user exerts on them are so strong that the mechanism or the control are not fast or strong enough to provide an appropriate resistance. This back-drivability guarantees that neither the user nor the exoskeleton take harm and that also the control over the system does not need to get lost when overly large or quickly arising forces act. For mechanical systems like gears, set-up gearboxes, set-down gearboxes, etc., to be back-drivable they must possess a large mechanical degree of efficiency, which means low internal friction and low internal energy losses.

A large degree of efficiency of course in generally useful as thereby the requirement on the actuators, motors, gears and energy supply can be reduced to achieve a desired requirement like power, force, or velocity. It also simplifies the modelling and thus the control of robotic systems and especially of systems with force-feedback, as the internal losses and acting forces are easier to quantify. Especially for mobile exoskeletons, which are worn by the user and possess a suitable energy supply and control units, the degree of efficient also affects the operation time, the weight and the volume of the exoskeleton and the necessary energy supply and energy storage.

Generally, it is advantageous when the actuators of exoskeletons use as little space as possible and make optimal use of the available space. For mobile exoskeletons it is of interest to carry as much payload as possible. Bigger actuations reduce the available volume for that. Of great interest for applications for teleoperations are especially exoskeletons which offer a maximum of mobility (in the sense of the possible body poses) for the user and which actuate all or the most degrees of freedoms of the body, especially those of the hip. Also, mobile exoskeletons with which great payloads need to be carried have similar requirements as also here the degrees of freedoms need to be actuated which at lower requirements still can be driven exclusively by the body strength of the user alone. Such exoskeletons with many actuated degrees of freedom require more space as more and larger actuators are needed. Also, exoskeletons used for physical rehabilitation, as walking aid, or "walking wheelchair", which do not necessarily need to bear large forces, ideally actuate all degrees of freedom, as is allows for greater and more natural mobility. For all these applications it applies that a multitude of, if necessary, large actuators, motors and gears then can reduce the range of motion of the user as they can during extreme movement, like a lunge, a split, the crossing of the legs, sitting or a internal or external rotation of the foot, or the hip joint, themselves get in spacial conflict with the other elements of the exoskeleton, the payload, operational units, the environment or the user.

Here, a high degree of efficiency is helpful to reach the requirements on the exoskeleton and to save space. This is especially then difficult when gears need to be used to create the necessary large forces. Multistage reduction gears generally are not back-drivable, reduction gears with few stages are exposed to large or too large forces and need to be very large and heavy. Brushless electro motors can be extremely efficient and can possess large powers at small volume and dimensions. But they can only create relatively small torques. Brushless torque motors are also very efficient but require relatively much space because of their large diameter. They also have increased requirements on the voltage supply to create large torques without reduction means.

Known are serial, elastic actuators (serial, elastic actuators; "Series Elastic Actuators for legged robots" J. Pratt, Krupp, 2004; "Stiffness Isn't Everything", G. Pratt et al, 1995; U.S. Pat. No. 5,650,704, "ELASTIC ACTUATOR FOR PRECISE FORCE CONTROL", G. Pratt, M. Williamson). They find applications in humanoid robots and exoskeletons to directly drive joints or ropes (if applicable in Bowden cables) which then actuate axes via pulleys.

Actuators of this type are used as linear actuators to drive, via leavers, hinge joints, like those of the foot joint or the knee (M2 robot, MIT). Also known are application where the linear actuator forms a triangle with the to be actuated joint and where by changes of its length the angle of the joint is actuated (RoboKnee, Yobotics). In general, the problem arises that at such a mechanism the gear ration varies with the angle. This is why often compromises in the construction need to be accepted, like e.g. too large to too small gear ratios in some areas of motion need to be tolerated to be able achieve the necessary values in other areas of motion. This is why also too large and unnecessarily fast actuators and motors are used. Additionally, it is difficult to cover large angular ranges of actuation as for larger areas "dead point" can occur where no torque can be created and the direction of rotation for a given change of length is undetermined.

Additionally, it is not trivial to mount the actuator at the limbs of the robot or exoskeletons as this directly influences the aggregate properties of the system.

Especially in both of the robots M2 and M2V2 also a mechanism was used for which a serial, elastic actuator (also called SEA) drives a closed rope, or an equivalent setup, which is guided over two pulleys. One acts as an idler pulley while the other drives an axis and in this manner actuates a joint (M2:30http://www.ai.mit.edu/projects/labtours/LeggedRobots/LeggedRobots.ppt, page 17; M2 http://www.jont-se.com/portfolio/m2.html. FIG. 1; M2V2 http://robots.ihmc.us/humanoid-robots/). In comparison to its total length this setup only has a small linear range of motion. For a given pulley diameter of the driven axis this limits the available maximum angular range (difference of maximum to minimum angular position of the pulley, the axis, if applicable of the joint). Furthermore, the maximum torque at the driven axis is limited, for a given maximum angular range and thus the given pulley diameter. Larger pulleys create, for a given force of the SEA, a larger torque but then require larger linear positional ranges of the SEA for a given maximal angular range. In robots and exoskeletons the available space is limited. Because of that it is advantageous to be able to use a largest possible fraction of the available length, e.g. of the length of the thigh, as liner range of motion.

Different setups face this problem by not mounting the linear actuators at the joint, but for example at the back of the robot or exoskeleton (Walkagain Project, https://www.youtube.com/watch?v=TcAvtglo9Jg) and by using Bowden cables to drive the joints. Furthermore, several actuators are being connected in parallel to exert larger forces or actuators are being operated as antagonists to each other so that one creates pulling and the other one pushing while the joint in actuated with larger force together. Furthermore, systems are known where several motors, via toothed gears or toothed belts, together drive one ball screw of an actuator.

At a perfectly anthropomorphic exoskeleton the individual parts undergo the same transformations as the corresponding human body parts. For example, the knee joint can in good approximation be described as a hinge joint. With a fixed thigh and flexion or extension of the lower leg the lower leg then undergoes a pure rotation around a transversal axis which intersects the head of the femur perpendicularly to the sagittal plane. The biological axis itself moves (translation and rotation) only slightly during bending the lower leg. That means that for the connection of the upper and lower leg with an exoskeletons a simple mechanism is suitable for which the axis of is hinge joint coincides with the axis of the knee joint, for example in the pose of the fully stretched leg. In this case the upper part of this section of the exoskeleton can be mounted firmly to the upper leg and the other part firmly to the lower leg. Since the knee joint is also not a perfect hinge joint, tensions will still occur between the exoskeleton and body parts if the joint is moved far beyond its initial position. This effect can be easily compensated by suitable cushions so that the user is not suffering greater impediments or inconveniences when he moves his knee. The knee also has a limited range in which it can rotate around its vertical axis. This movement is suppressed with such a mechanism but this limits the function of the knee only to a small degree. Therefore, it is sufficient for almost all applications to understand the knee joint of the human as a mechanism with only one degree of freedom and to here design an exoskeleton accordingly. Still, like in the case of the "SERKA knee actuator", also polycentric joints can be actuated. Especially when the knee joint of the exoskeleton is to be actuated it is generally sufficient to only consider the main degree of freedom (flexion and extension) as it covers the largest part the workspace and as it provides the by far largest fraction of work during movement.

If the same assumption is made for the ankle joint, so that only flexion and extension of the exoskeleton are possible, this limitation is more significant. While the ankle joint can perform flexion and extension as a practically pure rotation around one axis it also possesses an significant degree of freedom of pronation and supination (as well as minor translations and rotations of the axes). The second degree of freedom is important to control the balance while standing and all modes of gait and to allow that the sole of the foot, and if applicable that of a worn shoe, independently of the tilt of the ground and of the body stance of the user, can always be flatty placed onto a slanted ground. Are pronation and supination suppressed, for example while carrying of stiff shoes for the sport of downhill skiing (which allow flexion and extension at least partially) the possibly of walking is significant restricted. This is why exoskeletons generally posses more than one degree of freedom for the ankle joint or an exoskeleton or this joint is completely avoided and only the upper leg is supported. In this case the exoskeleton ends at the lower legs and the foot of the user and the muscles of the lower limb have to create all the forces and movement without support (z.B. AirLegs, https://www.youtube.com/watch?v=U2e4tGokqeO). For actuated exoskeletons for the angle joint generally only one degree of freedom of flexion and extension of the foot are actuated (z.B. BLEEX, "On the Mechanical Design of the Berkeley Lower Extremity Exoskeleton (BLEEX}", Adam Zoss, H. Kazerooni, Andrew Chu). Especially for freely movable exoskeletons for the augmentation of the performance of the user this is sufficient as here, during locomotion, the largest forces and powers arise. This is why the user can already be supported very much by a single actuated joint of the foot while he controls the other degree of freedom through his own muscle activity. The actuation of the second degrees of freedom is hard as the actuators require space and can hamper the mobility of the user in the exoskeleton.

The hip joint of the human is in good approximation a ball joint. Thus, it possesses three mutually independent degrees of freedom of rotation around the center point of the head of the femur and no significant translational degrees of freedom. All these degrees of freedoms are important to allow for natural locomotion, to perform work, to maintain balance and to control the orientation of the feet in respect to the ground. For freely moving exoskeletons for augmentation of the performance of the user here generally only the flexion and extension of the thigh is actuated as this degree of freedom performs the most work. For exoskeletons which are used as walking aid partly also only this degree of freedom of the hip is actuated (Argo ReWalk Exoskelett, lndego Exoskelett, NASA X1). But then a paralyzed user then additionally needs to use crutches or alike to control the balance or to influence the direction. For exoskeletons which are used as "walking wheelchair" and which require no crutches at least also the abduction and adduction are actuated (REX exoskeleton). Here the control happens for example by means of a joystick. For existing exoskeletons of this kind, the motion sequences are notably slow what may be attributed to the used motors and gears and that the user may not be exposed to too large forces so that his body can follow the given motion sequence of the exoskeleton.

At present the hip joint us not being actuated corresponding its inherent degrees of freedom. Instead, non-anthropomorphic mechanisms are being used which display significantly different transformation properties than those of the three independent rotary degrees of freedom the hip joint. So, for example, only two axes are being used of which one is generally parallel to the transversal axis and which is designed in a way that it runs at least in the proximity or also through the center point of the head of the femur (BLEEX). Since most of the work is done along this axis during walking and running, flexion and extension, this is also the axis that is preferably actuated in mobile, actuated exoskeletons.

The other preferred axis lies parallel to the sagittal axis. Here it is not necessarily observed that it is actually running through the center point of the head of the femur (POWERLOADER PLL-01, https://www.youtube.com/watch?v=vdhUpR-dzgk; FORTIS by Lockheed Martin http://robrady.com/design-project/lockheed-martin-fortis-human-poweredexoskeleton; "Design of a Walking Assistance Lower Limb Exoskeleton for Paraplegic Patients and Hardware Validation Using Cop", Jung-Hoon Kim et al., http://cdn.intechopen.com/pdfs-wm/42836.pdf), while this may not be an ideal choice for an anthropomorphic mechanism. As often a third hip axis is forgone (XOS 2 of Ratheon Sarcos), and instead the "thigh" or "lower leg" of the exoskeleton are design in a way that they can also allow a rotation around the vertical axis and thus allow that the foot can rotate correspondingly, in general a non-anthropomorphic mechanism is present. Because of that, during the motion of the leg, it comes to significant displacements between the body of the user and main parts of the exoskeleton. These displacement are being allowed by corresponding compliant mechanisms, additional non actuated joints, cushions, etc., at the mounting location between exoskeleton and user ("Exoskeleton for Walking Assistance", Qingcong Wu et al). Therefore, it is not possible to cover the whole workspace of a human with such mechanisms and they focus on main motions like walking, running and sitting. Here only a small part of the possible workspace of a human is required and therefore the possible workspace of individual joints is only being used to a limited extend.

SUMMARY

It is the purpose of the present invention to improve exoskeletons and proxies, such as robots and virtual avatars, as well as associated control units in such a way that they can be used to make extensive movements, give a realistic impression and can also be operated quickly and effectively.

This problem is solved by the device according to independent claim 1. By the sub claims further improvements are claimed according to the invention.

The foregoing and other objects, features, and advantages will become more apparent from the following detailed description, which proceeds with reference to the accompanying figures.

BRIEF DESCRIPTION OF THE DRAWINGS

Further details and advantages of the present invention are explained in the following by means of preferred embodiments with corresponding figures. These show.

DETAILED DESCRIPTION

Figure 1:
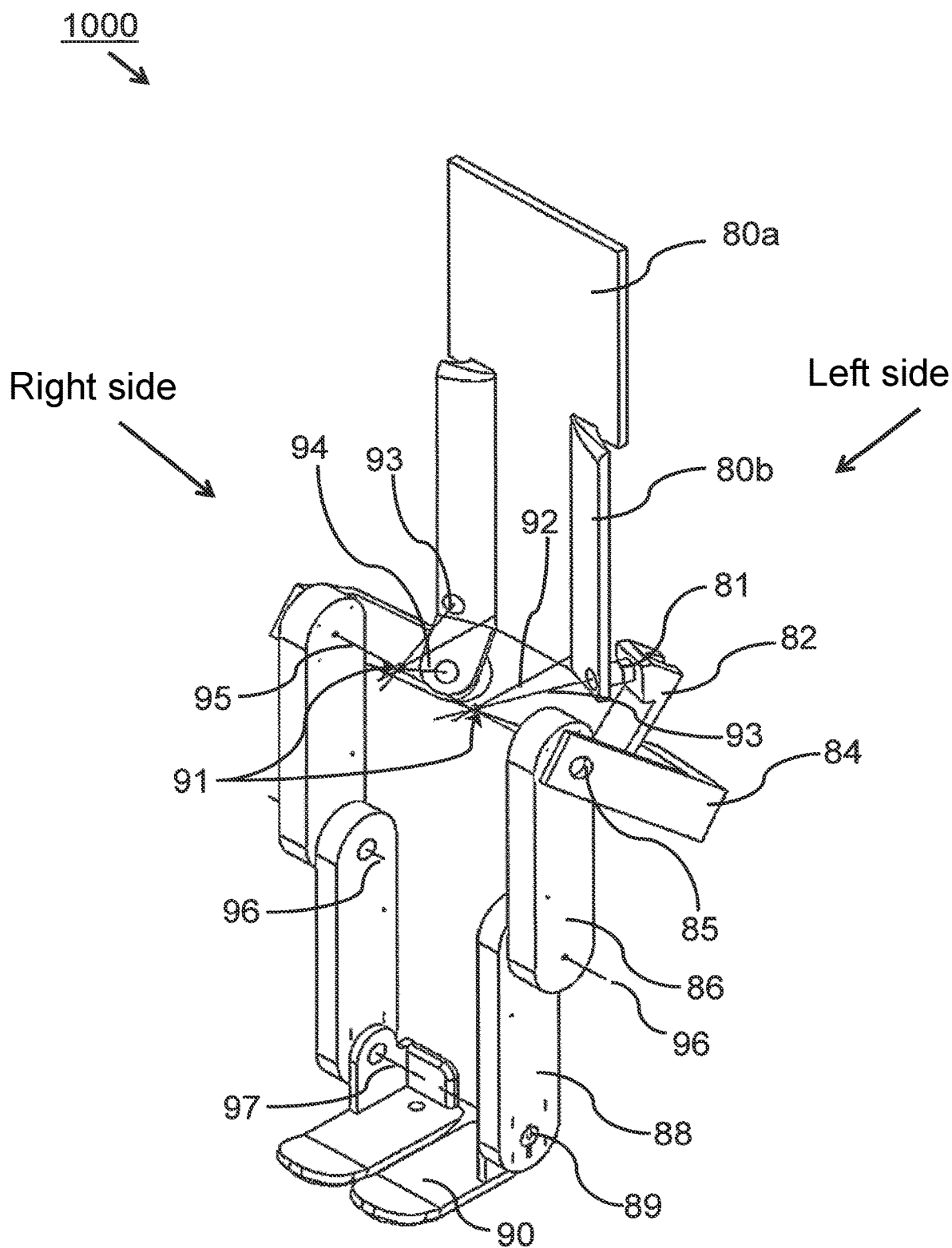
FIG. 1 shows a perspective representation of an exoskeleton 1000

The device described in claim 1 concerns in particular exoskeletons as well as proxies, like robots or virtual avatars, as well as motion simulators and other otherwise suitable virtual or real machines. With the devices of the mentioned kind various motions and motion sequences are to be recorded and/or to be executed. This is why we note that the present invention is mainly described on the basis of an exoskeleton. However, it is by no means limited to this but includes all the devices mentioned.

The device according to claim 1 comprises, beside other means, four elements whereby neighboring of these elements are each mounted in a rotatable fashion about corresponding axes. For this, between neighboring elements, rotary joints are provided which can be fashioned in various ways like for example as a shaft or the like. Hereby it is material that the mentioned three axes in general run through a common point. Preferentially this point lies in the center of the respective—i.e. the right or the left—hip joint.

The first rotary axis and the second rotary axis form a first angle $\varphi_1$ and the second rotatory axis and the third rotary axis form a second angle $\varphi_2$.

This invention has the advantage that is allows to design exoskeletons with complex degrees of freedom, like the hip joint, as anthropomorphic as possible and to permit that all degrees of freedom can be actuated in the whole range of motion of the user with greatest forces, increased efficiency, low space requirements and weight, high actuation speeds, increased power, with back drivability, low backlash and short reaction times.

By this, in particular, it becomes possible that an exoskeleton for the legs is able to carry the body weight of the user while he wears it like a robotic suit and the exoskeleton itself can be carried and moved by a motion base. Now, at the same time, the mechanism can now appear so stiff that is can display to the user a hart floor and fast movements realistically without that the use in the exoskeleton actually would be standing on a hard floor. In the same way the performance of mobile exoskeletons and humanoid robots is increased as also degrees of freedoms can be actuated which so for could not be actuated or which were not actuated because of various considerations. The requirements on the energy supply are reduced and/or the range and time of operation is increased. For stationary exoskeletons for physical rehabilitation in this way the trainable range of motion can be increased and the efficacy of a treatment can be increased or other treatments than performed so far can be facilitated. By the new geometry of the exoskeletal hip joint and also by its new mode of driving, an improved flexibility of actuated exoskeletons of the legs in accomplished. By the possibility of localizing the motors in the proximity of the joints means of force- and power-transmission are saved and the mechanism is simplified, compared to e.g. hydraulic-, cable- or Bowden cable transmission. The hip mechanism can be designed to be comparatively space-saving and does not limit the available payload of mobile exoskeletons. The largely anthropomorphic behavior of the exoskeleton allows stable mounting to the user over large parts of its body and thus simplifies the generation of haptic feedback and the utilization of tactile in- and output units. Likewise, the utilization of a housing, an armor, or tactile and thermal in- and output units is facilitated, even for simultaneous actuation of all joints, which can surround the body of the user as well as the exoskeleton or can be part of the exoskeleton.

The first elements, which is also called exo back plate or (exo-) hip plate, preferably is a plate-like element. By it, for the normal operation, a user is mounted firmly relative to its hip bone. While parts of the exo back plate or the exo hip plate can be designed in an angled or arched fashion it possesses a principal plane. For one implementation of the device according to the invention the first of the named axes is perpendicular or generally perpendicular on the named principal plane and therefore is generally parallel to the sagittal plane of the user.

It is also possible that the first axis is not perpendicular to the principal plane of the first element (exo back plate) but deviating thereof, while it is in general still running through the before mentioned common point. This deviation can be described as follows. In the standard pose the principal plane of the exo back plate runs from top to bottom (or the other way around) vertical or in general vertical. Starting from here a vertical axis can be define which on one site is in general vertical and parallel to this principle pale and on the other side runs through the common point. For this realization of the device according to the invention the first axis is rotated by a third angle α around the named vertical axis while this angle consequentially lies generally in the horizontal plain. Thereby a greater rotation of the feet towards inside or outside (with a negative angle α) is made possible.

It is furthermore possible that the first axis is rotated by a fourth angle β around a horizontal axis. This rotary axis in general runs perpendicular to the mentioned vertical axis, parallel to the principal plane of the exo back plate and also through the common point. The associated advantages of this realization are mentioned in the context of the description of preferred embodiment examples.

For one preferred embodiment of the invention the first angle $\varphi_1$ has a value which in in the range of 25-45 degrees. A value of about 35 degrees has proved particularly successful.

It has also been proven that the second angle $\varphi_2$ has a value in the range of 60-80 degrees. A value of about 70 degrees has proved particularly successful.

Devices with a combination of the angle $\varphi_1$ and $\varphi_2$ in the ranges as described in the previous two paragraphs give exoskeletons which posses a large workspace which allow for generally large stride lengths, a large extra rotation of the foot and generally a large mobility. These exoskeletons are especially suited for the control of humanoid robots and virtual avatars by tele-operation.

Should special attention be given to easy sitting in the real word exoskeletons are suited for which the sum of the first angle ($\varphi_1$) and the second angle ($\varphi_2$) are between 85-120 degrees and the thirst angle ($\varphi_1$) has a value in the range of 15-45 degrees.

For the third angle α and/or for the fourth angle β values between 10 and 30 degrees and preferably about 20 degrees have proved to be particularly successful.

Further claims concern a fifth element that in relation to an exoskeleton, a proxy or alike can also be called a foot. This foot is characterized thereby that its standing surface, on which the user stands (also called the sole) has a certain profile. This profile is characterized by two circular segments with different radii of circles. Preferably these have their centers close to the ankle joint of the user. It is also preferred that these circles are parallel to the frontal plane of the user. Furthermore, it is preferred that it allows agile motions while it only possess a single axis. It be mentioned that the term circle, here and also in the context of the description of preferred embodiments, also includes circle-like geometries, like ellipses or similar. This makes it possible for it to allow agile movements even though it has only one axis. It should be noted that the term circle here and also in connection with the description of preferred execution examples also includes circle-like geometries, as well as ellipses or the like.

The foot as according to the invention can be used together with the previously described device according to the invention or independently thereof. This also applies to all the execution examples described below as part of the description of preferred execution examples.

Exoskeletons or proxies, like humanoid robots require two degrees of freedom of the foot to get close to the mobility of the human. The actuation of both degrees of freedom requires suitable means which demand space and weight. The stronger and more powerful the exoskeleton is to be, the heavier these actuators generally become and require more space.

By the choice of special sole shape for the feet of mobile exoskeletons the requirements on the actuation of the joint of the exoskeleton are reduced and only one axis is actuated, whereby other movement are suppressed and yet a large mobility of the user with exoskeleton is guaranteed. As now no degrees of freedom of the foot are used to directly drive the foot of the exoskeleton by human force the capacity of the user in the exoskeleton is increased and greater forces and power can be transmitted without the user being at risk to be harmed by too large forces or not be able to provide the necessary forces and therefore lose the control over the motion sequence.

Further claims concern the area of gravity compensation. As in tele operative applications the exoskeleton of the legs, which is mounted at a hip or back element to a motion simulator, must be able to carry the weight of the user. When standing, for example, he then has the feeling that his entire body weight is acting on the soles of his feet.

However, it is desirable that the user can also get the impression that his body weight is reduced. This would be the case, for example, if he were to control a real humanoid robot which would operate in an environment with reduced gravity, such as free fall, weightlessness, a stable orbit around a planet, in accelerated inertial systems or under water, i.e. under the influence of buoyancy.

Furthermore, such corresponding situations of reduced gravity appear in virtual worlds and a user may want to control an avatar therein correspondingly. In extreme cases, the user should be able to experience weightlessness, so that he can control the floating proxy without exerting force on his legs. Furthermore, it may be provided that the user, with small own body forces, can cause disproportionate forces with its proxy (real robot or virtual avatar). During this force amplification the user in the exoskeleton should be able too feel in a way as if he didn't have to carry his own body weight anymore. Additionally it is also desirable that the user can experience sustained, larger forces than those of his body weight. So can it be necessary that these larger forces act for a longer time, e.g. for conveying of increased gravity, e.g. fully on his soles of the feet. However, the user is usually actually in the gravity field of the earth, and he must be prevented from actually changing his position by the forces of the exo legs.

Teleoperation methods can in general also scale forces and torques. To reduce the requirement on the exoskeleton it can be desirable that always reduced forces, especially on the legs, are conveyed to the user, and that the exoskeleton is not required to be able to carry the whole weight of the user. This allows the utilization of lighter, less tiff, weaker and smaller exoskeletons and faster movements.

So far, the total or partial reduction of weight was accomplished by submersing the user in the exoskeleton in a liquid. Alternatively, the user weirs a liquid-filled suit with which he is mounted to the exoskeleton or which is part of the exoskeleton.

The aim of this embodiment according to the invention is therefore to enable the user in the exoskeleton to have the impression of completely or partially lifted weight without having to be in a liquid and/or to lower the requirements for exoskeletons. A further objective is to allow for increased, sustained forces on the user.

This is accomplished by suitable means like belts (like six- or five-point belts, climbing harness, etc.), straps, shells or harnesses that firmly connect the torso, the hip and/or the this of the user with the hip plate and/or the back plate of the exoskeleton without limiting the mobility of his legs considerably. Especially suited for that are belts or shells which engage between the legs and high up around the hip. (Alternatively, the weight of the user can also be carried at the thighs, while the conveyed impression suffers by that.) Preferably this carrying means is construed in a way that it can carry the whole weight of the user in every arbitrary load bearing direction without the user considerably shifting in respect to the hip plate and/or the back plate. The carrying mechanism in principle can be designed as for the Exobionics or Indego exoskeletons.

Then a standing user in the exoskeleton, which is mounted to the motion base, can e.g. retract the legs and lift both from the ground while his torso, held by the exoskeleton and the carrying mechanism, maintains position. Conversely it then is also possible that the user can completely extend his legs and occupy a position which corresponds to standing but he nevertheless does not need to carry his body weight with his legs and it also does not or only in a very limited fashion act on the soles of his feet.

Optionally it is allowed for that the sole of the foot of the exoskeleton can be translated and actuated in the direction of its normal. By this it becomes possible to adapt the length of the exo legs exactly to the effective length of the user legs and to correct for possibly occurring small errors or changes in the position of the user relative to the hip plate and/or back plate. It is advantageous if this actuation can happen quickly and forces and torques on the plate or distances to the foot can be measured and controlled. It is important to distribute the weight of the user as evenly as possible, with small pressure and large contact area, on his torso (or alternatively on his thighs). In this way it is avoided that they become too apparent and the impression of (partial) weightlessness is improved.

In general, it is important that the weight of the user can act in every direction and is absorbed fully by the carrying apparatus. This way the user can be held e.g. heads down and yet maintain a fixed position in respect to the hip plate and/or back plate. Yet, depending on the application the carrying apparatus can be designed in a way that it only acts in the relevant directions.

It is possible to combine this new way of reducing of gravity with previous methods utilizing buoyancy in liquids.

If the carrying apparatus is designed in a way that the user cannot be pushed upwards out of the hip plate or back plate sustained forces can also act on the feet of the user which exceed his body weight. Thereby an increased gravity can be simulated.

The carrying apparatus can itself also be designed in a way that it can be relaxed or moved and thereby the degree of relief can be changed. For that the carrying apparatus, preferably on its mounting points, possesses control members, like for example adjustable spring elements (also air springs or alike) and/or suitable scale elements.

The device according to the invention for gravity compensation can be used together with the previously described devices according to the invention or independently thereof. This also holds for all embodiment that are explained further below in the context of the description of preferred embodiments.

Further claims concern a device with a motor which during operation translatorically moves, via a spindle, a means with threads. This is connected to a rotating element, such as a chain or the like, which then rotatorily moves a shaft. This drive device is particularly suitable for the devices according to the invention according to the other claims, but is not limited in any case to such use.

The drive device mentioned, which is also called actuator in the following, has the following characteristics and advantages.

The requirements for power density, weight, torque, mechanical hysteresis, stiffness, speed, efficiency and positioning accuracy for humanoid exoskeletons are enormous when the goal is to noticeably increase the wearer's performance in mobile exoskeletons, to increase his strength, and especially when a stationary exoskeleton is used as a teleoperation unit for the legs. In the latter case, torques of easily well over 100 Nm occur at almost all joints of the leg even during simple movements. These torques act partly on the actuators, in their driving directions, but also orthogonally thereto, in the latter case loading the bearings and load-bearing structures. When running or jumping, these torques are even higher by a multiple and the latency times for stable control are also reduced, making fast and precise controllability of the actuators at high performance even more important. The back drivability of the actuators is also important here, since forces can occur briefly in the extreme range, which can exceed the capabilities of the actuators. The harder the remote real or simulated environment, the less elastic the actuators and other structure of the exoskeleton may be. This is especially true if the poses of proxies (virtual avatar or real robot) should always differ only slightly.

Strong humanoid robots have similar requirements, which increase the faster they are supposed to move, and especially when they are used as slave units for teleoperations.

Also applications using serial elastic actuators (SEA), such as various mobile exoskeletons and humanoid robots, require high actuation forces and large rotation angles of joints. Here the actuators are designed "soft" and between end effector and motor there is at least one spring element (torsion spring, leaf spring, coil tension spring, coil compression spring, etc.), which allows to absorb fast shocks and can be tensioned by the motor in such a way that a desired driving force is achieved.

The drive device according to the invention concerns a new actuator type for exoskeletons, robots or the like. Motor and spindle are connected via suitable bearings or clamps to a base (base plate, chassis, frame or housing; one part or more) in such a way that they cannot be displaced against each other in the event of external forces and motor and spindle can rotate freely around their driving axes. The motor is mounted in such a way, directly or indirectly, that it can carry out work on the spindle. The base is connected to a first element of the exoskeleton (e.g. thigh) or forms a unit with it. The spindle drives a suitable ball-bearing mounted nut (also called nut) during its rotation, which is connected to the base in such a way that it cannot rotate around its longitudinal axis when the ball screw is rotated. This mounting of the nut can be achieved by linear rails, linear bearings, roller bearings with rail guide, etc. Preferred is the guidance by a linear carriage/linear slide with recirculating ball bearing and "right-angled" guide rail. This allows only one degree of freedom and allows the absorption of torques along all axes. When the ball screw is rotated by the motor, the nut and the carriage attached to it then perform a linear movement. This is now used to connect a flexible element (there) running parallel to the spindle, such as chain, belt, belt, rope, etc., to the spindle. (hereinafter referred to simply as "chain"). The chain is attached directly or indirectly to the nut or carriage by suitable means. Carriage, nut and fastener can form one unit. The chain is preferably designed to be open in such a way that it is attached directly or indirectly to both ends of the nut, or closed in such a way that it is attached to the nut without itself having an end or a beginning. If a rope is used instead of a chain, it is preferably also anchored to the driven wheel and can also be guided more than once completely around the drive wheel to avoid slippage. Then also e.g. two ropes, one for each drive direction, can be used. The chain drives a drive wheel, which in turn is rigidly connected to a drive shaft. The chain and the drive wheel are connected to each other, like chain and sprocket, so that no slippage occurs between these parts even under high forces. The drive axle is mounted so that it can rotate freely around its longitudinal axis, but withstands all other forces and cannot move relative to the base or bearing. The chain is additionally at least guided around one diverting element—i.e. a suitable diverting device, such as a sprocket with bearings, sliding bearings, circulating rollers, etc.—and from there back to the chain wheel of the drive axle, so that the chain follows a closed path. In addition, it should be mentioned that the chain wheel and the drive axle can also be designed as a single part.

The free-running element (diverter wheel) is mounted to the base, preferably by means of a ball-bearing-mounted axle, so that the chain is always under tension, if necessary with the assistance of one or more further tensioning elements, and can always move freely and with little play along its running path when driven by the ball screw or the drive axle. The drive axle or the driven sprockets/rope pulleys etc. are designed in such a way that another, second element of the exoskeleton (e.g. lower leg) is rigidly attached to them. As a result of the rotation of the drive axle or the driven chain wheels etc., the angle between the first element (e.g. thigh) and the second element (e.g. lower leg) is changed.

In order to transmit maximum power and torque at high efficiency it is necessary to load the ball bearing nut on the recirculating ball screw mainly axially, i.e. to minimize the transverse torque on the nut. This is possible when using a single chain by guiding it as close as possible to the ball screw and parallel to it. Although this does not achieve a perfect axial load, acceptable losses can still be achieved. However, the bearings required for the ball screw increase the minimum chain spacing for short ball screws if the spindle is approximately as long or shorter than the straight chain section. However, if the spindle is significantly longer than the length of the chain arrangement, there is no possibility that the spindle bearings will collide with the chain or sprockets. Then a single chain can be guided very closely to the ball screw, thus keeping the torque on the nut low.

However, in order to achieve a perfect axial load on the nut and the rotating spindle, the load must be applied evenly on different sides of the nut. The preferred arrangement (FIG. 27-31) therefore has two chain wheels of the same diameter on the drive shaft, which are also guided around two diverting devices. The ball screw and the chains attached to it then lie, in a part of the travel range of the nut, in a common plane. The nut is guided between the chains and is connected directly or indirectly to the chains, as with a connecting block (118) or on the linear bearings (120).

It is not always desirable to allow the load to act axially on the nut, as the necessary components require additional space on several sides of the nut. It is possible that the load acts mainly unilaterally on the nut if it is prevented that the nut can rotate transversely under the effect of transverse torque to the ball screw, i.e. the axis of the nut and the spindle are no longer parallel to each other and/or the spindle is bent. For this purpose, the nut can be connected to a suitable linear guide, which preferably absorbs all transverse torques and, if necessary, has them act on the base or other components. The chain is then driven unilaterally by the nut, the linear carriage, a connecting block, a spring element, etc. If a spring element is used with the chain drive, it is preferably loaded parallel and coaxial to the chain. Depending on the actuated joint and application, the torques on a linear guide can still be extremely high and exceed the load capacity of individual, small linear carriages/bearings. This is especially true when alternating ball sizes or ball chains are used to ensure smooth running of the bearings. Therefore, it is advantageous to choose bearings, which have to absorb transversal torques, as long as possible, to use several bearings in succession and to suitably connect with each other the nut and the chain, and/or to allow several linear guides to run parallel in order to absorb the torques together. In the preferred design example, with two chains, however, this is not necessary, as only minimal transverse torques and only low axial torques act on the linear guide here. For many applications it is also possible to use a very simple linear guide which has the main task of preventing the nut from rotating around its axis. This can be done e.g. by simple linear guided round ball bearings which are directly or indirectly connected to the nut. This is especially true when the transverse torque on the nut is minimized by the use of chains on both sides. However, such a simple linear guide can also be achieved with only one side of the chain if a large diameter ball screw and/or an extra long nut, or several nuts in succession, is used. Then the transversal torque is mainly carried by the ball screw, not by the linear guide, without dramatically reducing its efficiency.

It is preferable that each linear guide is not free but supported. This means that it is connected not only at its ends to the base, frame, etc., but over its entire length or large parts of its length. In this way, the rigidity of the base, etc. is also used to absorb torques and free the nut from them.

Chains, especially link chains, possess highest efficiencies at high powers and forces and require little space. However, link chains generally have the characteristic that they never run perfectly "round", since the effective diameter of the sprocket changes slightly during the process of engaging and disengaging a chain link in the sprocket "chordal action". This "polygon effect" is smaller the larger a sprocket and the smaller the individual links are. Silent chains are designed in such a way that the effective diameter remains almost constant and the polygon effect is very low. With "Smart-Chains" (SmartChain B.V., Zoetermeer, Netherlands) the polygon effect is almost perfectly suppressed. The use of soft plastic sprockets or radially flexible sprockets with a spring design of the sprocket under the teeth can reduce the polygon effect. With ropes or belts, a polygon effect does not or hardly occur.

If several chains are used, it can be advantageous to mount the sprockets, which share a common axis, rotated relative to each other, so that there is a phase difference between their teeth. If, for example, two chains are used, one on each side of the ball screw, the phase difference can be half the sprocket pitch (180°). If two sprockets and chains are used on each side, two wheels on the same side may have a phase difference of 90° to each other. The two wheels on the other side then preferably have a phase difference of 180° to each of the wheels on the first side. If each wheel on one side is opposed by a corresponding wheel on the other side with 180° phase difference, the total axial load on the nut is averaged in the best possible time. The transversal torque on the nut, however, still has clear maxima and minima. This influence on the torque is minimized by using several pairs of gears, with 2 sprockets of the same phase to each other on the same axis, but with phase differences to the other pairs of sprockets. Examples for possible sprocket phases for systems with one-sided chain arrangements are given in the following Table 1, whereby the mentioned phases are only exemplary, because a multitude of further phase differences are possible. This is a table of different phases with 1, 2 and 3 chains which act on one side of the nut and/or linear guide. Therefore, the polygon effect is reduced. However, transverse torques act on the nut and/or the linear guide. Any of these phase configurations can be practicable for low forces, strong nut and/or strong linear guide. The chain or chains can be in the same plane as the ball screw (left or right thereof), but can also run above or below the ball screw. Thus chains can be omitted or phases can deviate without substantial losses need to be accepted. By analogy, Table 1 can also be used for 4 or more chains. The phases in the table are given as multiples of the pitch.

TABLE 1

| Number of chains | chains Chain denomination | | |
|---|---|---|---|
| | 3 | 2 | 1 |
| 1 | | | 0 |
| 2 | | 0 | 1/2 |
| 2 | | 1/2 | 0 |
| 3 | 2/3 | 0 | 1/2 |
| 3 | 0 | 1/3 | 0 |
| 3 | 1/3 | 2/3 | 1/3 |
| 3 | 1/3 | 0 | 2/3 |
| 3 | 0 | 2/3 | 0 |
| 3 | 2/3 | 1/3 | 2/3 |

Individual chains or special multi-strand chains with links offset from each other (e.g. U.S. Pat. No. 6,190,278 B1) can be used. The latter have the advantage of requiring less space and enabling a more uniform run.

In order to further reduce the influence of the polygon effect, the shaft distance between drive wheel and deflection wheel is preferably selected so that the free length of the driven chain section is always exactly a multiple of the chain pitch.

It is possible to further reduce transverse torques on the nut by running a chain on both sides of the nut at the same distance from the axis of the ball screw and with a common phase. Other pairs of chains of this type, but with an even phase difference to the other pairs, can be used to make the run more even, as the driving force is smoothed. In the following table 2 corresponding examples for two-sided chain arrangements are given. It contains all permutations of the phases for 2, 4 and 6 chains for which the transverse torque, the sum of the individual transverse torques of all chains, is minimized to the nut and/or linear guide. The more chains are used, the more dispensable becomes each individual chain and the exact choice of phases. Thus chains can be omitted or phases can deviate without substantial losses need to be endured. Table 2 can also be used analogously for 4 or more chains on each side.

TABLE 2

| Number of chains | Chains | | | | | |
|---|---|---|---|---|---|---|
| | Left | | | Right | | |
| | Chain denomination: | | | | | |
| | 3L | 2L | 1L | 1R | 2R | 3R |
| 2 | | | 0 | 0 | | |
| 4 | | 1/2 | 0 | 0 | 1/2 | |
| 4 | | 0 | 1/2 | 1/2 | 0 | |
| 6 | 2/3 | 1/3 | 0 | 0 | 1/3 | 2/3 |
| 6 | 0 | 2/3 | 1/3 | 1/3 | 2/3 | 0 |

TABLE 2-continued

| Number of chains | Chains | | | | | |
|---|---|---|---|---|---|---|
| | Left | | | Right | | |
| | Chain denomination: | | | | | |
| | 3L | 2L | 1L | 1R | 2R | 3R |
| 6 | 1/3 | 0 | 2/3 | 2/3 | 0 | 1/3 |
| 6 | 1/3 | 2/3 | 0 | 0 | 2/3 | 1/3 |
| 6 | 0 | 1/3 | 2/3 | 2/3 | 1/3 | 0 |
| 6 | 2/3 | 0 | 1/3 | 1/3 | 0 | 2/3 |

Although less phases are used by this mechanism with a given number of chains and sprockets, since two chains always have the same phase, a more uniform run can be achieved by reducing the transverse torque to the nut. The use of "phased chains" is preferable to the use of individual chains. They are preferably used in pairs for pairs of sprockets with a phase difference of half the link spacing. For this purpose, the sprockets must be arranged in pairs on the axles. Silent chains have advantages over roller chains. A phased chain then replaces several of the previously mentioned single chains.

The influence of transverse chain torques on the nut can be reduced by connecting the nut directly or indirectly to the carriage of a linear guide so that transverse torques are absorbed by this guide. The chain or chains can also be connected to the carriage of the linear guide itself. The nut can also be designed in such a way that it takes over the characteristics of the trolley and itself has rollers, bearings, wheels etc. which in turn run on a liner rail which absorbs the transverse torques. Each of these rails is generally also suitable for absorbing longitudinal torques of the nut, which is a prerequisite for the nut moving hysteresis-free along the ball screw during spindle rotation and not remaining in place.

In order to work as hysteresis-free as possible, the chains or other flexible elements must be pre-tensioned. For this purpose, the axle of the diverter sprockets is preferably mounted in such a way that it can be shifted along the direction of the recirculating ball screw. Alternatively, other free-running idler wheels can also be used, the position of which can be adjusted so that the preload can be regulated. Chains have the advantage, especially compared to ropes, that they require only little pre-tension to work with low hysteresis.

For achieving a large transmission ratio (small motor torques should become large torques of the driven axle), a large drive wheel diameter and a small pitch of the ball screw are required. For a given rotation angle of the driven axis to be covered, this leads to larger necessary distances over which the chain must be guided in a straight line. For large rotation angles and large transmission ratios, this leads to large necessary lengths of the ball screws and thus to a large actuator length. This can be particularly problematic when driving the third axis 95 of the exoskeleton (FIG. 1-26), which controls the flexion and extension of the thigh, as large torques and large rotation angles are required here.

The reduction ratio from ball screw to driven axis is (Pitch of the ball screw)/(Circumference of driven sprocket)=pitch/(2 pi r).

Thus, with a 150 mm diameter sprocket and a 5 mm pitch ball screw, a reduction ratio of approximately 1:94 can be achieved. For practically all possible pitches of the ball screw a simple back drivability of the mechanism is given.

Instead of a ball screw and a ball nut, other means such as an ACME screw etc. can be used. In this case, however, the back driveability can be lost and the efficiency can decrease.

Additionally, a low reduction gear can be connected between motor and spindle in order to improve the total reduction ratio without loss of back drivability in order to achieve higher torques on the driven axle. It is also possible not to use the driven axle directly to drive a robot joint, but to use it to drive another sprocket, which drives a chain gear, which ultimately actuates a joint. Similar can be achieved with belts, ropes, or gear wheels etc.

Also, the ball screw can be driven at both ends by two motors to increase power, acceleration and torque. The motors can also be connected in series on one side of the spindle by connecting their axes longitudinally. This is equivalent to a longer motor. The recirculating ball screw can also be designed so that it is driven from the inside by a motor, or the outside of a motor holds the guides of a ball screw. This has the advantage that the entire length of the spindle can be used as a motor and the overall structure is shorter.

The motors, or the motor, do not necessarily have to be mounted coaxially to the ball screw. Thus it is possible to use, between motor and ball screw, a Cardan shaft, a bevel gear, a hypoid gear, a toothed belt drive, or similar. In this way, the position of the motor in the housing can be influenced and the housing size can be reduced. The reduction ratio can also be further influenced in this way. In general, the torques and forces occurring directly at the motor are still the lowest, so that relatively simple and cost-effective means of reduction, power transmission and axis direction change are suitable here.

In general, it is preferable to fix the recirculating ball screw at its two ends with fixed bearings on the base. This increases the axial load capacity (buckling load) by a factor of 2 compared to a fixed bearing on one side and an "axially free" or "supported" bearing on the opposite side. This significantly increases maximum accelerations and speeds and resonance frequencies. Then there is no difference between operation in pulling direction or pushing direction. Also, forces are transferred more evenly to the base.

The drive device (actuator) according to the invention can be used together with the devices according to the invention described above or independently of them. This also applies to all the embodiments discussed below in the description of preferred embodiments.

Further claims relate to a motion simulator, in particular its rotation unit. They are preferably made up of at least three rotation elements, whereby neighbouring elements are rotatably connected to each other. The first rotary element is rotatably mounted on other devices, such as the means of a translation unit. At last, like e.g. third rotation-element, an exoskeleton or similar is mounted rotatably. This device according to the invention is based on the following findings.

Exoskeletons for teleoperation, i.e. to control proxies in a virtual (avatars) or real environment (humanoid robots), use motion simulators to exert static or temporally variable body accelerations on the user. For this purpose gimbal suspensions are also used.

In particular, this requires systems with four independent axes to avoid the effect of "gimbal lock". This condition occurs when degrees of freedom are lost at certain positions of the axes relative to each other, especially in the case of axes parallel to each other or when more than two axes lie in a common plane. In the proximity of these states, the necessary positioning speeds of the axes can become very high or arbitrarily high in order to change from one orientation of the user, even slowly, to another.

With gimbal suspensions with only three axes, this effect can make it technically and practically impossible for the user, controlled by the motion simulator's electronics, to take up certain areas of orientation in space in order to experience a suitable spatial position or acceleration impression.

If four axes are used, they can be suitably controlled so that three degrees of freedom are always available and no extreme speeds or accelerations are required. Such a system generally consists of 3 elements which each have 2 axes and together 4 independent axes. Such a system is generally larger and heavier than one with only 3 axes. This is especially true when each element circumscribes a full circle or a semicircle. These elements are then also particularly inert and resist rotatory and translatory accelerations. The same applies to elliptical or other shapes with large angular distances. In addition, errors in the positioning angles add up especially when the axes of each element are at large angles to each other. These angles are usually selected as 90°. It is especially important when the innermost element should resemble a full or semicircle that it is large enough in diameter that the user can never collide with it.

The motion simulator according to the invention contains a special gimbal suspension. The sum of the element angles (angles of the two axes of an element to each other) must be greater than 180° to avoid a gimbal lock and to allow the user in the exoskeleton to take all possible spatial orientations.

The motion simulator according to the invention may be used together with the devices according to the invention described above or independently of them. This also applies to all the embodiments discussed below in the description of preferred embodiments.

Further requirements concern a motion platform, in particular a special design of a hexapod (here also called Stewart platform). According to the invention, a movable working platform is provided which can be moved by actuators. On the inside of this working platform, an exoskeleton is mounted, preferably in such a way that the corresponding user is centered between the mounting points of the actuators on the frame.

For a further development of the platform according to the invention, it is intended that supports are provided between the actuators and the working platform. These should be long in order to increase or maximize the working space of the motion simulator. Furthermore, this is based on the following findings.

As motion platforms for exoskeletons in teleoperations (virtual or real governor) Stewart platforms are also suitable. These generally have six linear actuators, or similar means, which on one side are fixed to the floor or other base and at the other side are fixed to a work platform or working plane. By suitable, coordinated actuation of the linear actuators, the working platform can be freely actuated and accelerated in six degrees of freedom in space. In this way, arbitrary linear or rotational positions, velocities and/or accelerations of the platform can be generated. If the user in the exoskeleton is now attached to a Stewart platform, any body acceleration of the proxy can be transferred to the user, also by means of a motion cueing process.

Stewart platforms do not allow every spatial orientation. However, they have the potential to allow almost any or every gait. To achieve this, however, the technology must be adapted to the requirements of teleoperation with exoskeletons in order to fully exploit its potential. Conventional Stewart platforms require a lot of space and are high. Applications in tele-operation with exoskeletons primarily require rotations around points inside or near the user's body. However, if the user should be mounted on the working platform of a Stewart platform, such rotations are possible, but the working range of the Stewart platform is then small and large travel distances and speeds are required. It is advantageous if the centers of rotation are located approximately in the center of gravity between the mounting points of the linear actuators on the moving working platform.

The motion platform according to the invention may be used together with the devices according to the invention described above or independently of them. This also applies to all the embodiments as explained below in the description of preferred embodiments.

Overview of Several Embodiments

FIG. 1 shows a perspective representation of a preferred execution example for an exoskeleton 1000. This contains a first element 80a, also called Exo back plate, which is fixed in normal operation relative to the hip bone of a user. This exo back plate 80a comprises in the lower area on each side an axle mounting region 80b, which are inclined inwards and are also called mounting elements 80b. On each of these mounting elements 80b a second element 82 is rotatably mounted by means of a shaft 81. By means of a further shaft 83 (see FIG. 2) a third element 84, consisting of the two legs 84a, 84b, is rotatably connected to the second element 82. Since the two elements 82, 84 take over the essential functions of a hip joint, they are also called the first exo-hip joint 82 and the second hip joint 84 respectively. Via a further shaft 85, a fourth element 86 is rotatably connected to the second exo hip joint 84, which is also known as the exo thigh. Underneath thereof is a fifth element 88, also known as the exo lower leg, which is rotatably connected to the exo thigh 86 via a shaft 87. Below thereof, a fifth element 90, also known as the exo foot, is connected to the exo lower leg 88 by means of a hinge joint 89.

It should be noted that the exoskeleton 1000 is in so far mirror-symmetrical as it contains the above-mentioned elements, such as exo-hip joint 82, 84, exo-thigh 86, exo-lower leg 88 and exo-foot 90 as well as the associated joints 81, 83, 85, 87, 89, twice each, once on the right and on the left side. Because of the arrangement of the exo-foot 90 (tips to the left below) the usual forward direction of walking can be recognized. This is relevant for the designations "right" and "left" in this and the following illustrations. For clarification, "right side" and "left side" are indicated accordingly in FIG. 1. It is further pointed out that for the designs described here, the first element 80a, 80b has both the function as exo back plate and the function as exo hip plate. Therefore both terms "hip plate" and "back plate" are used equally here. In other designs, which are not discussed here, at least one separate back plate can be provided to actuate the back. Then the hip can move relative to the back by changing the joint angle between hip and spine.

Figure 2:
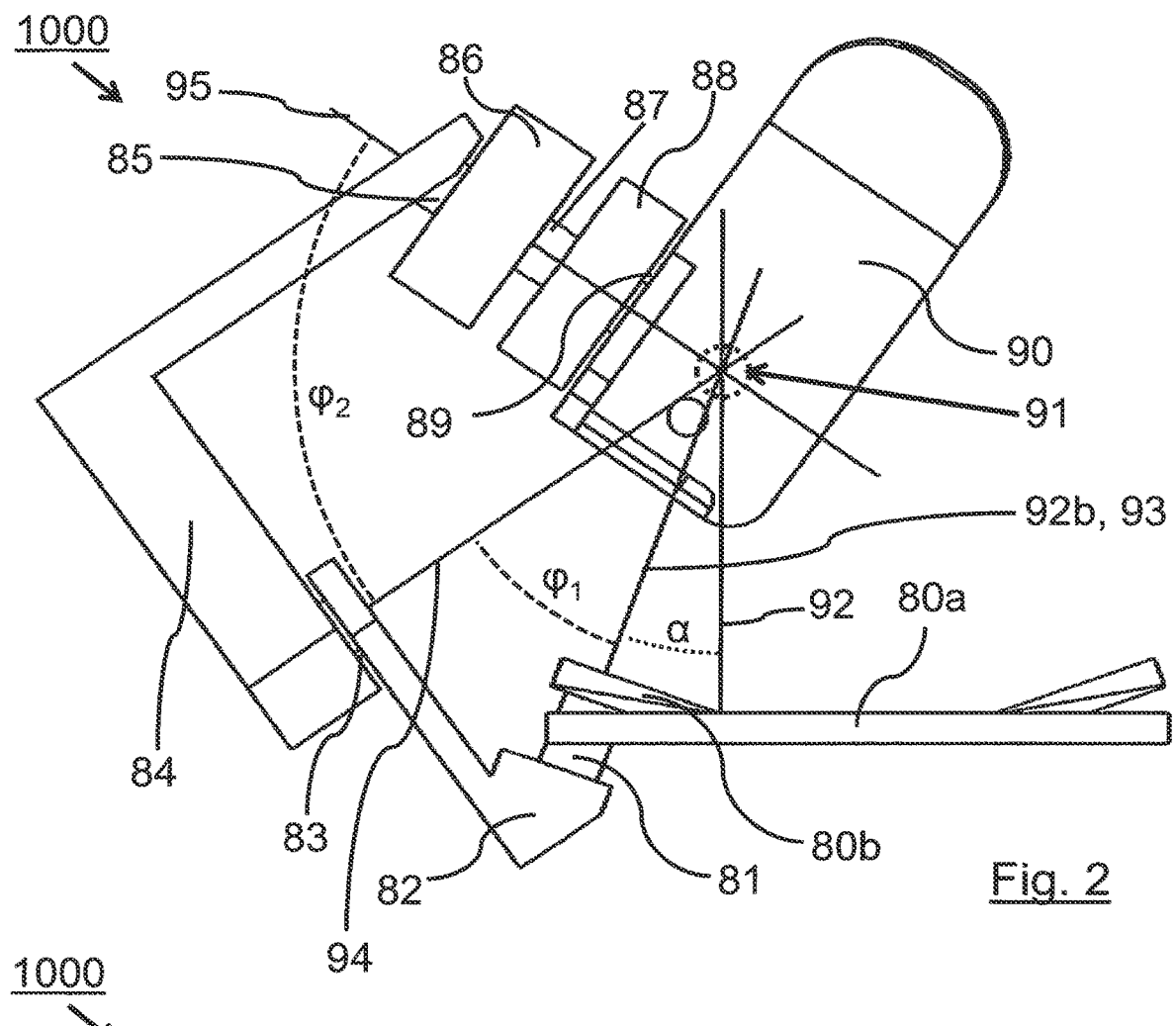
FIG. 2 shows a top view of the exoskeleton 1000

FIG. 2 shows a top view of the exoskeleton 1000, where in particular its elements are shown, which are located on its left side. In addition to the described elements, FIGS. 1 and 2 also show some axes, which result in particular from the arrangement of the shafts 81, 83, 85, 87 and 89. This will be discussed in more detail below.

As shown in FIGS. 1 and 2, a first axis 93 runs through the shaft 81, so that the first exo hip joint 82 can be rotated around the first axis 93 relative to the back plate 80a or the corresponding right or left fastening element 80b. In FIG. 1, the first axis 93 is marked both on the right and on the left. Further axes in FIG. 1, 2 are usually only drawn or marked on the right or left side—depending on where the corresponding axis is best recognizable. A second axis 94 is defined by the arrangement of the shaft 83. This allows the second exo hip joint 84 to rotate around this axis 94 relative to the corresponding first exo hip joint 82. A third axis 95 is defined by the arrangement of the shaft 85. This allows the exo thigh 86 to rotate about the third axis 95 with respect to the associated second exo hip joint. Accordingly a fourth axis 96 between the exo thigh 86 and the exo lower thigh 88 according to the arrangement of the shaft 87, and a fifth axis 97 between the exo lower leg 88 and the exo foot 90 according to the shaft 89 are defined.

The fourth axis 96 is in neutral position (straight, upright posture; as shown in FIG. 1) parallel or almost parallel to the mediolateral axis or axis of the user's knee and passes through his knee joint.

The fifth axis 97 lies in neutral position (see FIG. 1) parallel or almost parallel to the mediolateral axis or the axis of the ankle joint and runs through the human ankle joint. As can be seen from FIGS. 1 and 2, the shafts 81, 83, 85 are arranged in such a way that the corresponding axes 93, 94, 95 run through a point 91 on the right-hand side or a point 91 on the left-hand side (in FIG. 2 this is also surrounded by a dotted circle). These points 91 represent the center points of the right or left hip joint. In FIG. 1, 2 another axis 92 is drawn on the right side as well as on the left side. It is defined thereby that it runs on the one hand through the center point 91 of the associated right or left hip joint and on the other hand parallel to the sagittal axis. Furthermore, the axes 92, 93, 94, 95 and the associated joints are designed and arranged so as to define an angle $\varphi 1$ between the first axis 93 and the second axis 94 and an angle $\varphi 2$ between the second axis 94 and the third axis 95. In addition, the first axis 93 can, under certain conditions, form an angle with axis 92α (see FIG. 2), which will be discussed in more detail below.

The arrangement of the axes 93, 94 and 95 and the associated joints forms the core of the exo hip joint. These axes are three independent rotary axes, all of which intersect at the center 91 of the user's hip joint. They form a gimbal suspension with the center of the hip joint as the center.

The axes 93, 94, 95 of this gimbal suspension do not have to be perpendicular to each other. This is also not always possible or desirable, depending on the required working space of the mechanism or the desired type of actuation.

Figure 3:
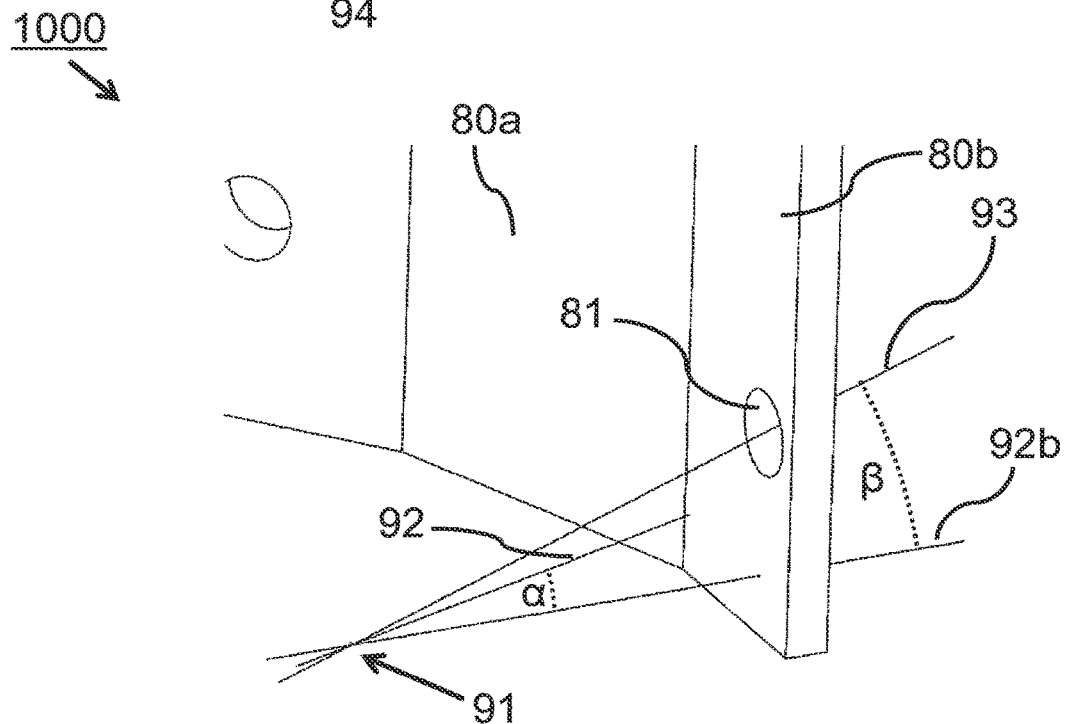
FIGS. 3-5 show illustrations of different angles for exoskeleton 1000
Figure 4:
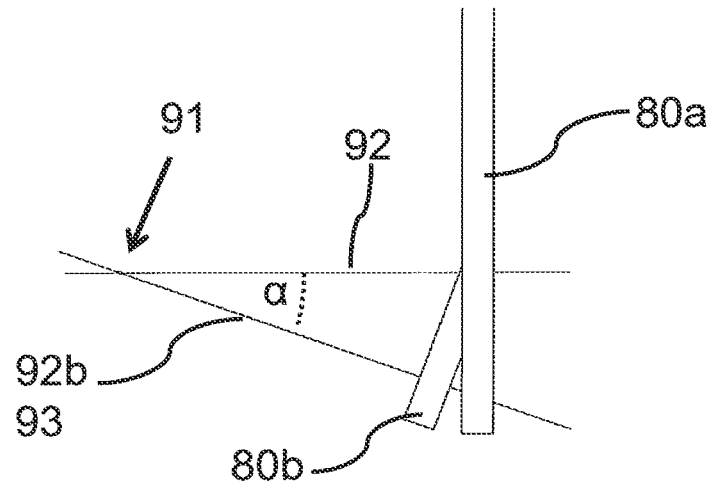
Figure 5:
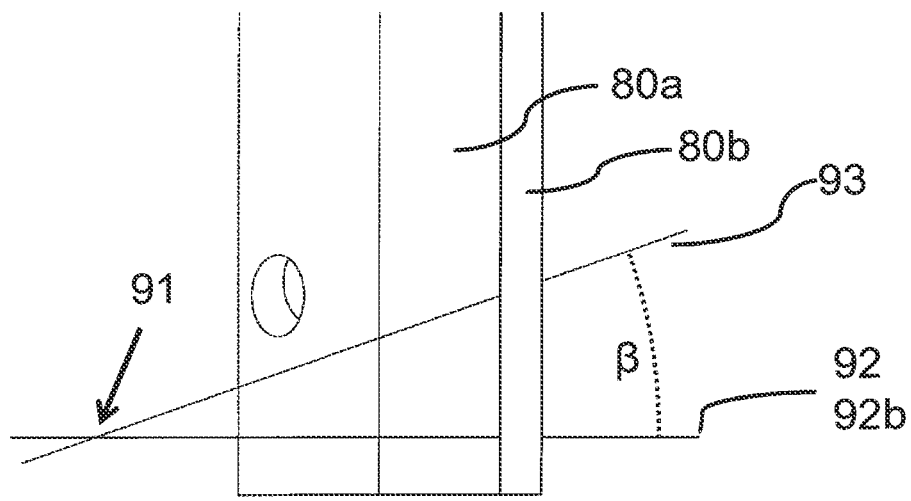

The first axis 93 can be oriented relative to the user's hip, or equivalent to the exo-hip, depending on the desired application and need, in space through the angles α and β, or an equivalent transformation, as shown in FIG. 3-5. However, the first axis 93 always passes through the center 91 of the user's hip joint. For this purpose, the distance between the Exo hip and the user must be adjusted accordingly. For $\alpha=\beta=0$ the first axis 93 is parallel to the sagittal axis and runs through the center of the hip joint 91. For α and/or β unequal to zero, first a rotation of the angle α around the vertical axis takes place and then a rotation of the angle β around a vector, with a support point in 91, which is perpendicular to the plane which intersects the transverse plane perpendicularly and runs through 92b (according to FIG. 4).

The figures so far mainly serve to explain the principle of the present invention. In the following figures several examples of execution are shown. For the sake of clarity, the reference symbols are drawn in only to the extent necessary for comprehension.

FIGS. 6-11 shows a first preferred example of execution. Here, the first axes 93 of the left and right side both stand at right angles on the first element 80*a*, are parallel to the sagittal axis and lead through the centers of the femoral heads. By only actuating around these first axes 93 a pure abduction and adduction of the thigh is made possible. In the first example, the angles have the following values:

$\varphi 1=35$ degrees; $\varphi 2=70$ degrees; $\alpha=0$ degrees; $\beta=0$ degrees.

Figure 6:
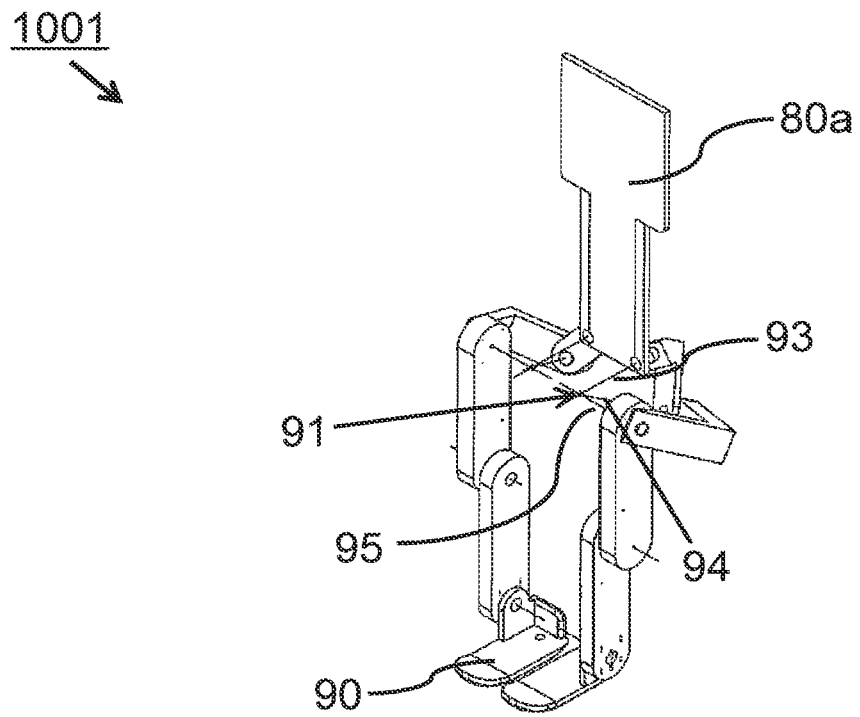
FIG. 6-11 show different representations of exoskeleton 1001
Figure 7:
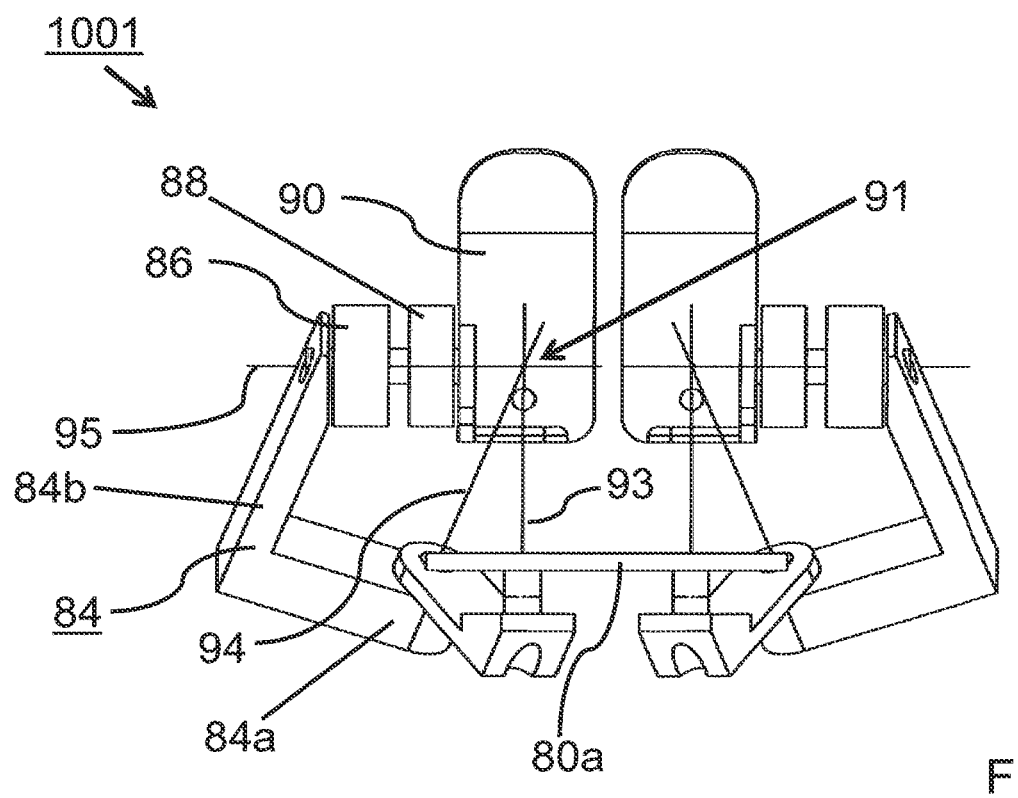

FIGS. 6 and 7 show different views of an exoskeleton 1001 after the first example, whereby a neutral posture is shown. Thereby the third axes 95 in the neutral position are parallel to the mediolateral axis. They are therefore responsible for the pure flexion and extension of the thigh.

The choice of the third axis 95 in this direction facilitates the actuation of the thigh when walking or running. Then most of the work is done here and the largest angle variations are present.

The fourth axis 96 and the fifth axis 97 in the neutral position are parallel to the mediolateral axis. They are thus responsible for the pure flexion and extension of the lower leg (fourth axis 96) or the foot (fifth axis 96).

The choice of the position of the second axis 94 is not trivial. For an application in walking, standing and running, it cannot run vertically through the hip joint (then all three axes would be at right angles to each other in the neutral position), since a hinge joint would then have to be located either in the upper body or in the thigh. The angle between the first axis 93 and the second axis 94 is $\varphi 1=35°$. The angle between the second axis 94 and the third axis 95 is $\varphi 2=70°$. In this arrangement, with axis 93 parallel to the sagittal axis and with the third axis 95 of the hip, the fourth axis 96 of the knee and the fifth axis 97 of the foot 90 parallel to the transversal axis, from the sum of the angles of $\varphi 1+\varphi 2=105°$ the maximum internal rotation of the leg of $\varphi 1+\varphi 2-90°=105°-90°=15°$ results. Then all axes 93-95 lie simultaneously in a plane parallel to the transverse plane. The maximum rotation of the leg around the vertical axis is not so easy to determine and essentially depends on the shape and size of the elements 80, 82, 84. If it is assumed that the individual parts can penetrate each other, or should be constructed in such a way that they do not penetrate each other or collide with each other, then the maximum external rotation of the foot 90 in the last described case, is $$-\varphi 1+\varphi 2-90°=-35°+70°-90°=-55°.$$

The difference between maximum internal and external rotation is $2\cdot\varphi 1=70°$.

Figure 8:
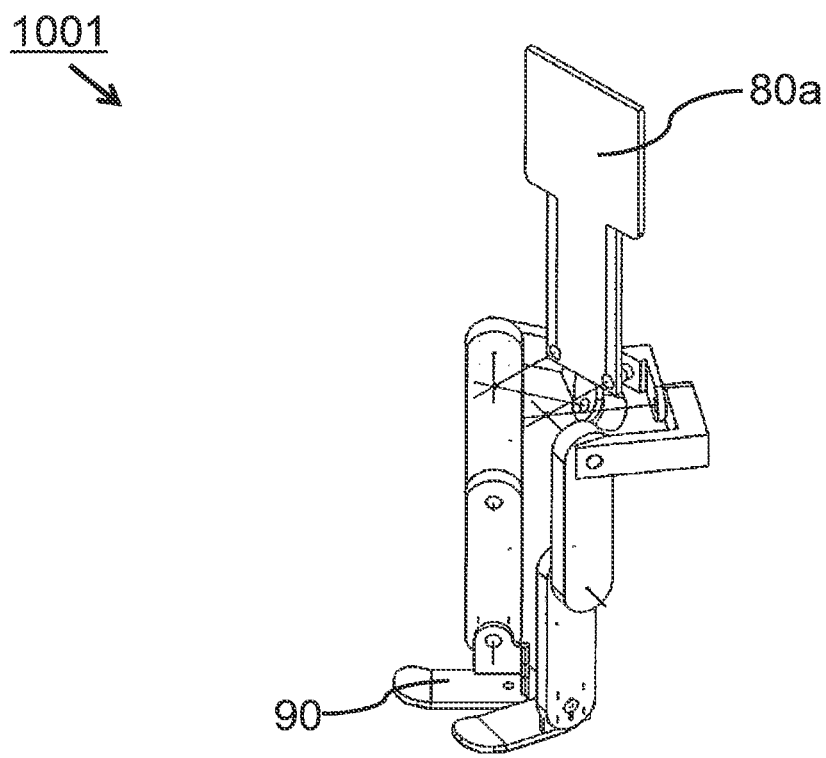
Figure 9:
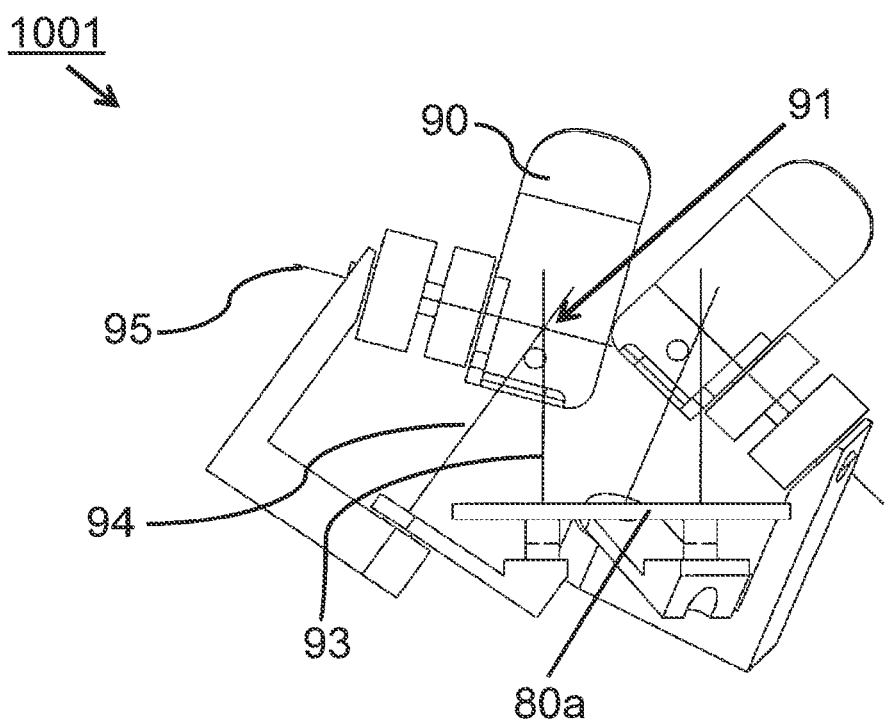

FIGS. 8 and 9 show different perspectives of the first execution example with maximum internal rotation of 15 degrees and maximum external rotation of approx. 45 degrees.

Figure 10:
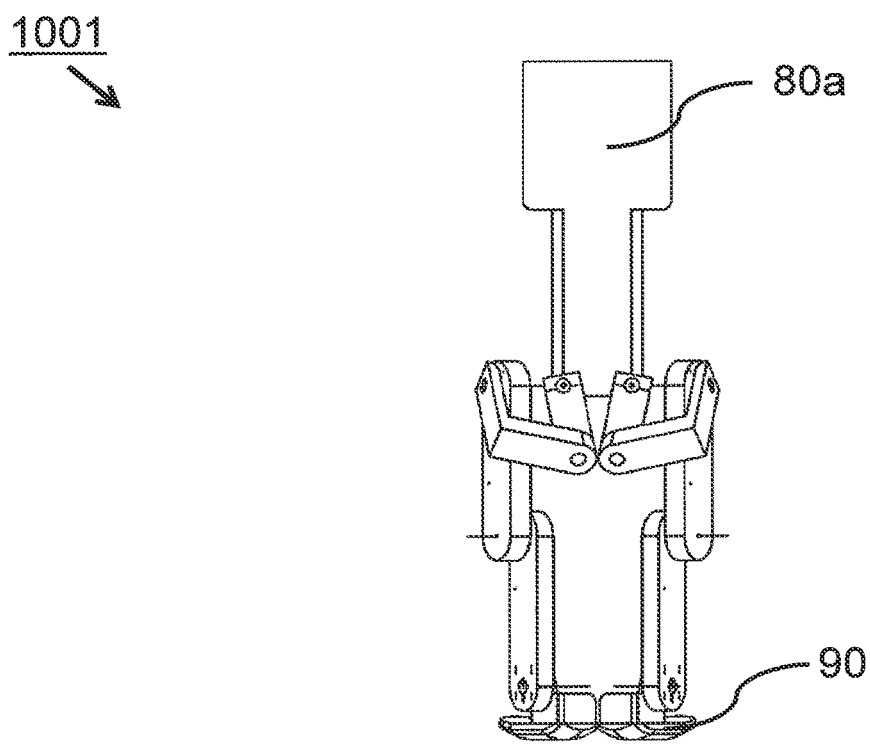
Figure 11:
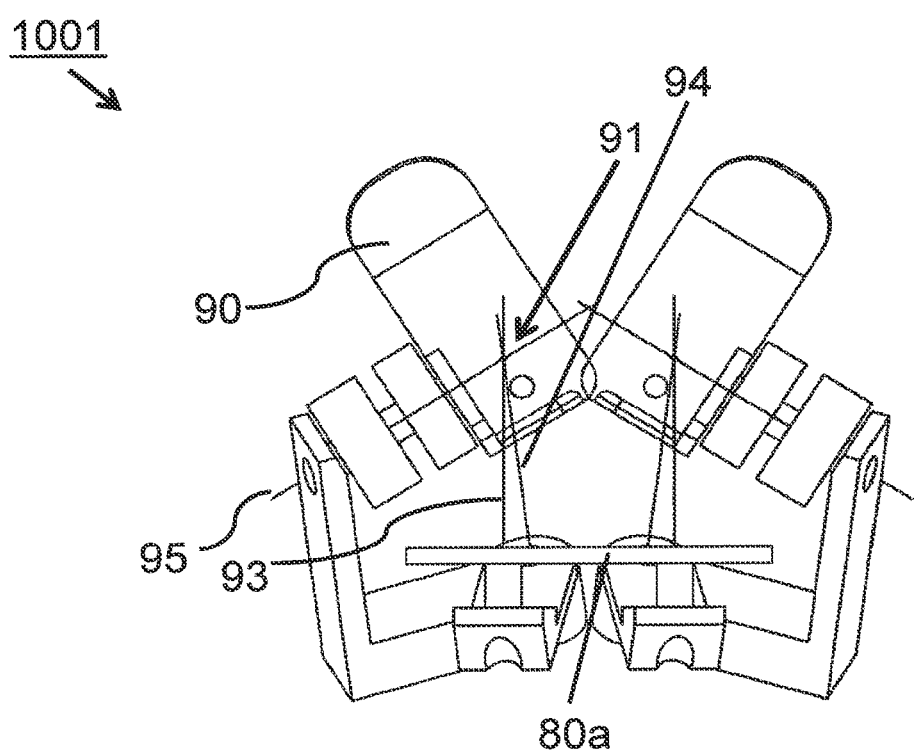

FIGS. 10 and 11 also show different perspectives of the first execution example with a maximum simultaneous external rotation of approx. 32 degrees. It enables almost any posture and movement, even extreme ones. This includes walking, running, running, jumping, turnaround on the spot, deep lunge, side steps, cross steps, close combat, sitting on chairs or benches and more. Structure 1 allows a wide amplitude of the external rotation of the feet (45° external rotation, 15° internal rotation). Other constructions can be realized according to the requirements of an application.

As already mentioned above, the first axis 93 does not necessarily have to run parallel to the sagittal axis. In particular, it can be useful to rotate them around the vertical axis so that the feet can be rotated inwards around the vertical axis over a larger range. This is the second example of the execution described using FIGS. 12-17, which has the following angles:

$\varphi 1=35$ degrees; $\varphi 2=70$ degrees; $\alpha=20$ degrees; $\beta=0$ degrees.

Figure 12:
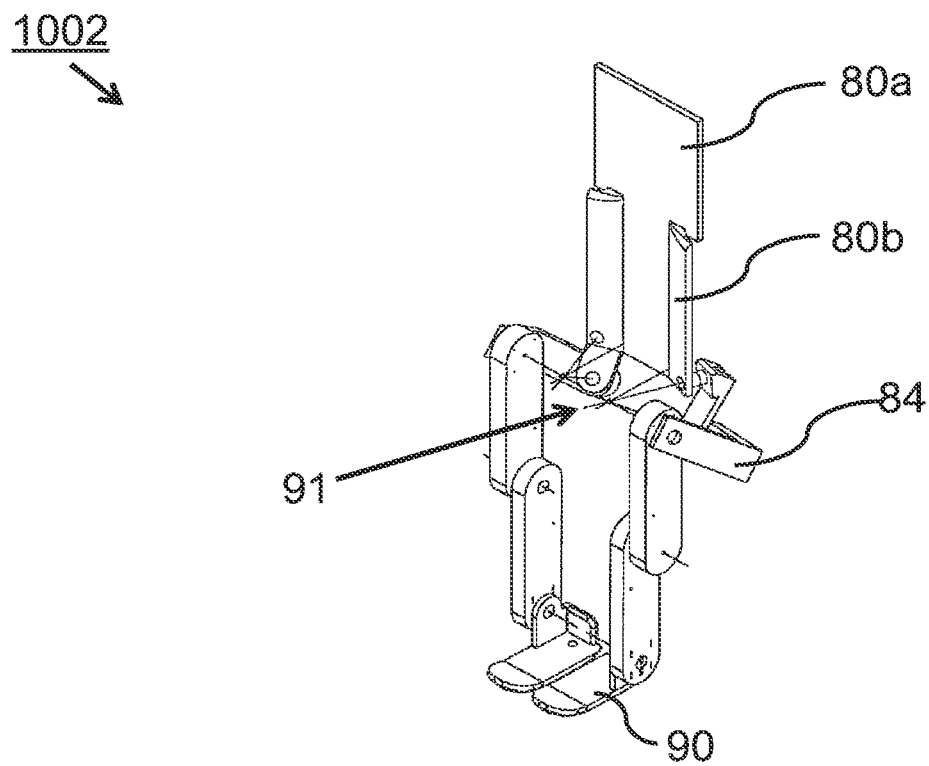
FIGS. 12-17 show different representations of exoskeleton 1002
Figure 13:
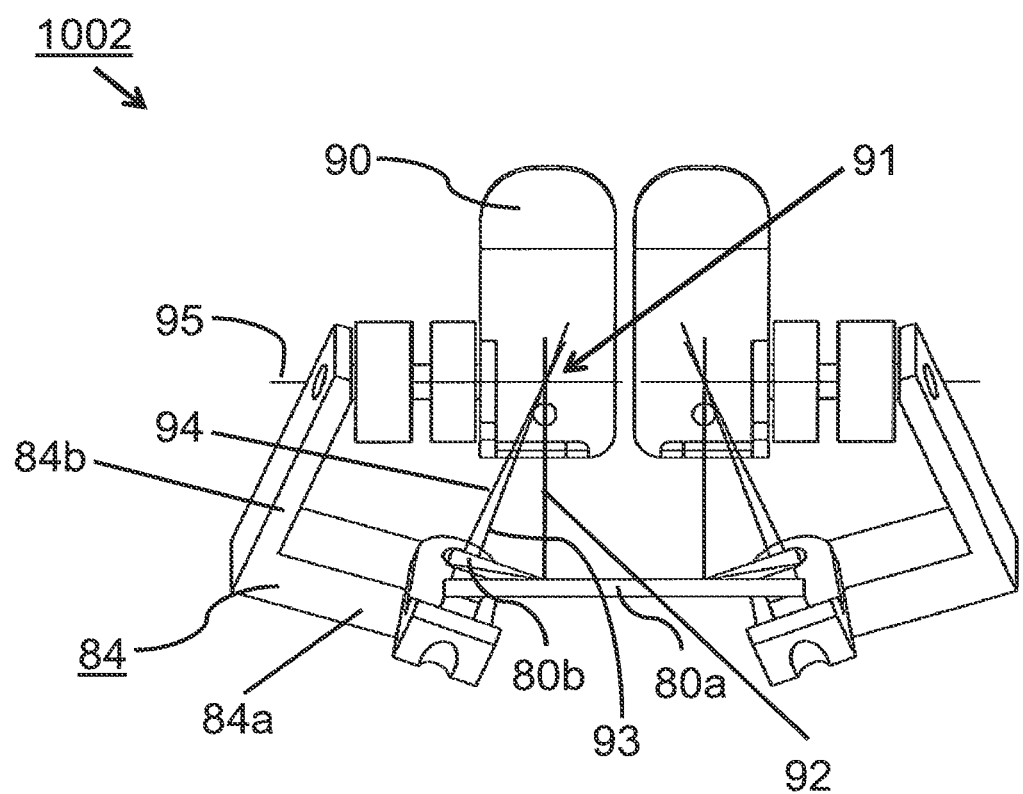

FIGS. 12 and 13 show an exoskeleton 1002 in neutral position according to the second example.

Figure 14:
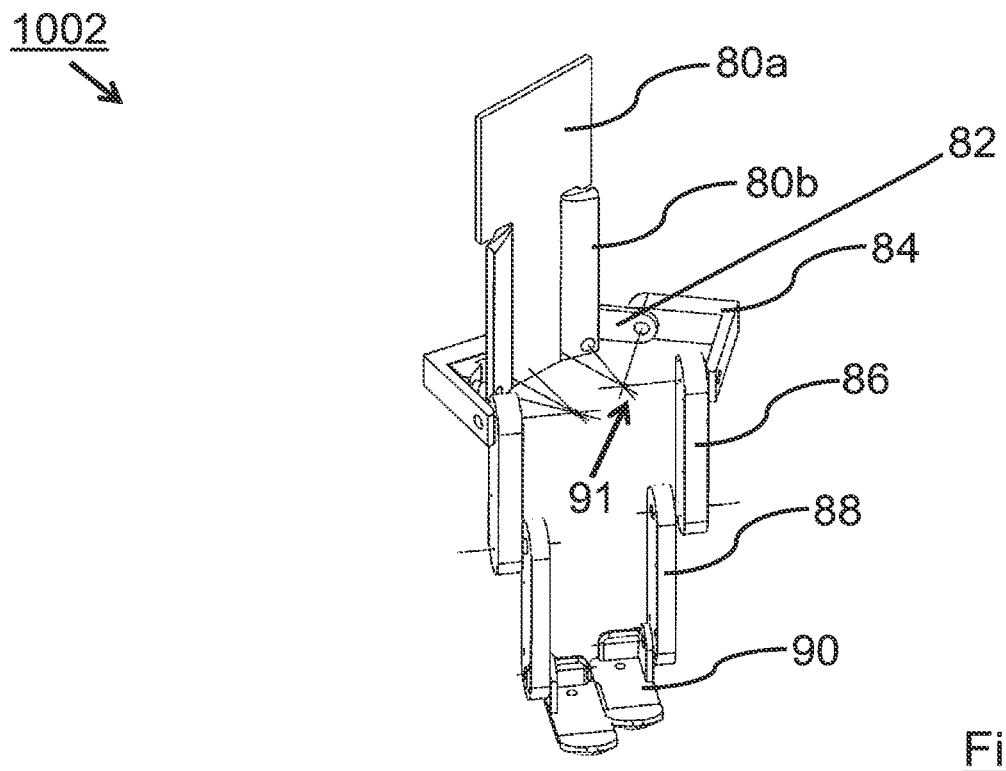
Figure 15:
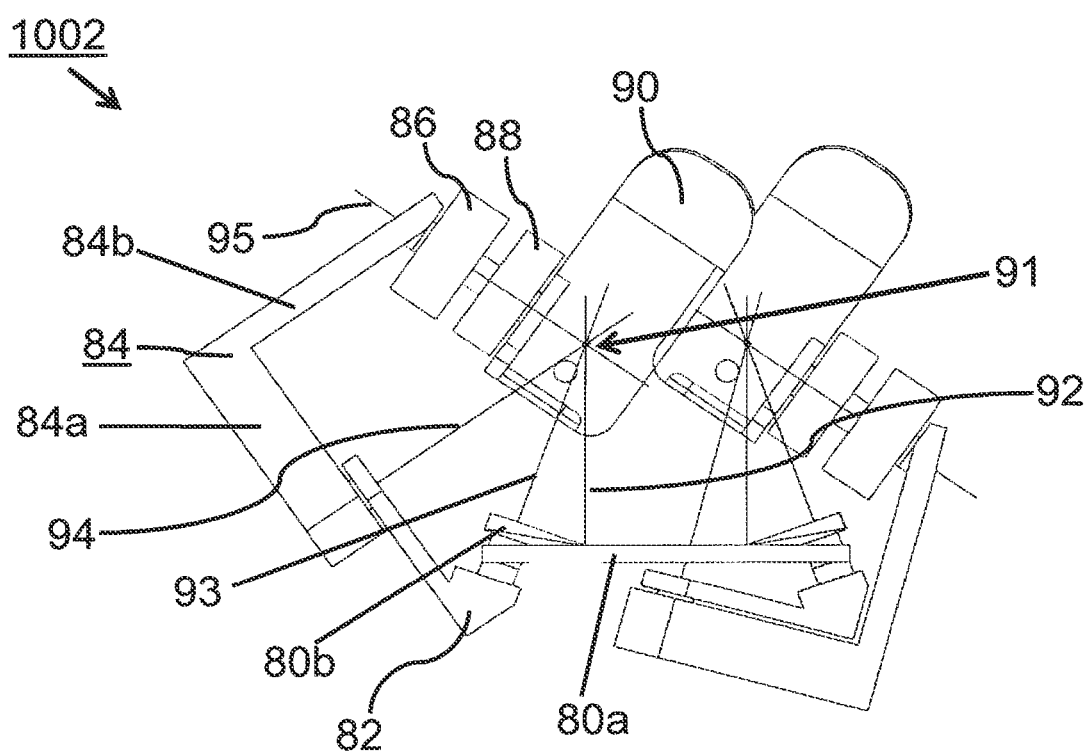

FIGS. 14 and 15 show the exoskeleton 1002 with maximum internal rotation of 35 degrees and maximum external rotation of 35 degrees.

Figure 16:
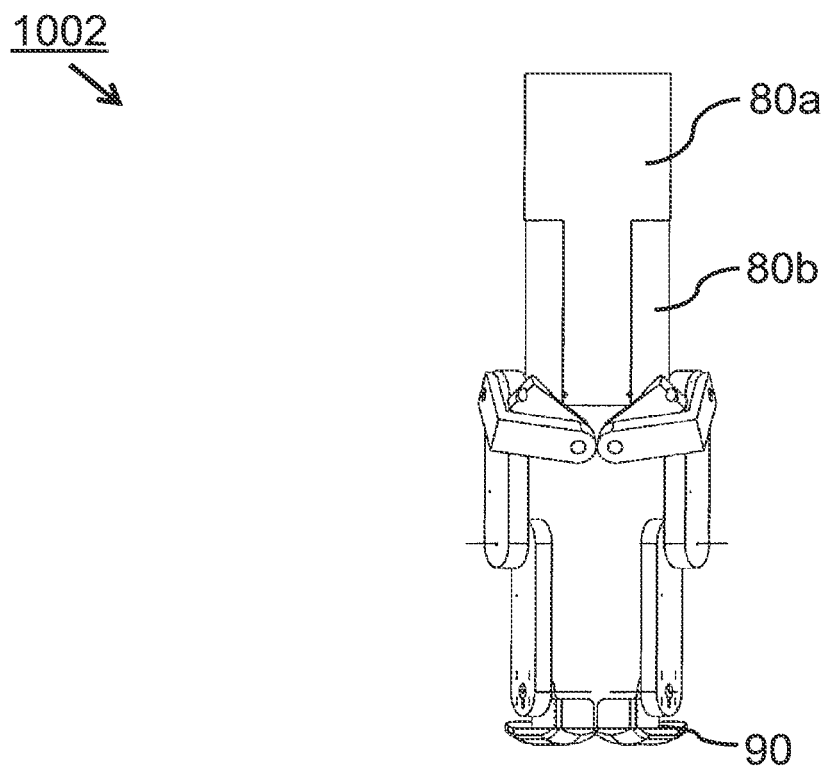
Figure 17:
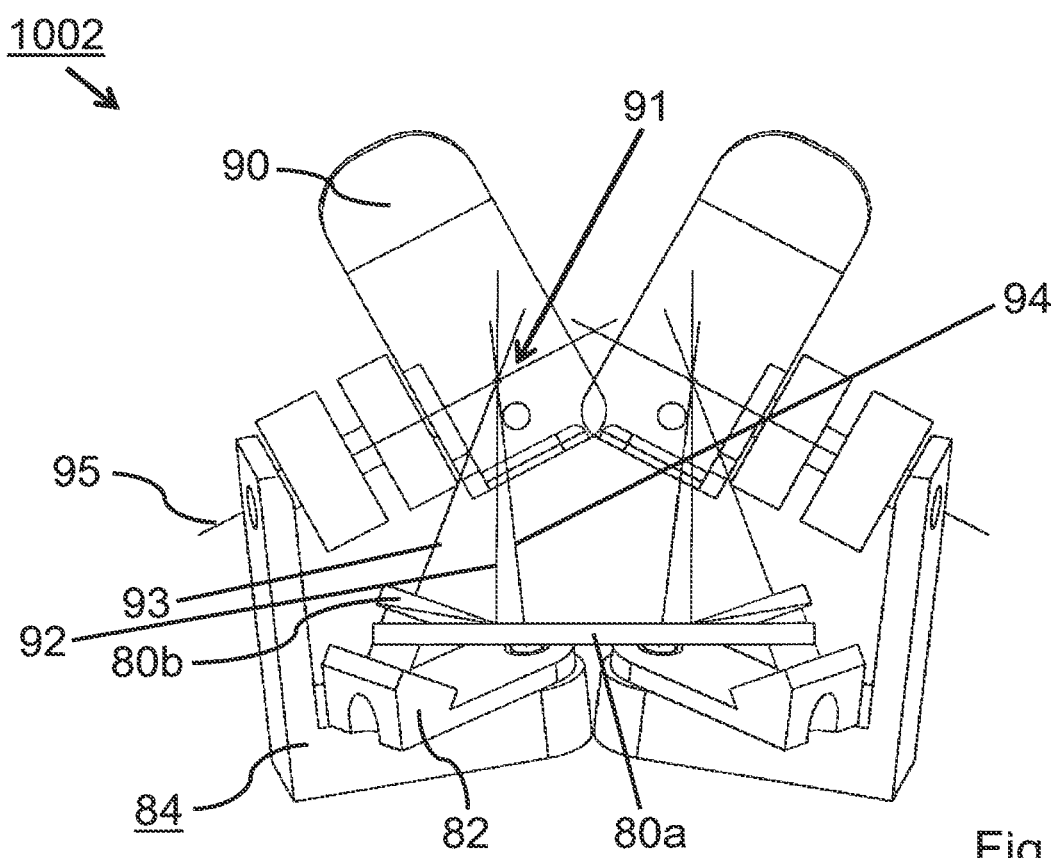

FIGS. 16 and 17 show the exoskeleton 1002 with a maximum simultaneous external rotation of approx. 28 degrees. The second example demonstrates how the maximum internal rotation of the foot can be increased by choosing a $\alpha>0°$. In addition, FIG. 15 shows that the maximum travel range of the second element 82 is increased, and thus the theoretical maximum of the outer rotation of the foot 90 can be reached. In the first example, this rotation was limited by the fact that the second element 82 could collide with element 1. Thus, instead of the theoretical maximum external rotation of 55°, only 45° was achieved. Thus, the second design example makes it possible e.g. to change the walking direction faster than the first design example, with full ground contact without sliding.

With the exoskeleton 1002, however, the maximum outward rotation of the feet 90 about the vertical axis is automatically reduced by the same amount. For outward rotation, the quantification of the maximum angle again depends on the size and nature of elements 80*a*, 82, 84 in particular, as they may collide depending on the angles selected and your their other specific geometry. However, this is not the case in the second example (see in particular FIG. 15, right leg). Here, the maximum possible inward and outward rotation of the foot is 35°.

In order to allow the widest possible abduction of the thigh, it is necessary to maintain a lateral distance between the thigh or hip of the user and the nearest components on the third axis 95. These parts rotate in a circle around the center of the head of the femur when the leg is abducted, i.e. rotated predominantly around the first axis 93. These circles also intersect the parts of the upper body (hips and upwards). The greater the radius of these circles between the centre of the hip joint and the innermost part along the third axis, the greater the maximum abduction angle of the leg. Likewise, the exo plate 80*a* should be kept narrow (in a lateral direction) so that it does not conflict with the third element 84 if the leg is further abducted.

The exo 86 thigh in the preferred embodiment is attached to the outside of the user's leg. The third element 84 is attached along the third axis 95 then distally to the exo-thigh 86. This means that the thigh is attached to the inside of the Cardan suspension. Then it is easy to attach the user's thigh to it without too great a distance. The Exo thigh 86 then automatically has a stop in the swing direction to the rear on the second element 82 or on the third element 84, so that an overturning can be prevented. If, however, a particularly large distance between the user and the exoskeleton is required in the area of the third axis 95, e.g. to allow a particularly large abduction of the leg, the thigh can also be attached to the outside of the third element 84.

The elements 82 and 84, which are the brackets of the gimbal, are preferably designed in such a way that the inner element is smaller than the outer element, in such a way that the inner element does not collide with the outer element at extreme angles and external rotation of the foot 90, thus limiting the freedom of movement. Elements 82, 84 are preferably designed as "brackets", but can also be designed as circular arcs, so that they resemble more the elements of a typical Cardan suspension.

FIGS. 18-23 show another exoskeleton 1003 according to a third execution example. This has the following angles:
$\varphi_1=35°$, $\varphi_2=70°$, $\alpha=20°$, $\beta=20°$.

Figure 18:
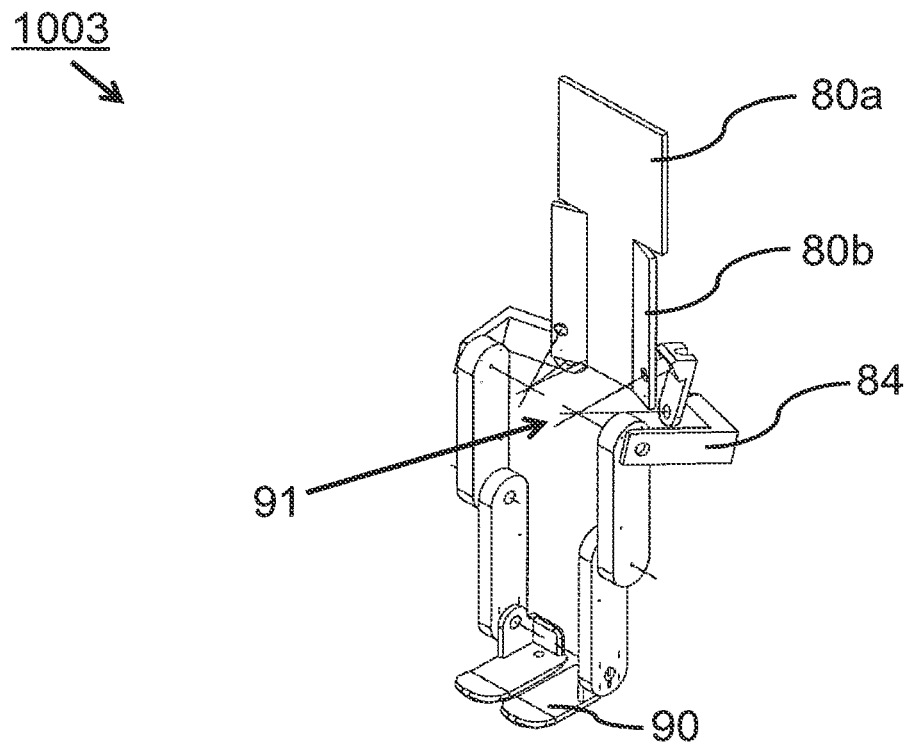
FIGS. 18-23 show different representations of exoskeleton 1003
Figure 19:
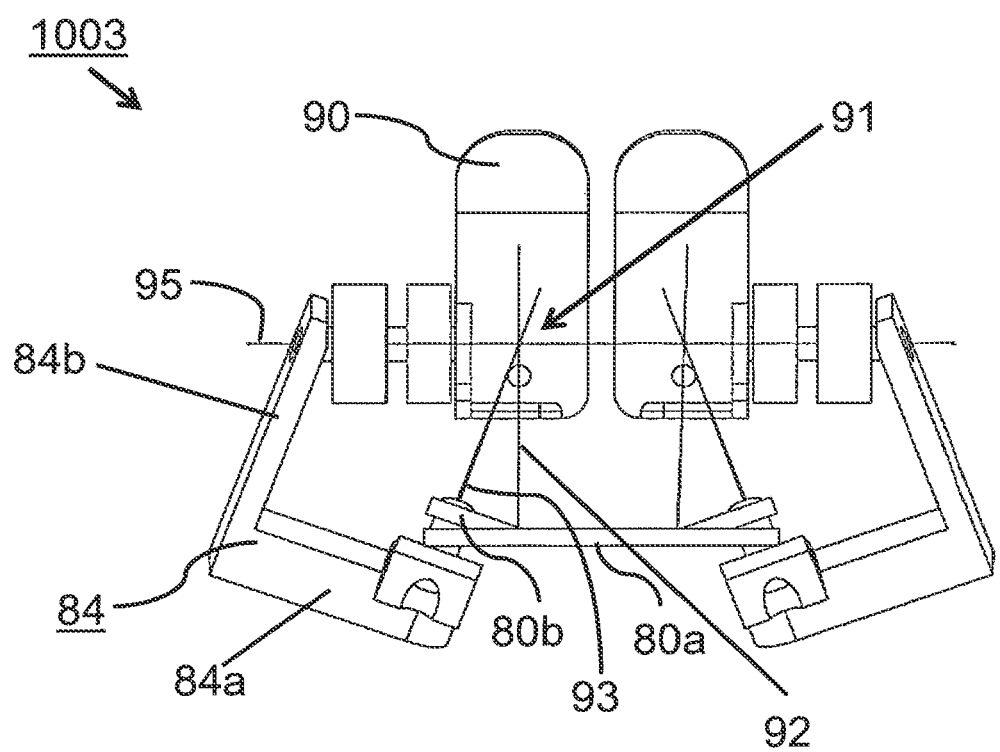
Figure 20:
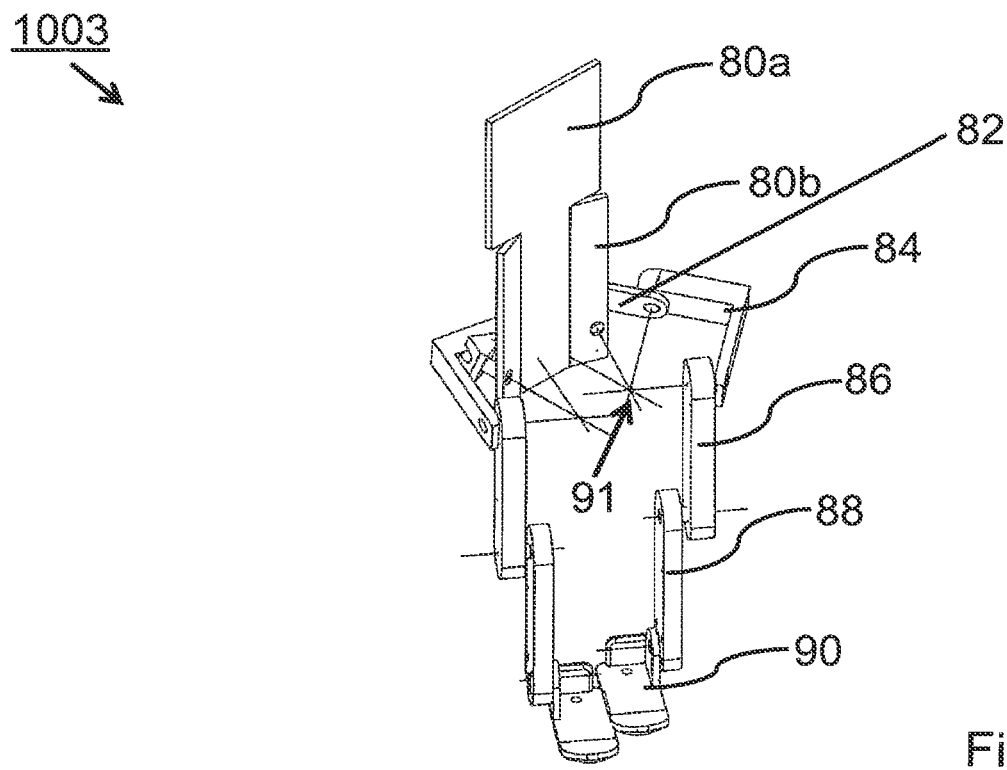
Figure 21:
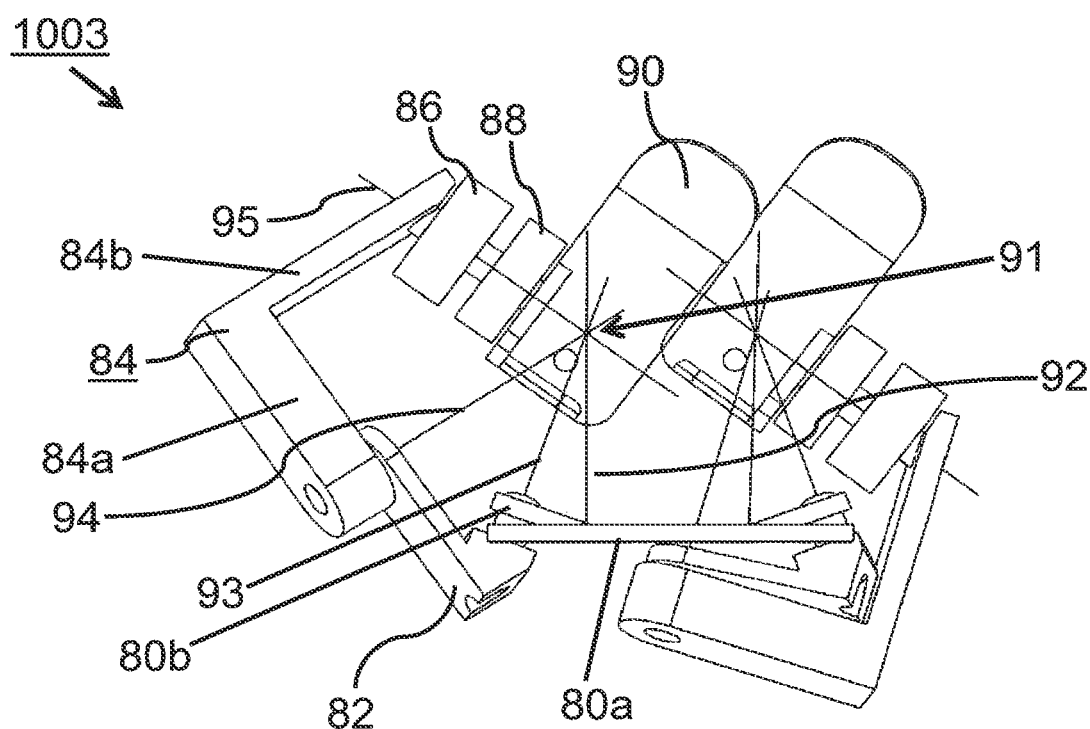

For this case FIGS. 18 and 19 show the exoskeleton 1003 in a neutral position. FIGS. 20 and 21 show the exoskeleton 1003 with a maximum internal rotation of 33 degrees and a maximum external rotation of approx. 37 degrees. In addition is pointed out, that exo back plate 82 can be shorter than shown here.

Figure 22:
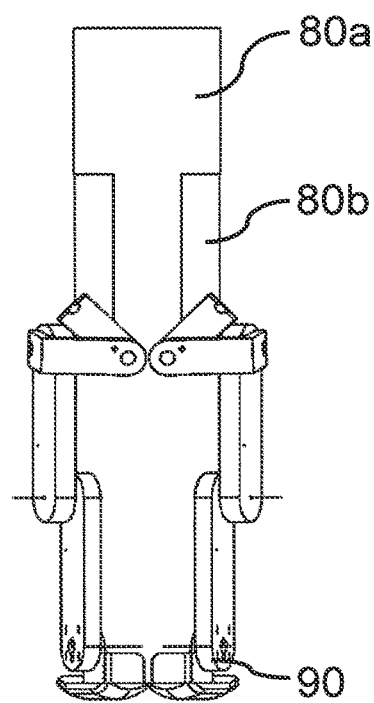
Figure 23:
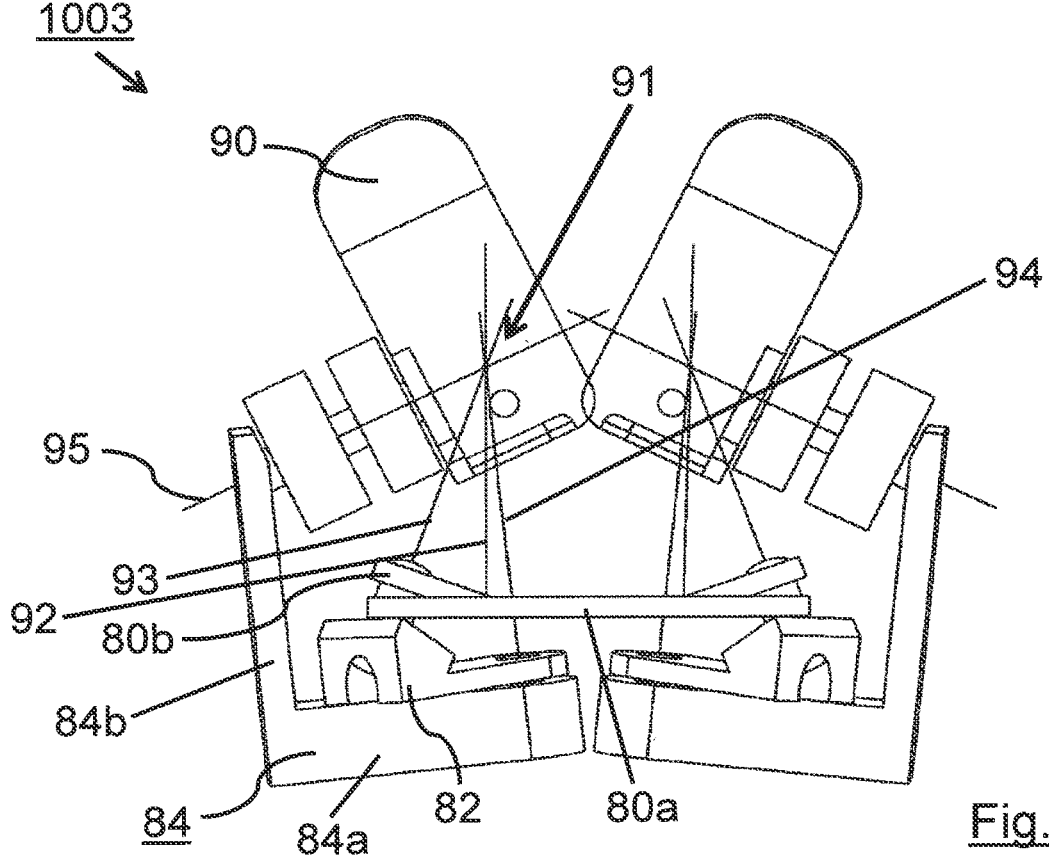

FIGS. 22 and 23 show the exoskeleton 1003 with a maximum simultaneous outer rotation of approx. 26 degrees.

By the raised second element 82 the exoskeleton 1003 of this execution example allows in principle longer steps than in the previous execution examples. However, these longer steps are usually no longer covered by the natural working space of most humans. The space created at the back of the user's legs, however, also allows other devices such as tactile elements or armour to be attached to the user's thighs. This design is interesting for mobile applications because it makes sitting even easier and reduces the risk of colliding with the environment. The structure also allows, for example, deeper kneeling without the feet 90 of the exoskeleton colliding with the hip elements.

The examples of execution described so far are preferred. However, there are a large number of other configurations which refer to all the execution examples described so far. Some of these improvements are briefly discussed below.

In the previous execution examples, the elements 82 and 84 are designed in such a way that between the first axis 93 and the third axis 95 only one further axis is provided, namely the second axis 94, which results from the joint 83 between the elements 82 and 84. It is also possible to use not only provide a second axis 94 between preserved axes 93 and 95, but to introduce additional axes (e.g. axes 94*a*, 94*b*, etc.) using more than 2 brackets or arcs. Especially if all or some of these elements can be completely folded into each other, this has the advantage that the difference between maximum inner rotation and maximum outer rotation of the corresponding foot 90 can be increased.

Figure 24:
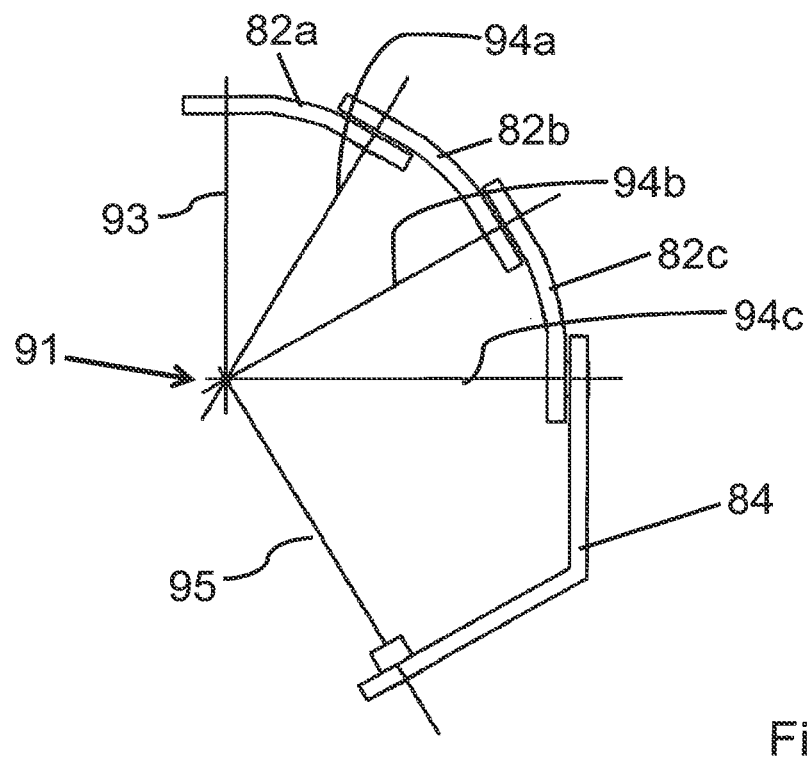
FIGS. 24-26 show different representations of the divided second element (82*a-c*)
Figure 25:
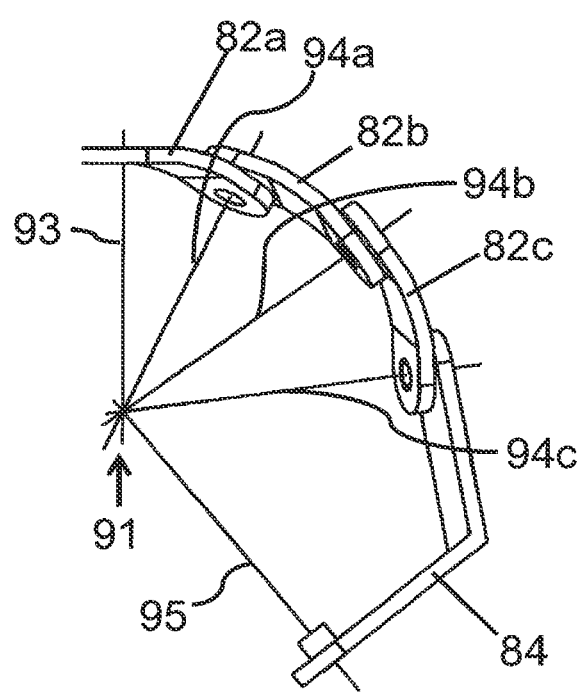
Figure 26:
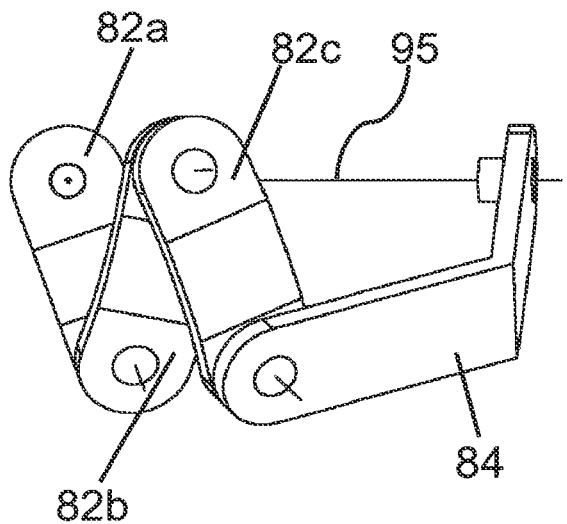

FIGS. 24-26 show different perspectives of such an example, in which element 82 is divided into three parts, which are here referred to as 82*a*, 82*b* and 82*c*. Each of these parts is rotatably connected to its neighboring part, resulting in the axes 94*a*, 94*b* and 94*c*. Preferably each axis is updated. This can also be done by actuators on the not shown elements 80 or 86. The smaller elements in the example cover an angle of 30° each and the larger one an angle of 60°. With this construction a foot could be rotated (by means of the external or internal rotation of the hip joint) by 60° inwards as well as outwards (for a hip plate with $\alpha=\beta=0°$). It is possible to attach elements 81, 82*a*, 82*b*, 82*c*, etc, 84, 86 in any order inside or outside to each other. In addition, the angles $\varphi_i$ of the elements can be different from each other. Elements 82-84, which are arranged from the inside to the outside as in the example according to FIGS. 24-26, can never intersect, independent of the angles $\varphi_i$ used. If however at least some of elements should be arranged from outside to inside, cutting of each other can be avoided, if the next element (e.g. element 82*c* is next element of 82*b*) covers a much smaller angle than previous element. It is also possible that element 82*a* is outside of the following elements 82*b*, etc. but is first attached to element 80. By using some of these measures or by combining them, it can be prevented that the diameter of the entire hip joint increases too much with increasing number of elements.

Due to the use of more than 3 axes for the hip joint, there is generally no longer a unambiguous assignment for the choice of the driven axis angles (joint angles). However, it is preferable to correlate the angle between axis 93 and axis 95 tabularly or functionally bijective with a vector of the to be actuated angles (joint angles) of axes 94*a*, 94*b*, etc. This ensures that the mechanism behaves safely and predictably. In general, it is necessary that element 84 does not deviate too far from the horizontal. This would impede the free swinging of the leg. This type of actuation can also be operated in the other direction to increase an external rotation of the hip. This type of actuation can also be operated in the other direction to increase an external rotation of the hip. Then, however, it can happen that the hip elements of the left and right leg easily come into conflict with each other.

It is generally important that the last element (here 84) to which the exo thigh 86 is attached, in all states of the hip joint mechanism, allows the exo thigh 86 to swing during gait. Since in the preferred execution examples the exo thigh 86 is fastened internally to the third element 84, the area of the third axis 95 of element 84 is preferably flat on the inside. This corresponds to the representations used here. However, element 84 may be round, especially if the exo thigh 86 should be attached externally, or if the distance between the exo thigh 86 and element 84 along the third axis 95 should be so large that a free swing of the exo thigh 86 should not be significantly restricted.

Due to a particularly wide choice of hip elements, preferably as segments of spherical shells, the hip mechanism can correspond even more closely to a foldable part of a spherical shell. This can be used e.g. as protection or armour.

In the shown exoskeleton forms 1000, 1001, 1002, 1003, the third element 84 is formed in such a way that the two brackets 84*, 84*b* are arranged almost perpendicular to each other. As a result, the third element 84 protrudes quite far sideways in the various movements. In order for the third element 84 to occupy less lateral space, it is possible to shorten the first bracket 84*a*, preferably so that the second bracket 84*b* runs parallel to the sagittal axis in the neutral position. This facilitates the swinging of the arms when walking and saves weight. This facilitates the swinging of the arms when walking and saves weight. For this purpose, the angle between the brackets 84*a* and 84*b* is to be adjusted accordingly.

For reasons of clarity, the necessary bearings, axle mounts and actuators are not explicitly specified in the examples described. Actuators can be mounted in or on any element. Correspondingly, fixed axle connections or e.g. ball bearing connections become necessary. As shown in the first example, however, it is preferred that an actuator in an exo lower leg 88 actuators the fifth axis 97 to the exo foot 90. A first actuator in exo thigh element 86 actuators the fourth axis 96 of the knee joint, a second actuator in exo thigh element 86 actuators the third axis 95 of the exo hip joint, an actuator in element 84 actuators the second axis 94 of the hip joint, and an actuator on, in, or on the exo hip or exo back plate 80*a* actuates the first axis 93.

Below are described novel actuators which can be used to drive all joints of the described exoskeleton in the preferred design. Regardless of this, the mechanism of the exoskeleton can also be driven by other actuators. This includes normal geared motors, linear actuators, hydraulic or pneumatic cylinders, direct drive by gearless torque motors, drive by cables and Bowden cables and rollers and more. Particularly advantageous is the drive via motors with back-drivable ball-bearing worm gears (ball worm, ball worm gear, recirculating ball worm drive according to U.S. Pat. No. 3,468,179 A), with global roll spindles or "harmonic drive" gears.

Especially the exo-foot 90 generally can have an additional axis and necessary components with which pronation and supination can be actuated. A particularly advantageous further development of the Exo-Foot is described below and is called Exo-Foot 9000.

It can be advantageous if the two axes of the Exo 86 thigh are not parallel to each other. However, the fourth axis 96 must always be parallel or almost parallel to the axis of the knee joint. However, the third axis 95 can generally be oriented arbitrarily. In this way it can be influenced, according to the effect of the angle α, to what extent the external and internal rotation of the leg is possible. The described hip mechanism, with at least 3 axes, which intersect in the center of the hip joint, is in practice quite tolerant regarding deviations in the axial direction. Also, the user may be larger, smaller, too far forward, or too far back, too far left, or too far right of the ideal position. This can be used to use an exoskeleton of one size for more than one user. Also the adjustment of the center distances and angles to a special user is facilitated. However, the principle of the mechanism is not lost by these deviations. It is intended to design mounting points and bearings of axles to be displaceable and adjustable. It is advantageous to be able to adjust the distance from the user's back to the hip plate, as well as its vertical position, in order to align the center of his hip joint with the intersection of the axes.

Due to the largely anthropomorphic nature of the exoskeleton, it is possible to design most of the described elements in such a way that they encompass the user, and not only, as in the illustrations, stand laterally to him.

It should be noted that, surprisingly, with the preferred simple hip mechanism (e.g. FIG. 1-25), also in connection with the described exoskeleton, generally only extremely low torques are required to actuate the second axis 94. This is also true if the exoskeleton, as in tele-operative applications, has to carry the entire weight of the user, while it is itself, on the hip or back, carried by a movement simulator. If, for example, the user's weight rests only on an extended leg and is transferred to an exo leg entirely by means of his foot on the foot element of the exoskeleton, the centre of gravity of the leg and of the user is always perpendicular under or above his loaded hip joint (point 91). If β=0°, and the weight of the elements 82 and 94 can be neglected compared to the other weights, only changes in the joint angles of the axes 93 and 94 can change the potential energy by raising the center of gravity. For this, considerable torques are required. The actuation of axis 94, however, is also possible without changing the potential energy if axes 93 and 95 are moved in such a way that a single external rotation or internal rotation (external or internal rotation of the hip joint) of the foot is achieved. The centre of gravity remains at the same height and therefore no work is performed and no axial torques occur. However, since the position of elements 82 and 84 in a gravity field generally changes due to the modified joint angle of axis 93, a low axial torque must be applied or absorbed by the actuator. However, the transversal torques on this axis are generally very high when a leg is loaded with significant parts of the body weight. The joints must be of a correspondingly strong design. Friction forces in the bearings, which are low, must also be overcome. The external or internal rotation of the leg is force-wise only weakly developed in humans. Therefore, the torques to be actuated of axis 94, which mainly serves this degree of freedom, are also low compared to other torques occurring in the exo legs. Accordingly, actuators there can be smaller and weaker.

Similarly, the axial torques of a body with several elements 82, 82b, etc. (FIG. 24-26) are only low. The rather small actuators can therefore be easily located on or in these elements for all configurations, but can also be remote (Bowden cables). This also applies if only one element 82 is used. Even if β should not be equal to 0°, these axial torques are low, as long as β remains small.

All described structures and combinations of properties can be used not only for exoskeletons but also for humanoid robots and virtual avatars or virtual machines. In virtual cases, real components must be replaced by corresponding virtual ones.

As already mentioned, the previous description of the preferred exoskeletons 1001, 1002, 1003 did not include the representation and description of associated actuators. Particularly suitable actuators are described in the following.

FIGS. 27-31 shows a first execution example of a new actuator 2001.

Figure 27:
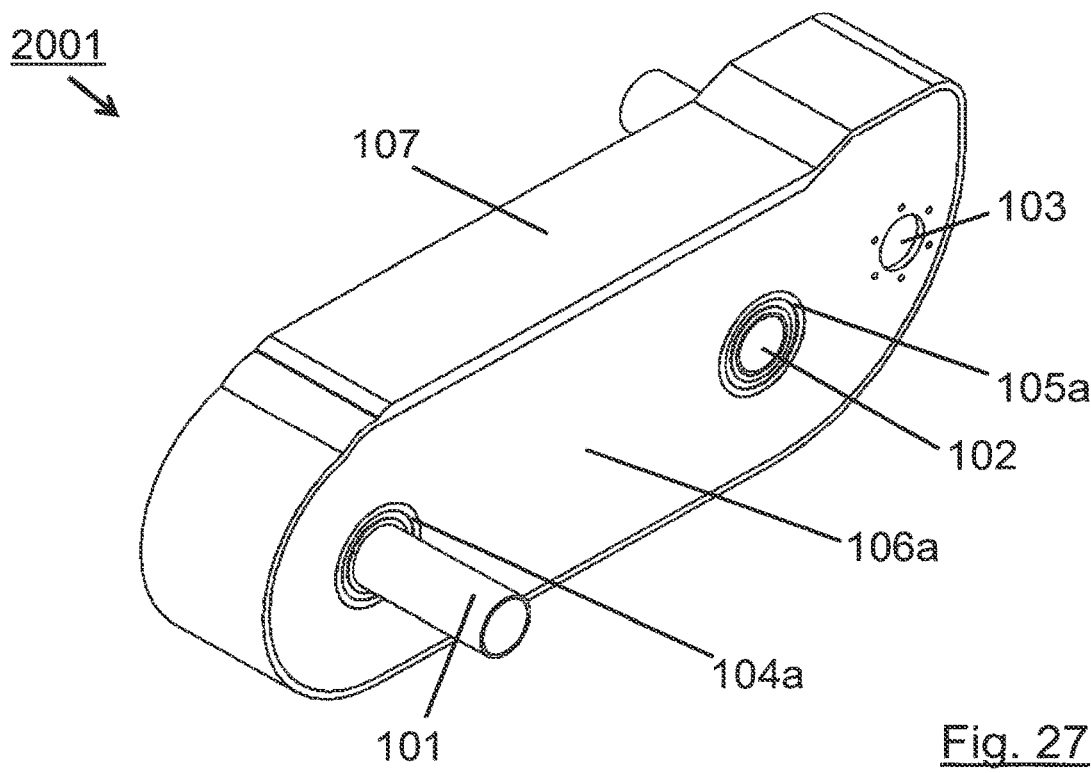
FIGS. 27-31 show different representations of the actuator 2001

FIG. 27 shows in a perspective view the actuator 2001 closed from the front, i.e. inside its housing.

Figure 28:
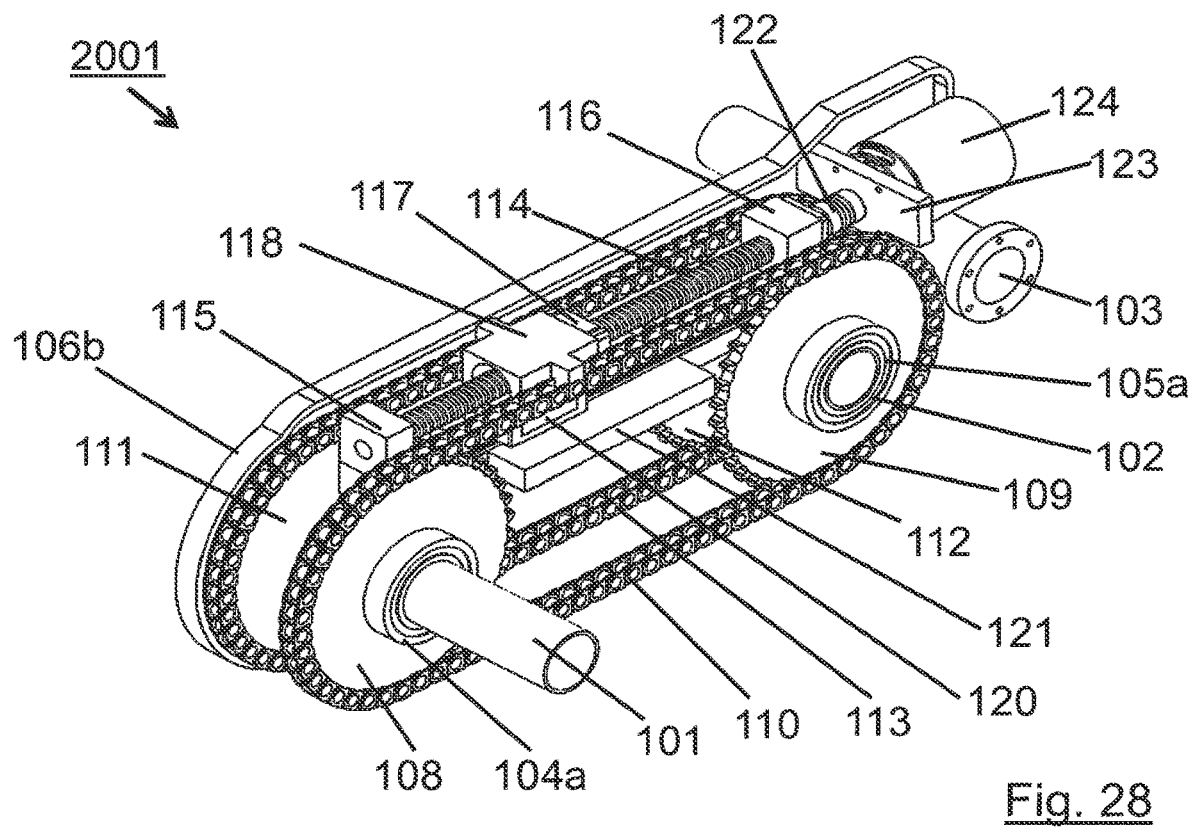

FIG. 28 shows the actuator 2001 from a similar perspective as before. Here, however, parts of the housing are removed, namely a front base plate 106a and a base frame 107.

Figure 29:
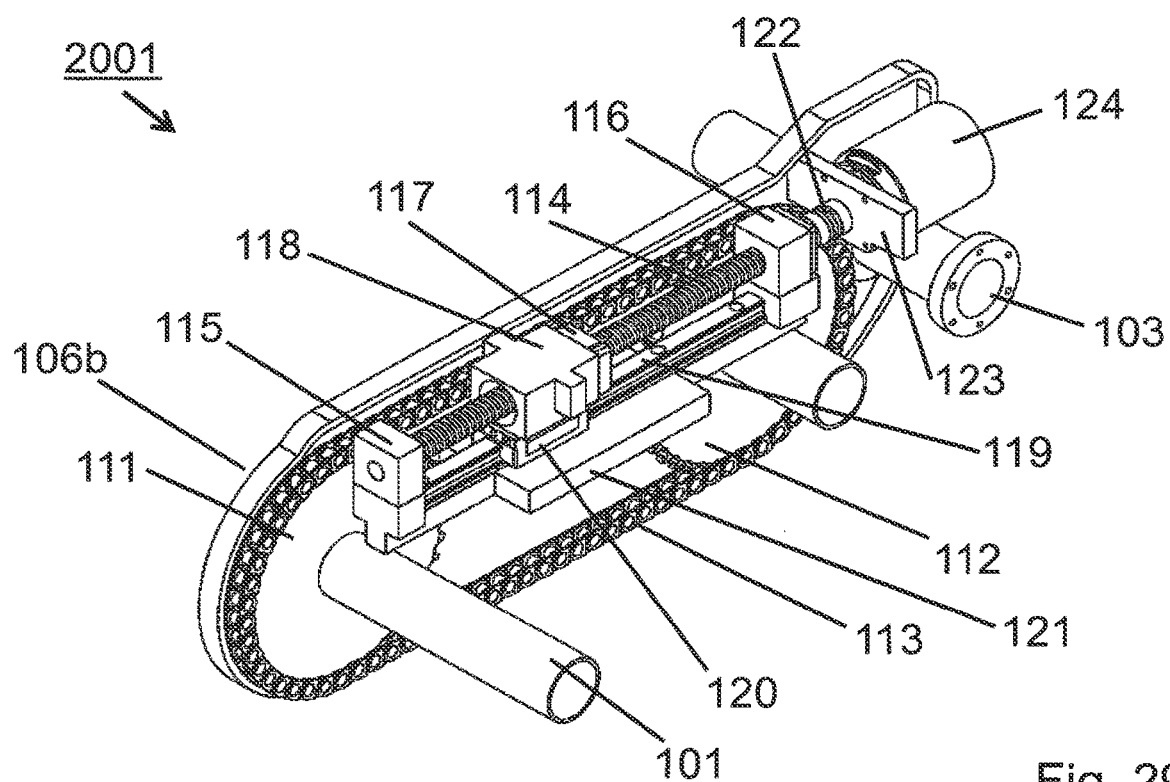

FIG. 29 shows the actuator 2001 in a similar way as before. Here a front chain 110 is missing as well as elements 108, 109, 104a and 105a, which concern their drive.

Figure 30:
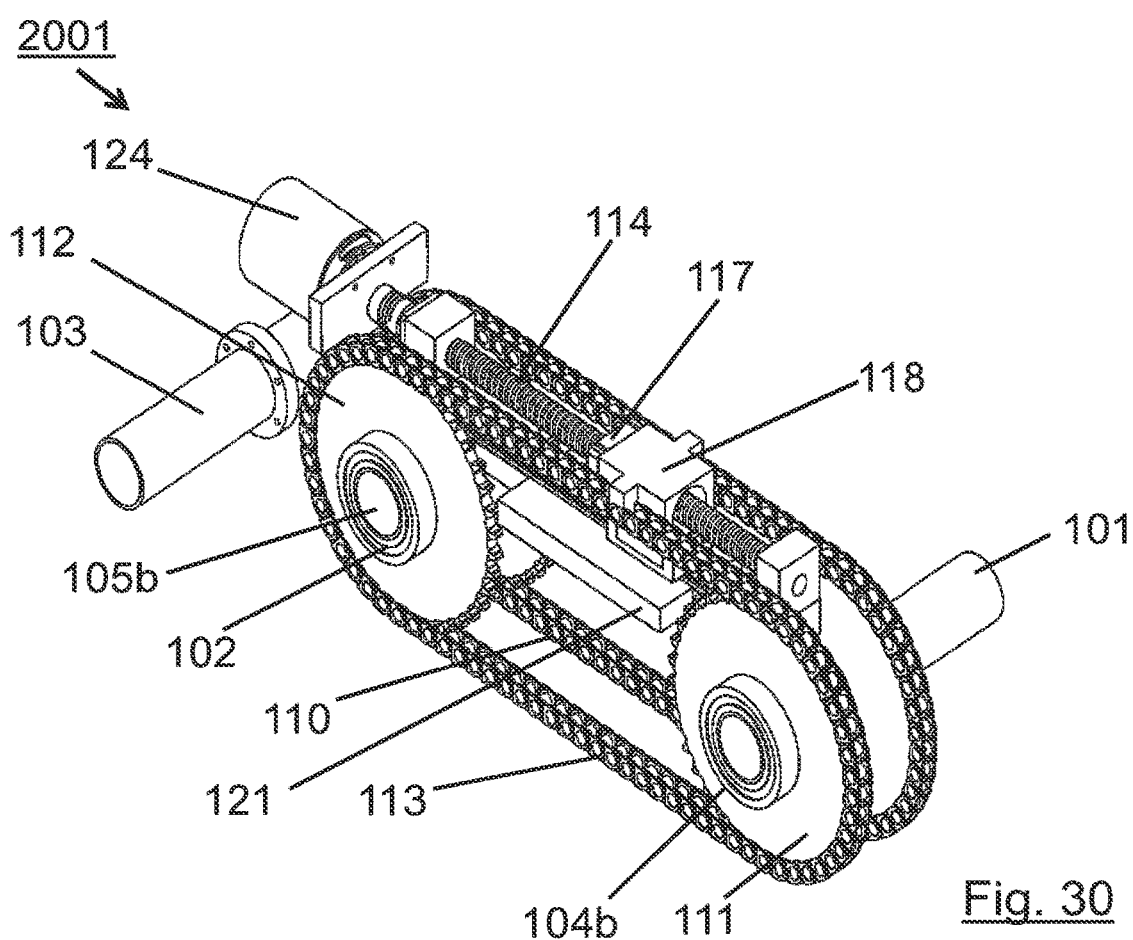

FIG. 30 shows the actuator 2001 in perspective view from the back, without housing parts.

Figure 31:
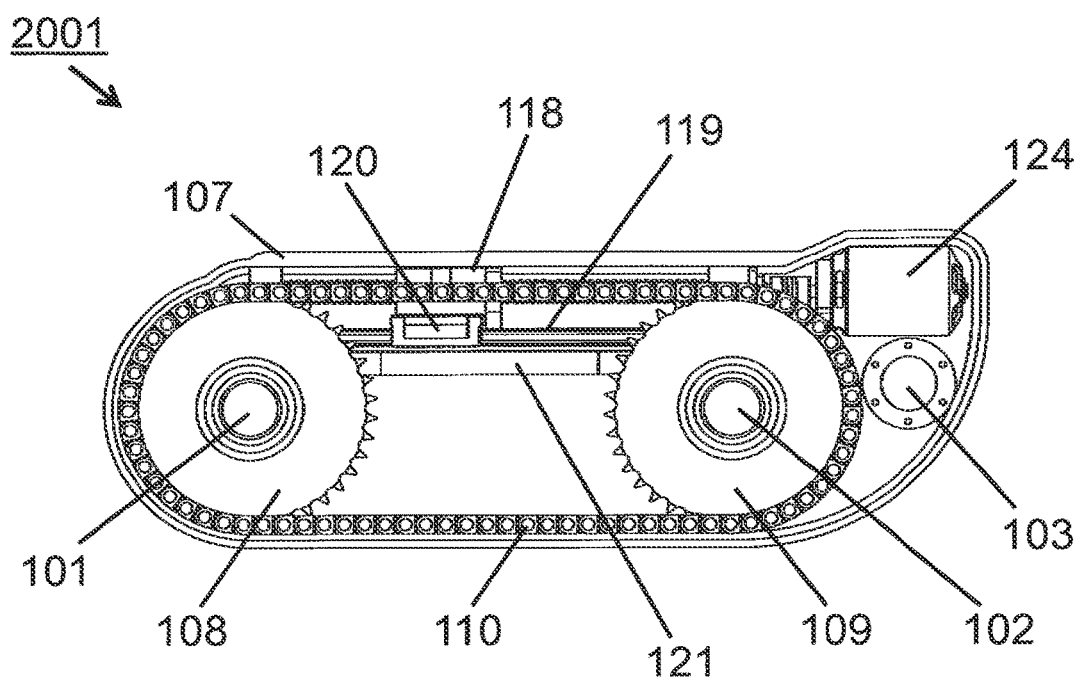

FIG. 31 shows the actuator 2001 in side view with the front view without the front base plate 106a.

The actuator 2001 has two parallel chains 110, 113, which run on one side of the actuator 2001 in a plane with a ball screw 114 and at the same distance to it. The actuator 2001 is designed in "integral construction", which means that the housing parts 106a, 106b and 107 perform the functions of the basis, i.e. structural functions. However, parts of this function are here also taken over by a linear guide support 121 and by the frame 123 of a motor 124, which are mounted in a force-locked manner to the base. A nut 117 is force-locked to a connecting block 118, which is mounted in a force-locked manner to chains 110, 113 by suitable means. This actuator 2001 has a dedicated driven shaft 101, a dedicated idler shaft 102 and a dedicated fixed shaft 103. Driven sprockets 108, 111 are connected to a driven axle 101 by suitable means, such as direct (welding, screwing) or indirect (hub, clamping set, spoke hub). The 101 axle and sprockets 108 and 111 can also be manufactured as a single component. The driven shaft 101 is connected to the base by suitable bearings 104a, 104b so that it can rotate around its axis but cannot shift. The dedicated idler shaft 102 is also mounted in the same way, by means of bearings 105a, 105b. The free-running sprockets 109, 112 are preferably mounted in a friction-locked fashion to the deflection shaft 102. However, the bearing arrangement can also be different, such as individually or together on an internal axis and not on an external axis as is the case here. It is also possible to dispense with the dedicated fixed shaft 103 (it is used to attach other actuators to the example actuator) and to provide other attachments. It is also possible to use the fixed shaft to support the bearings of the free-running axle or free-running sprockets (as e.g. in the actuator 2003).

In Actuator 2001, the sprockets and chains on one side can be dispensed with. Then, however, depending on the given load, considerable transverse torques can occur, which must be absorbed by the nut and linear guide. Basic elements, axles, bearings, etc. should then of course be adapted to the new geometry, as space and weight can be saved.

Figure 32:
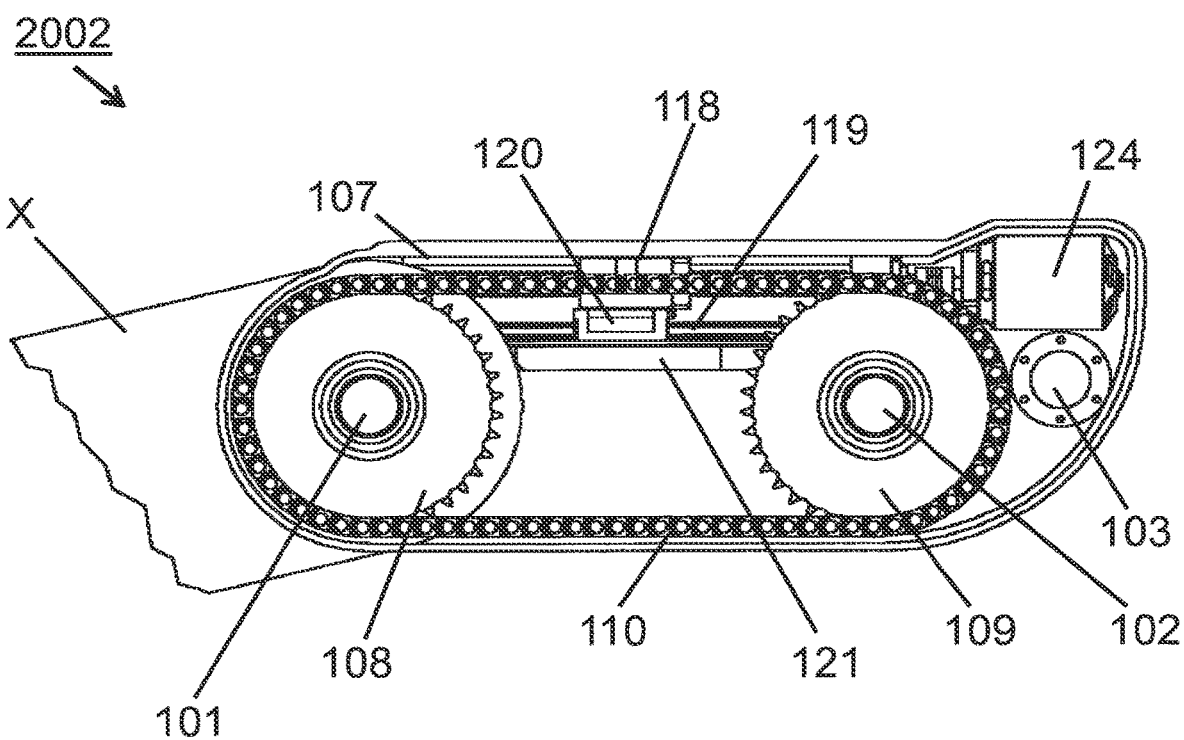
FIG. 32 shows a side view of actuator 2002

FIG. 32 shows a side view of an actuator 2002 for a second execution example. This actuator 2002 corresponds almost completely to the actuator 2001 described above. However, the driven axis is shorter here and the driven component X of an exoskeleton or robot is fastened to the driven axis inside the housing, using suitable space-saving means. The housing is modified accordingly. Variations as with the actuator 2001 are of course also applicable here.

Figure 33:
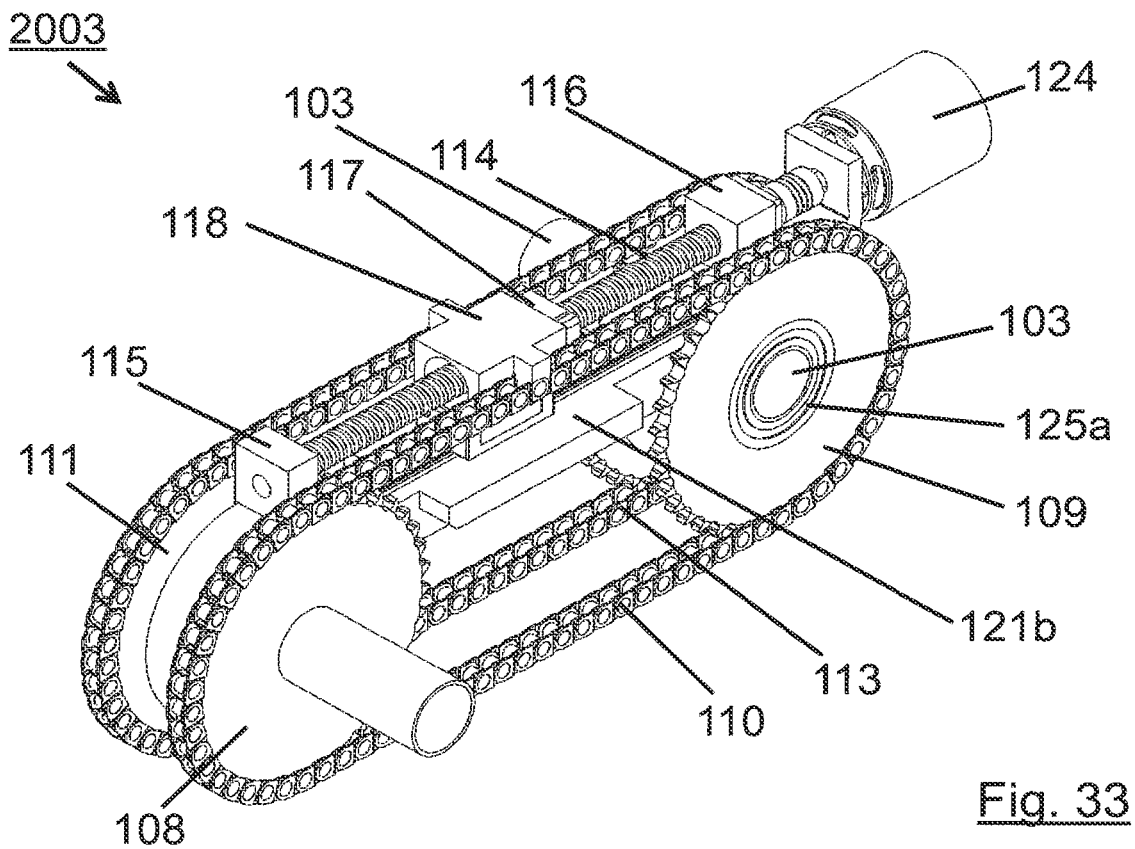
FIGS. 33-37 show different representations of the actuator 2003
Figure 34:
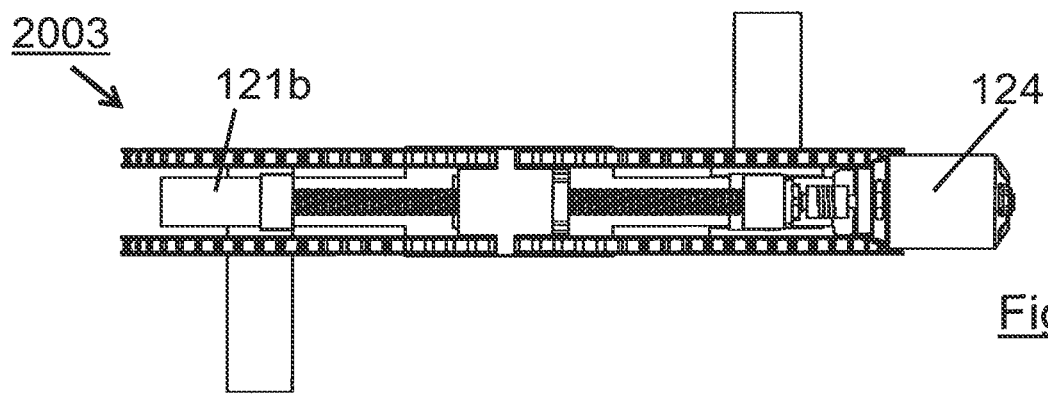
Figure 35:
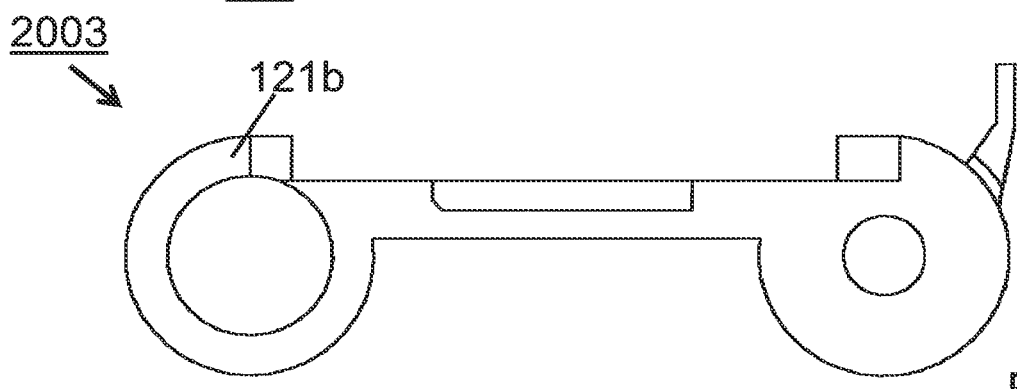

A third actuator 2003 after another execution example is shown in FIGS. 33-37. FIG. 33 shows actuator 2003 completely in perspective view, but without optional housing FIG. 34 shows the actuator 2003 from above, wherein a linear guide support 121*b* is particularly characterized which is combined with the base and which is separately shown in FIG. 35 as a side view.

Figure 36:
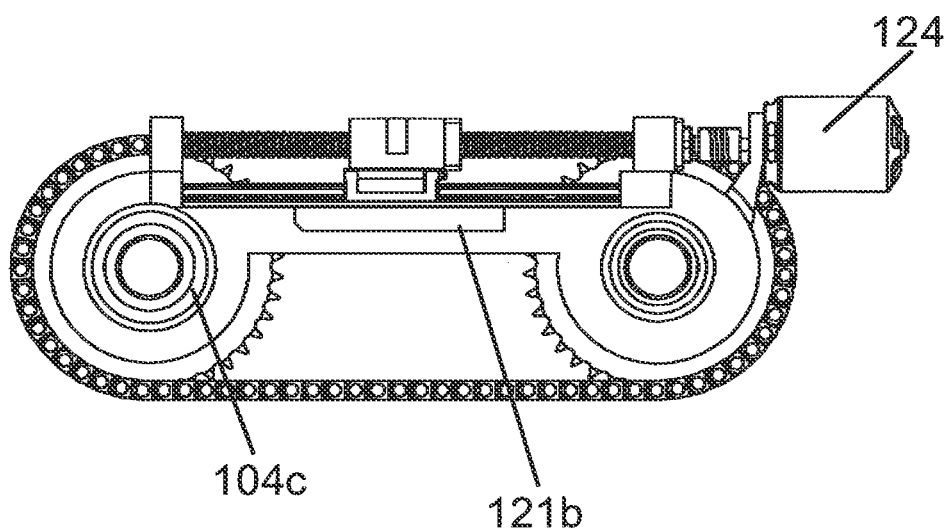

FIG. 36 shows a side view of the actuator 2003 without the front parts 108, 109, 110

Figure 37:
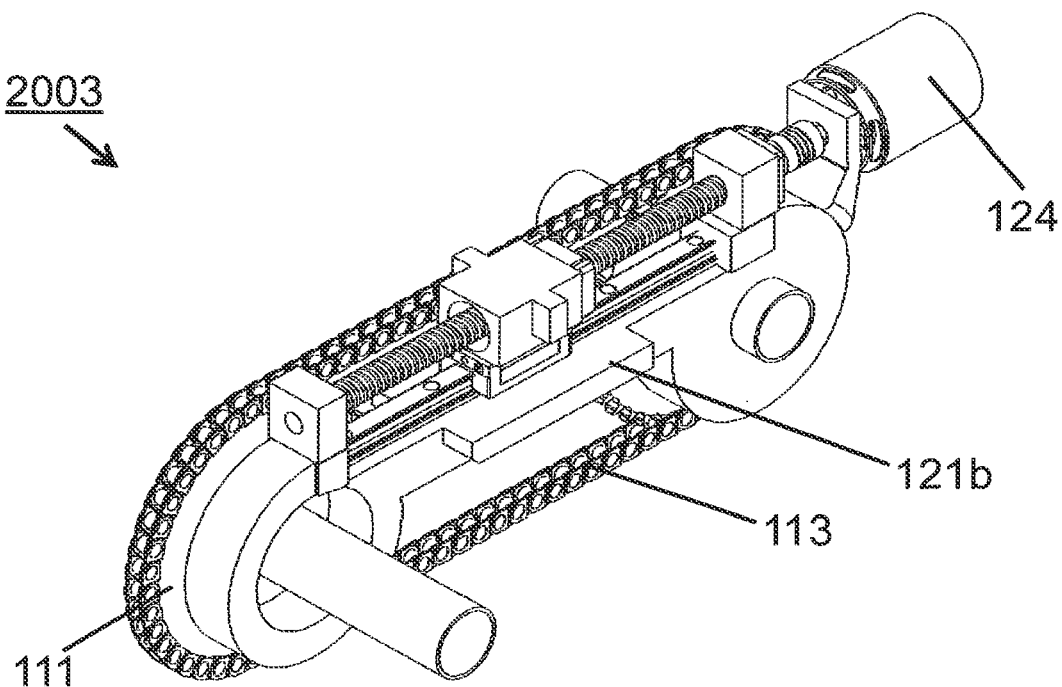

FIG. 37 shows a perspective view of the actuator 2003, but without the front parts 108, 109, 110 and without the bearings 104*c* and 125*a*.

The actuator 2003 is designed in "differential" design. So it does not necessarily need a housing. However, a suitable housing can be connected to a 121*b* linear guide support, which is combined with the base, to increase the load capacity. The linear guide support 121*b* combined with the base is now, in comparison to the linear guide support 121 shown above, designed in such a way that bearings and axles can also be attached to it. The actuator 2003 has a central bearing 104*c*, which carries the driven shaft and allows only the axial degree of freedom. The fixed shaft 103 is here firmly connected to the linear guide support 121*b*. The free-running sprockets are fastened to it with suitable bearings. This Actuator 2003 can of course also be implemented in such a way that a dedicated idler shaft and a dedicated fixed shaft are used, as in Actuator 2001. All shafts would then be mounted with 121*b* suitably connected, by bearing or fixed. Also the actuator 2003, like the actuator 2001, can be built in a one-sided variant, similar to FIG. 36 (without free, unused bearing and detail adjustments). All actuators shown here can be manufactured in integral or differential design.

A fourth actuator 2004 according to another execution example is shown in FIGS. 38-41.

Figure 38:
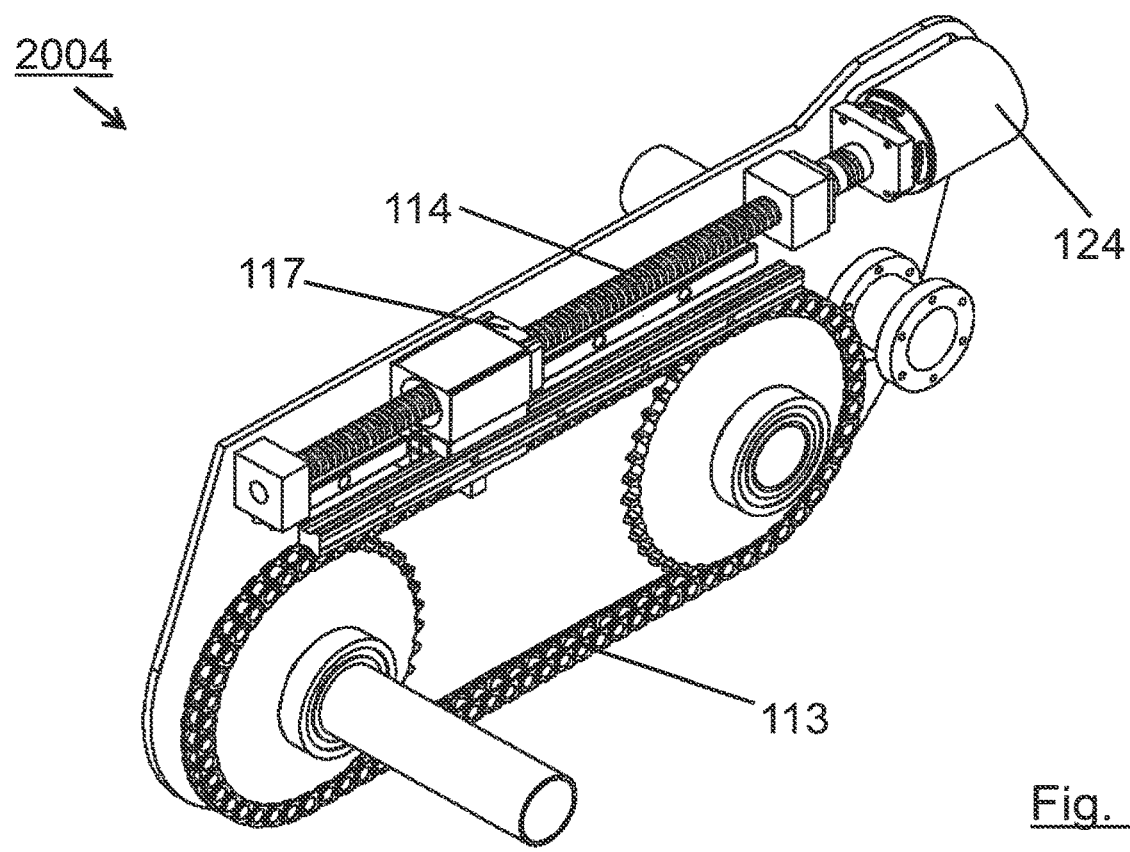
FIGS. 38-41 show different representations of the actuator 2004

FIG. 38 shows a perspective view of the actuator 2004.

Figure 39:
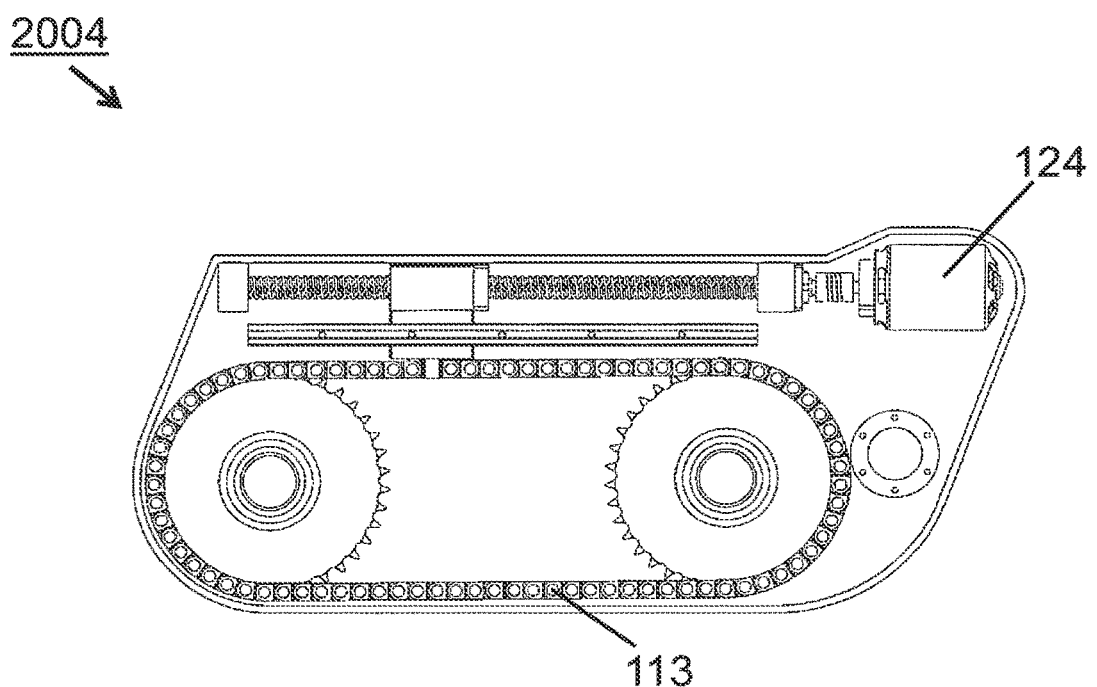

FIG. 39 shows a side view of the actuator 2004 without the front base plate 106*a*.

Figure 40:
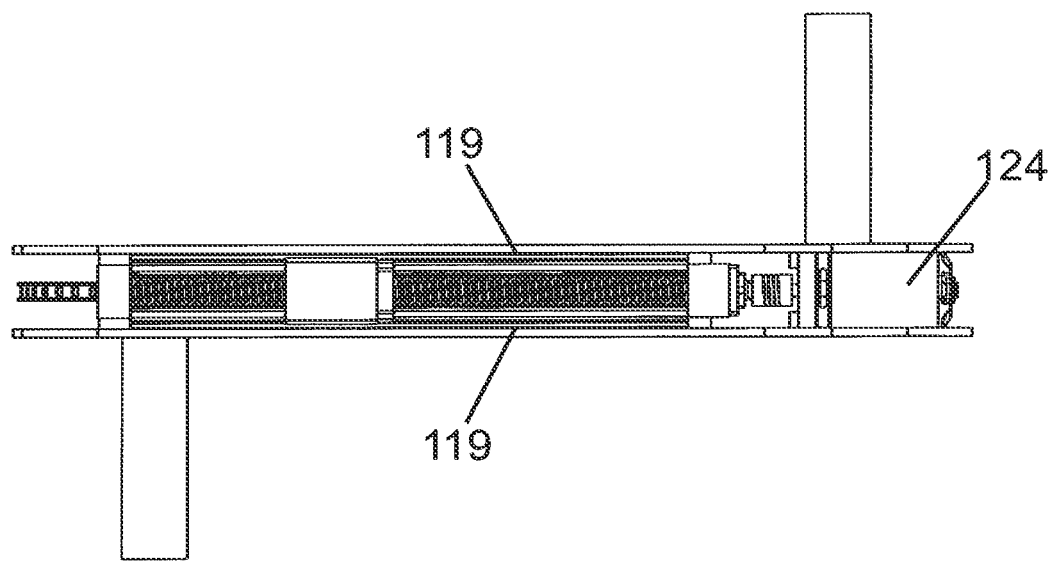

FIG. 40 shows a top view of the actuator 2004 without base frame 107.

Actuator 2004' is a modification of Actuator 2004 with only one linear guide.

The 2004 actuator demonstrates a space-saving design with only one chain marked 113. The two linear guides 119 are attached directly or indirectly to the chain 113 by suitable means. They are attached here above the chain 113. The double arrangement doubles the load capacity without affecting the length. Due to their position, the linear rails 119 can be significantly longer than the straight section, and therefore longer carriages or double carriages can be used at greater distances from each other. All this increases the load capacity for torques. Although the ball nut 117 of the recirculating ball screw 114 must absorb considerable torques, since it is firmly connected to the bearings of the linear guide by suitable means, these torques have little effect on operation. In a variation 2004' this actuator can also be operated with only one linear guide 109 (FIG. 41), if the associated limitations are accepted. Nut, linear guide carriages or carriage and connection block can also be manufactured as one component. The bearings of the ball screw are directly or indirectly connected to the base by suitable means, in the illustration with the base 108.

Figure 42:
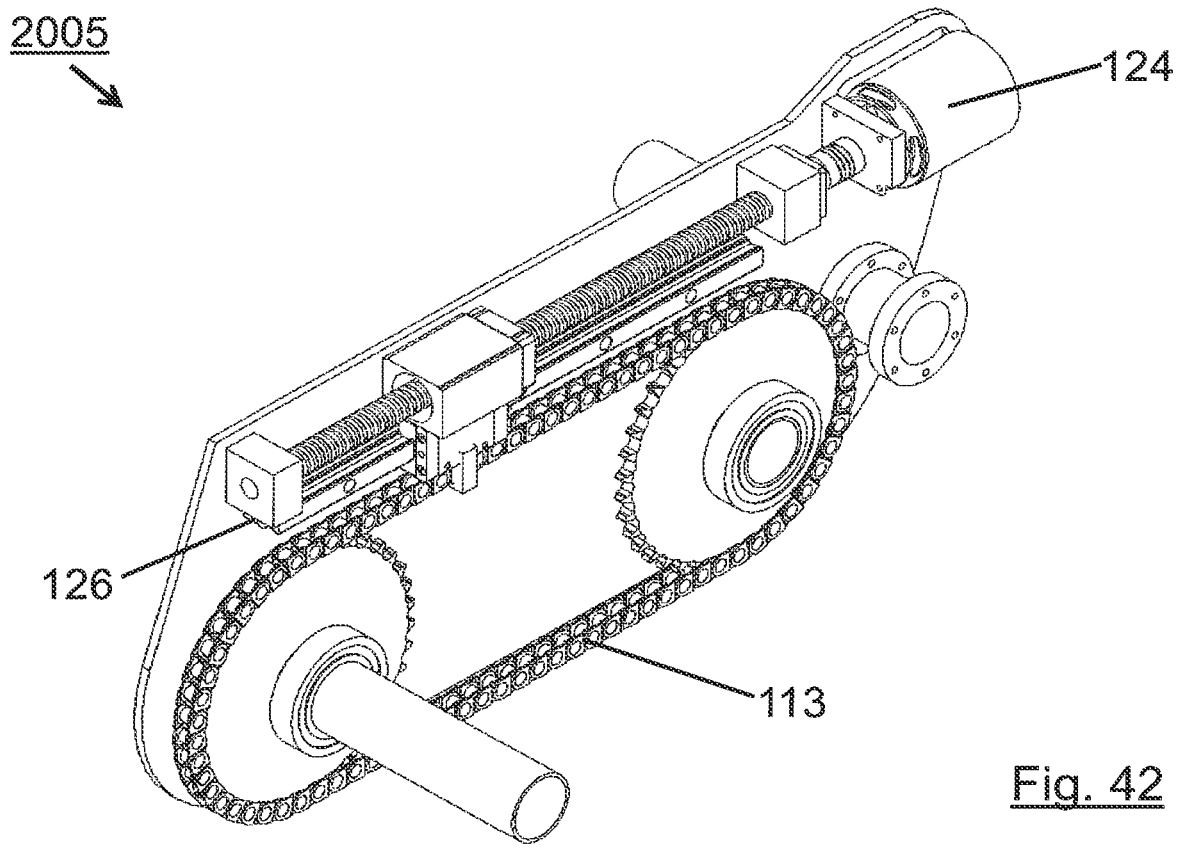
FIG. 42, 43 show different representations of the actuator 2005
Figure 43:
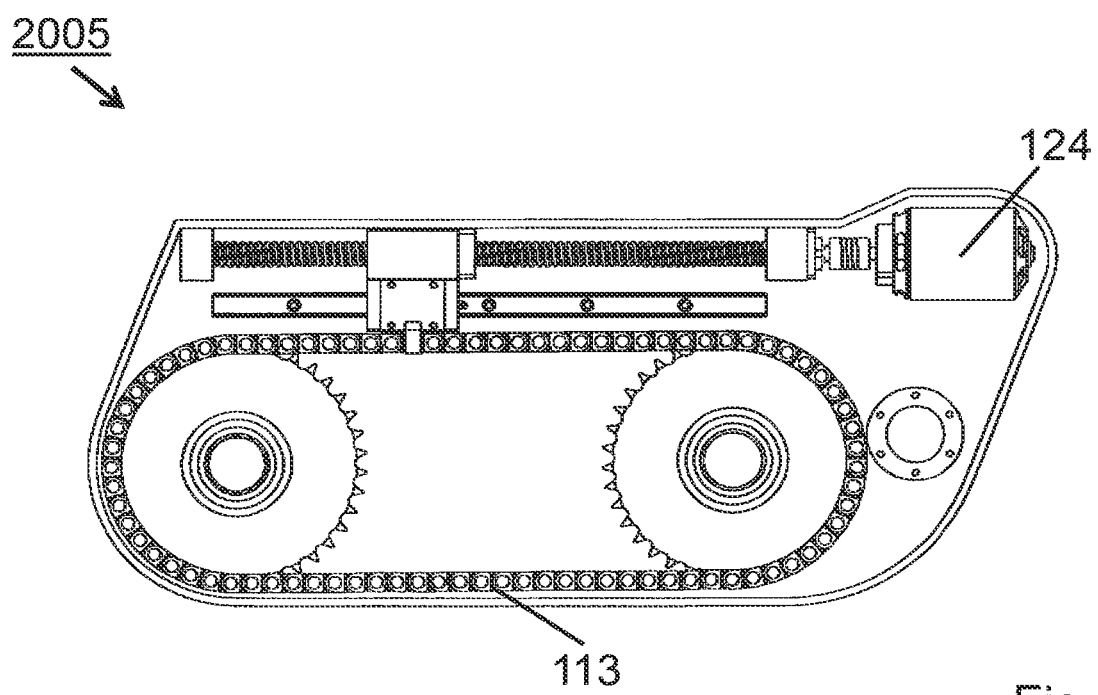

A fifth 2005 actuator after another execution example is shown in FIGS. 42 and 43.

FIG. 42 is a perspective view on actuator 2005 and FIG. 43 is a side view.

Figure 41:
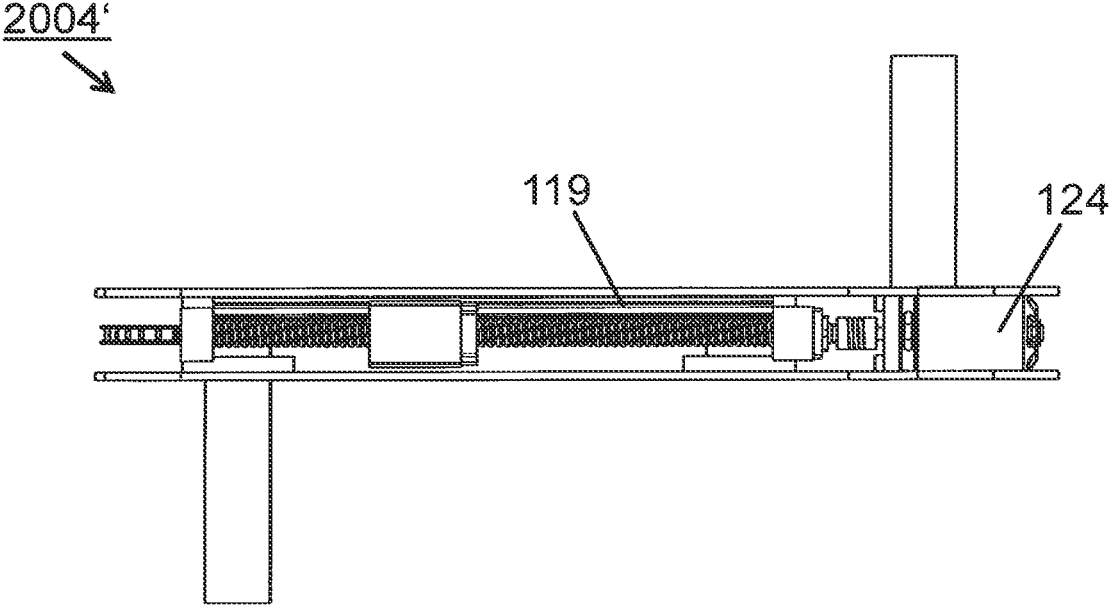

The actuator 2005 corresponds to the actuator 2004' with only one linear guide (see FIG. 41). The chain 113 is attached directly or indirectly to the linear guide carriage. Here, the linear guide is preferably moved in a plane with the chain 113 and the ball screw so that the torques along a transverse axis become practically zero. This case is not fully realized in FIG. 42 for drawing reasons, since the center of the recirculating ball bearing guide of the linear rail is not in the plane of the chain center and the axis of the ball screw plane. For this purpose, the spacer 126, which is firmly connected to the base and the linear rail or can be part of it, would have to be slightly thicker. As can be seen, the base/housing can partly be designed even narrower. Of course also here a differential construction can be chosen. You are also free to choose between exclusively dedicated axes or non-dedicated axes. Linear rail and ball screw can change places here (as with the 2006 actuator described below). Then the chain 113 is attached directly or indirectly to the nut of the ball screw. In such a design, however, the effects of torque on the nut and linear guide are greater.

Figure 44:
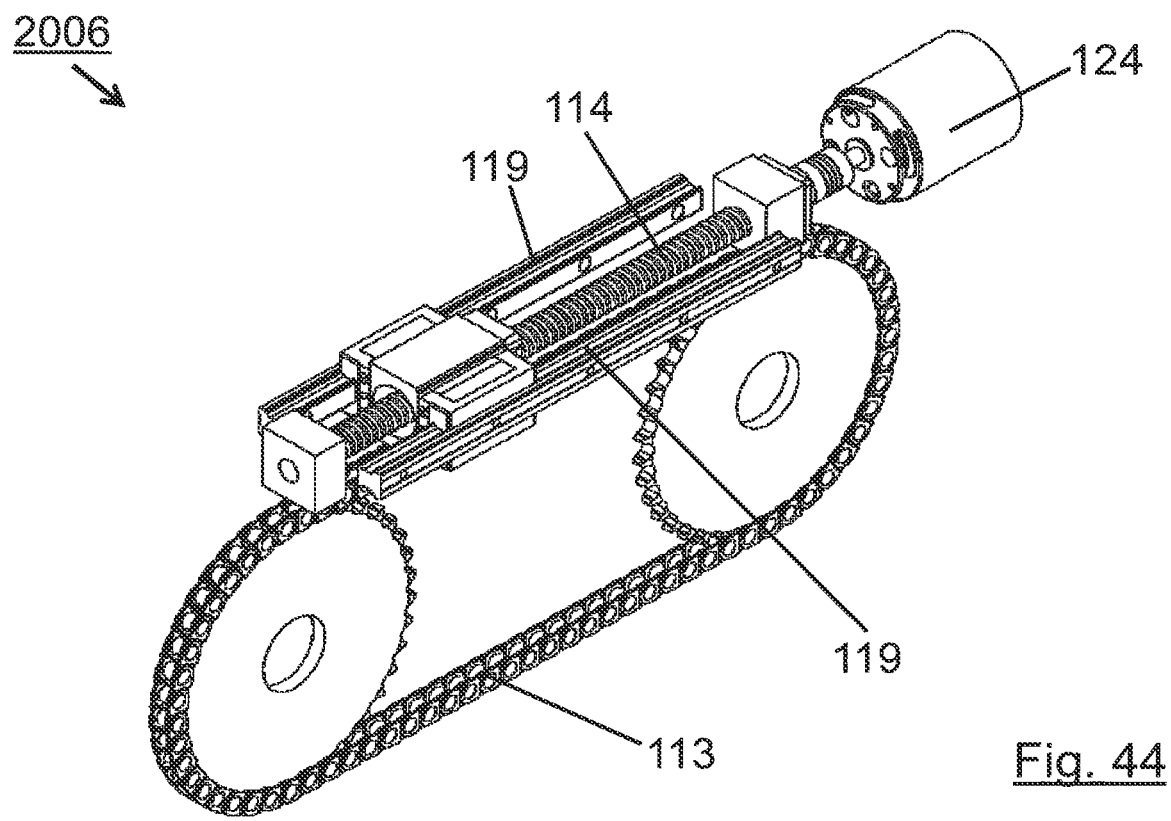
FIGS. 44-46 show different representations of the actuator 2006
Figure 45:
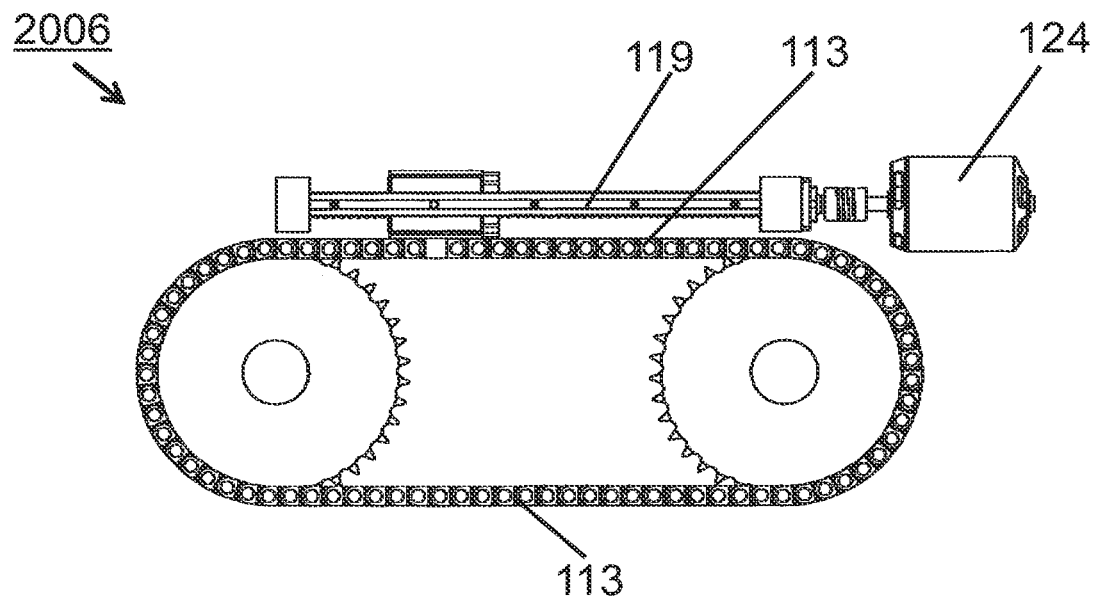
Figure 46:
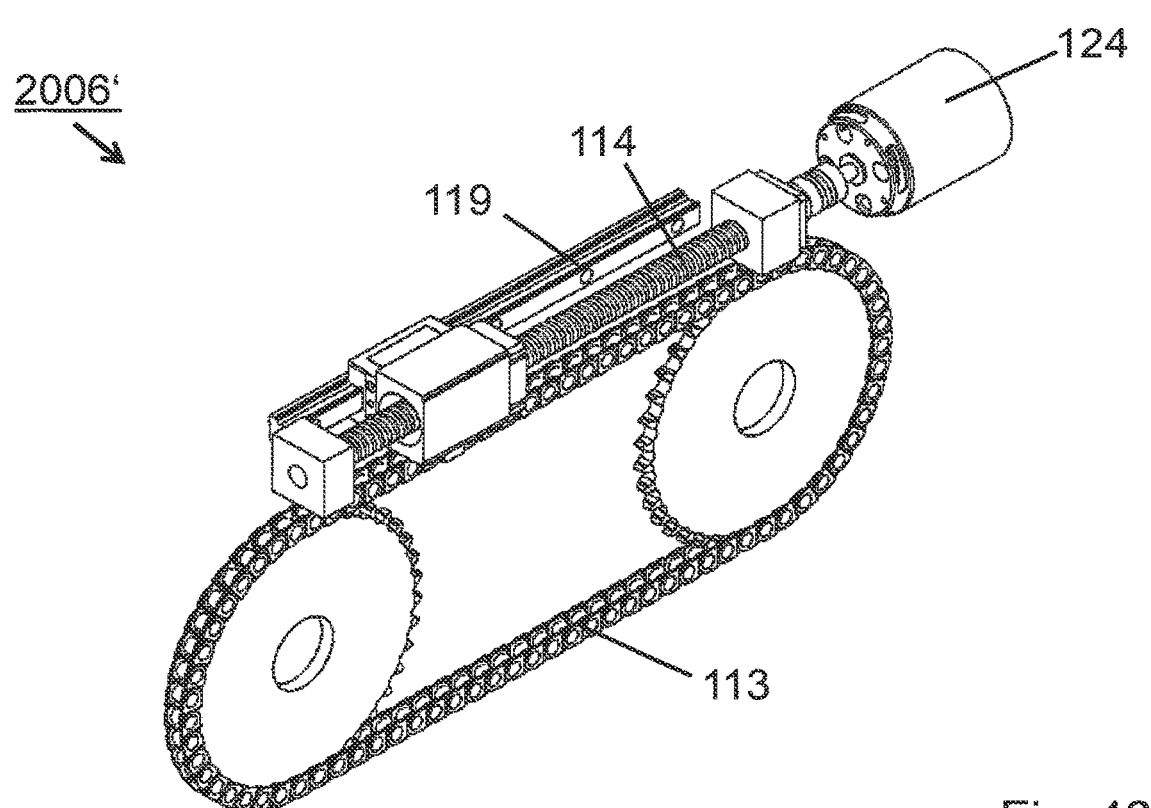

A sixth actuator 2006 after another execution example is shown in FIGS. 44 to 46. FIG. 44 is a perspective representation on actuator 2006 and FIG. 45 is a side view. Furthermore, FIG. 46 shows an actuator 2006' with only one guide rail 119.

In the actuator 2006 or 2006', one or two linear guides 119 run approximately parallel to the ball screw 114, which is led close to the chain to reduce torques. All parts are suitably connected to the base and axes corresponding to the other examples.

Figure 47:
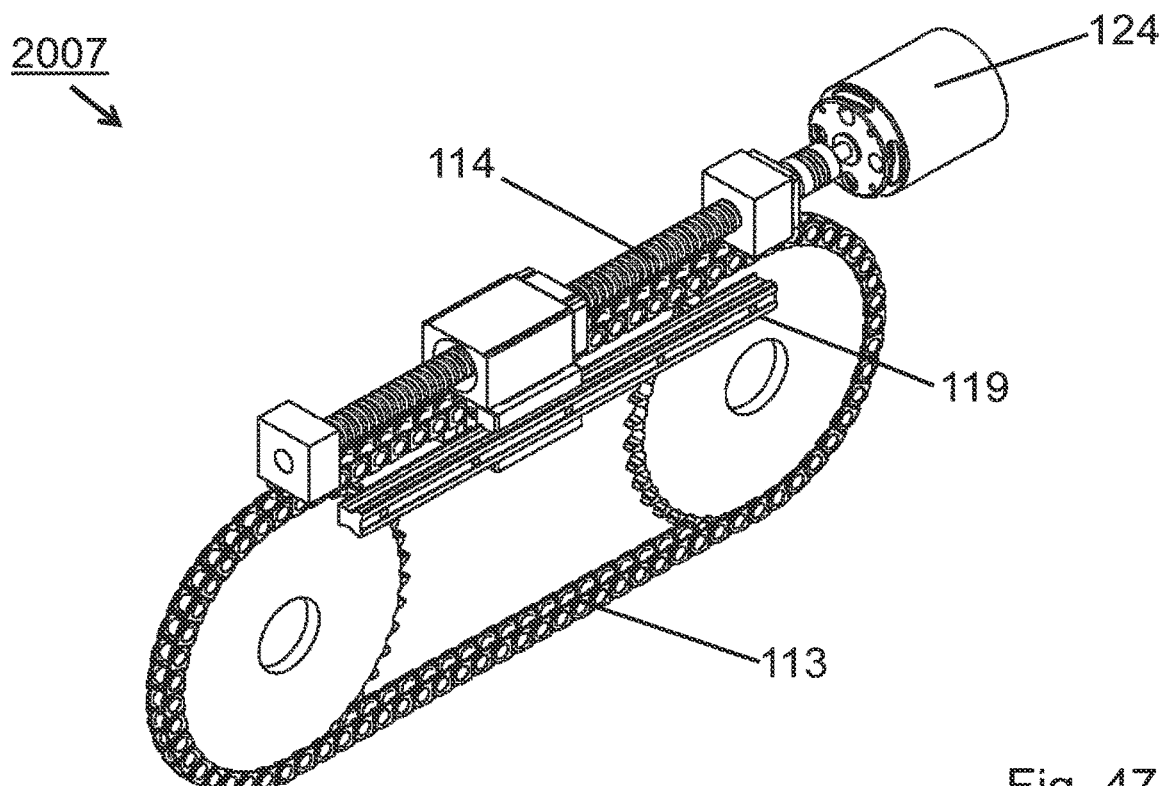
FIGS. 47-49 show different representations of the actuator 2007
Figure 48:
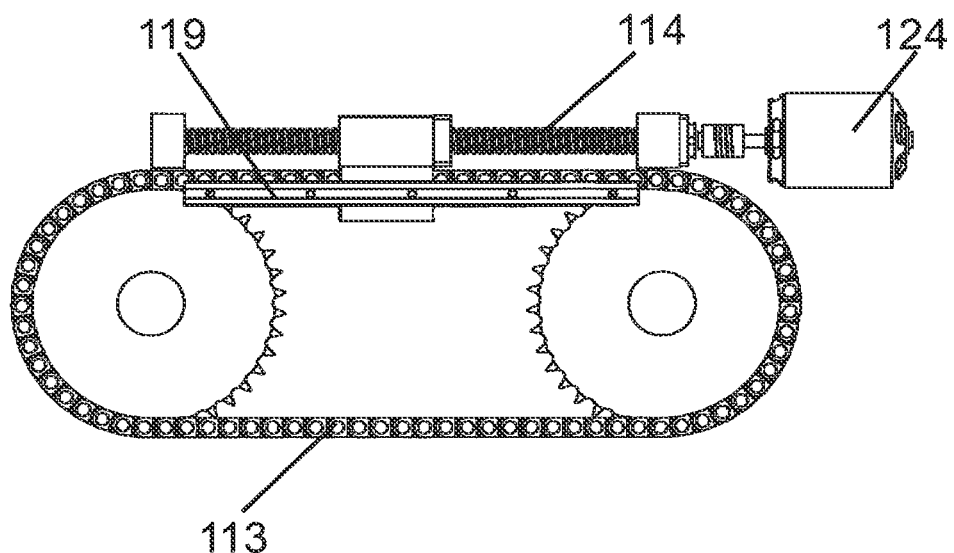
Figure 49:
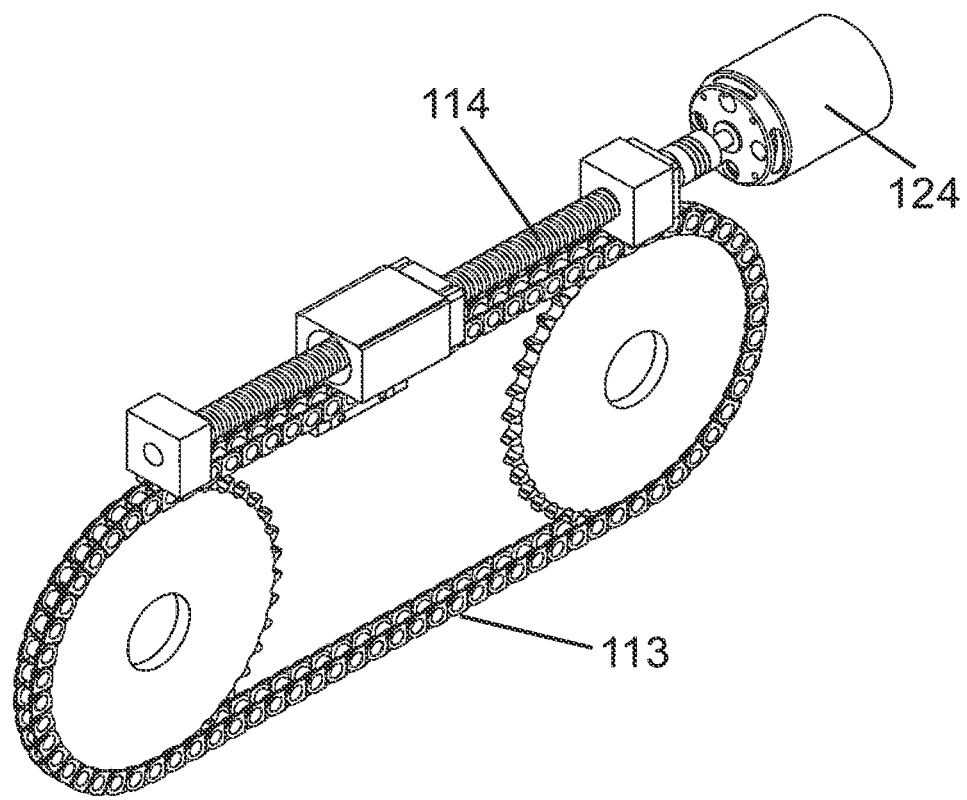

A seventh actuator in 2007 after another example is shown in FIGS. 47 to 49. FIG. 47 is a perspective representation on actuator 2007 and FIG. 48 is a side view. FIG. 49 also shows an actuator 2007' with only one guide rail 119.

In the actuator 2007 or 2007', one or two linear guides 119 run below the ball screw 114, which is led close to the chain 113 to reduce torques. All parts are suitably connected to the base and axes according to the other examples. This saves space compared to actuator 2006.

Figure 50:
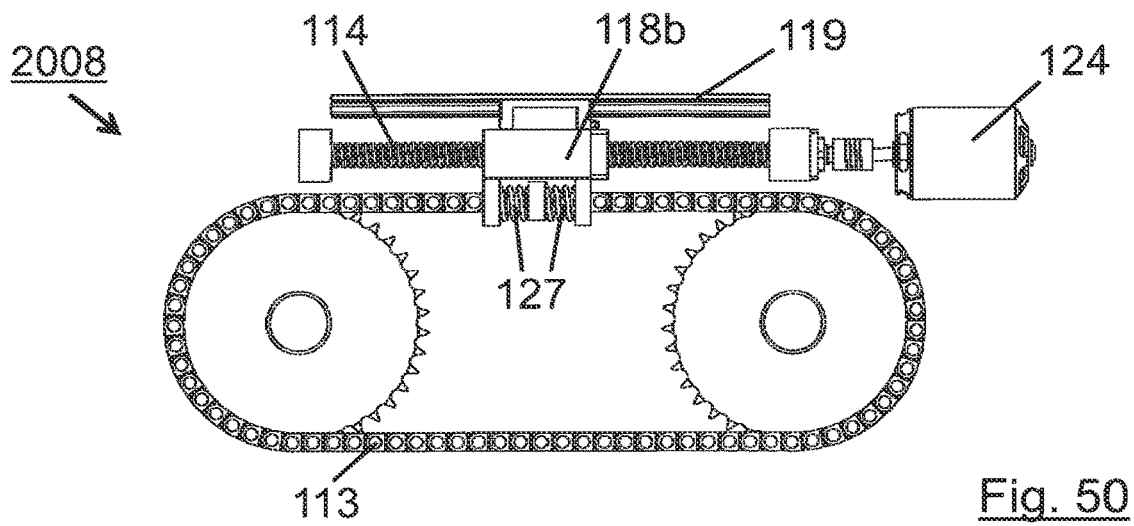
FIGS. 50-52 show different representations of the actuator 2008
Figure 51:
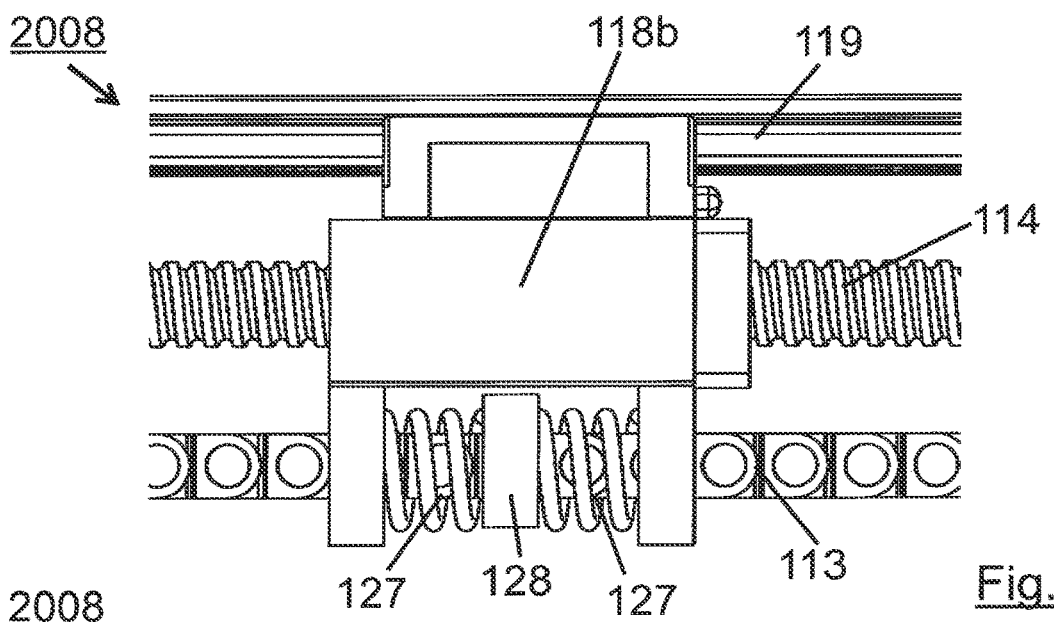
Figure 52:
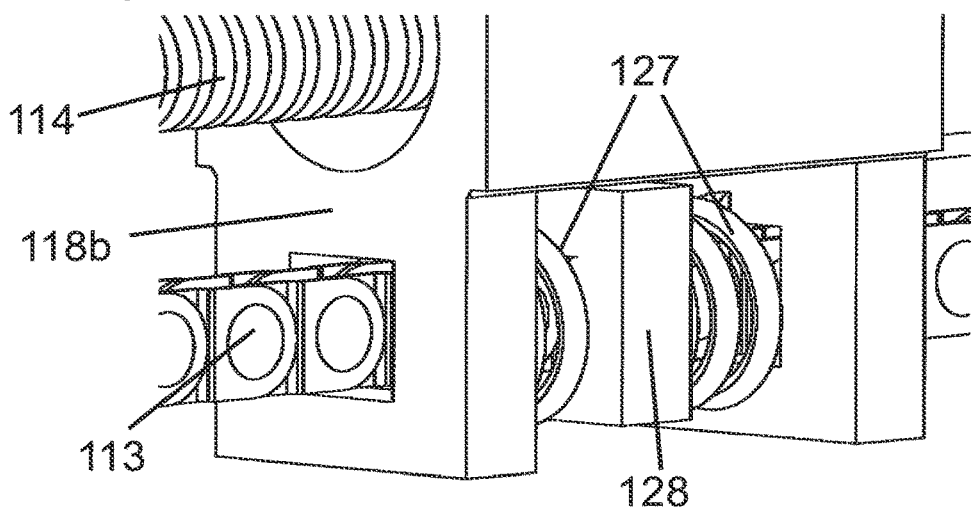

All these actuators can be converted to serial elastic actuators by known means, especially known spring elements and their coupling to ropes, rods, axles, etc. An example of this is an actuator 2008, as symbolically indicated in FIGS. 50-52. Elements not shown here are to be supplemented according to the previous examples. The decisive factor is that spring elements 127 are preferably fitted coaxially to a section of the chain 113. The coaxial fixing makes the guidance of the springs 127 unnecessary or very simple, since there are hardly any transverse forces. The two springs 127 are connected here on each of their sides with a connecting block, which has abutments and is marked 118*b* here. On the other side they can either be connected directly to the chain 113 or, as shown in FIGS. 50-52, with a chain-spring connection element 128. This is connected to the chain 113. Disc springs, leaf springs, elastomers, cush drives, etc. can also be used as springs. The use of these elements also reduces negative influences due to the polygon effect. The chain 113 can also be attached as before to a nut or linear carriage etc. and the springs can be part of the chain. An associated spring mechanism may also be coaxial with the ball screw as part of the connecting block. This is particularly easy to implement if the ball screw is loaded axially only, since there is no need for additional strong guides for the springs. As known, the spring can also be a torsion spring of the driven shaft or a hub mounted there (which in turn holds the driven sprockets). The driven axis can also be attached to a torsion spring to which the next driven element of the robot is attached. The torsion spring can also be part of this next element of the robot. In FIG. 51, 52 an element 128 is connected to the chain and the springs with two sides of element 118*b*. The chain 113 must be passed through 118*b* here. The structure can also be reversed, where 128 becomes part of 128*b*, and the spring holders of 118*b* are connected to the chain and one spring each, or the springs are directly integrated into the chain and the chain is driven between the springs.

Figure 53:
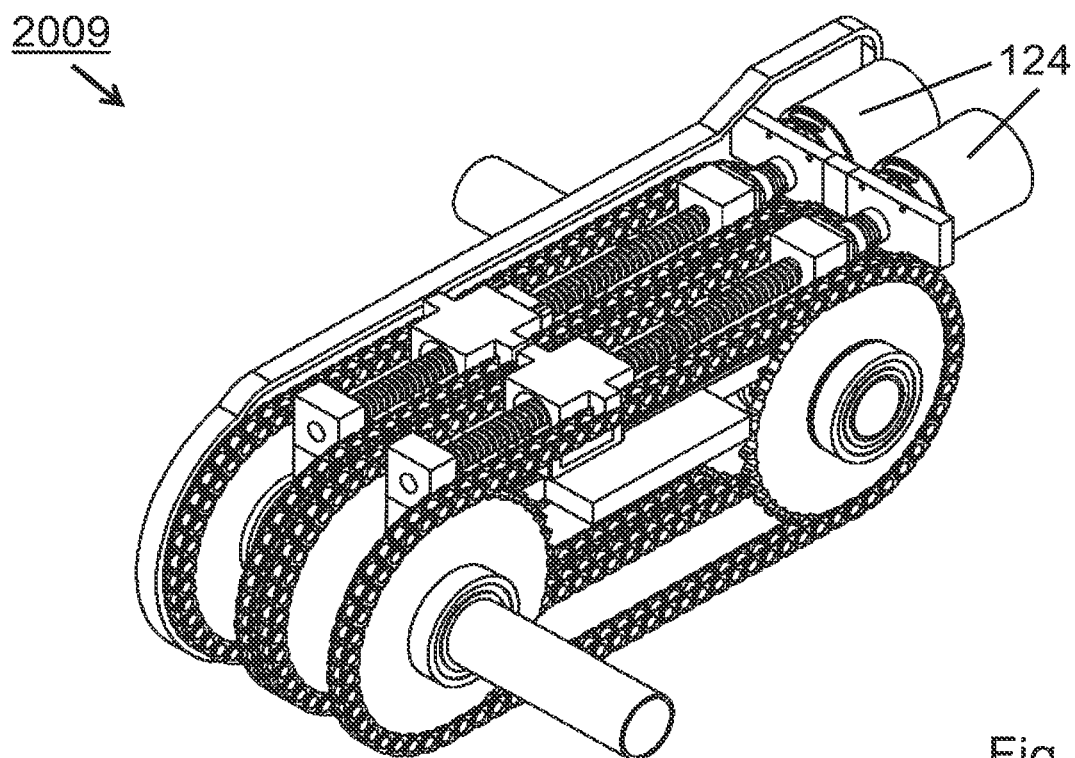
FIGS. 53-54 show different representations of the actuator 2009
Figure 54:
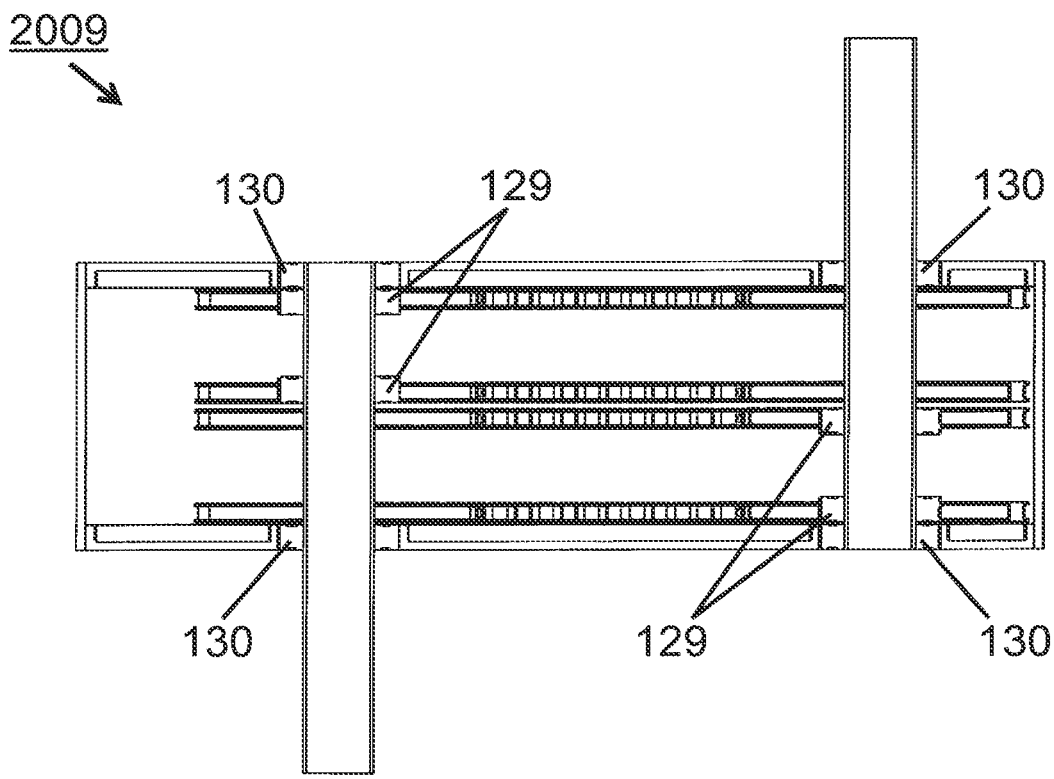

It is generally advantageous to attach not only the drive or actuator for the third axis 95, but also for the fourth axis 96 (knee joint) to the exo-thigh 86 (or to the thigh of a humanoid robot). These two actuators can be stacked on top of each other. However, it is preferable that they share the axles for driven wheels and pulleys. A driven axle then holds the bearings for the deflection rollers of the other axle. FIG. 53, 54 is an example of a suitable actuator for 2009 in which bearings 129 for a freewheeling sprocket and bearings 130 for axles are also shown. It should be noted that the principle of Actuator 2009 can be applied to all other actuators presented and implied here. It is preferable to install a torque sensor, such as a suitable sensor hub, between the bearings of the idler pulleys and the axles. This allows residual torques of the idler pulleys rotating relative to the shaft to be measured and used to correct measured main torques of this shaft. Preferably, the free-running sprockets are not mounted individually as shown in the picture, but are first mounted on a common axle, which is then mounted opposite the coaxial driven axle. It is also possible to measure axial torques acting on the driven shaft at various points, e.g. by means of strain gauges, and thus separate individual influences on the shaft. It is of course also possible to integrate actuators with multiple bases of differential or integral designs in one housing.

Another arrangement of the actuator provides that the driven shaft drives a Bowden cable mechanism. For this purpose, e.g. suitable pulleys are preferably fixed directly at this shaft, or the rope is wound directly around the shaft. The shaft or rollers may have suitable cable guides/grooves. Several ropes can be used, each for the same or opposite direction of pull. The rope or ropes can be anchored to the axle or pulley by known means to ensure the transmission of force. Bowden cables can be used to route the ropes in such a way that one or more additional pulleys or axles are driven at remote points. Here, too, known means can be used again, such as spring-loaded Bowden cables or spring-loaded rollers, to achieve the properties of an ordinary serial elastic actuator. The pulley diameters of the Bowden cable mechanism can now be used to further influence the gear ratio by known means. It is also possible to transmit the power via ropes, but without Bowden cables, but only via pulleys and corresponding means.

Similar to the Bowden cable mechanism, two "hydraulic-rotary transducers" (HRT) can also be used. One HRT on the actuator is rotatably driven by the driven shaft and generates pressure and underpressure in the two connected pressure lines. At the remote HRT, this causes a corresponding movement of the actuated joint. This has the advantage over Bowden cables that lower losses occur and the system reacts less flexibly.

The free-running sprockets, rollers, cylinders, etc. are always shown here in such a way that they have the same diameter as the driven sprockets, rollers, cylinders, etc. However, they can have different diameters. In addition, several small free-running idler pulleys can be used. This allows, for example, the available stroke to be increased, the path of the chain, rope, etc. in the housing to be influenced in such a way as to create axes for further shafts or devices, such as power electronics. The free running rollers (etc.) can also be replaced by alternative deflection elements such as slide rails, Bowden cables, Teflon guides, channels in the base, etc.

Usually suitable tensioning devices are necessary to pre-tension chains, ropes, belts, etc. These can preferably be mounted on the side of the actuator that is opposite of the ball screw or integrated into the support of the axes in order to slightly change the distance between the axes. These means may include spring elements.

An advantage of all described actuators is that they have a constant gear ratio from motor to driven axis. Especially for joints which have to be actuated over a large angular range this can be advantageous. This makes it possible to build robots and exoskeletons that are more articulated than before. Also, the position of the actuator in the exoskeleton or robot does no longer directly influence the previously angle-dependent transmission ratios. This simplifies the design process.

A further advantage of the mentioned execution examples is that almost the entire length of an actuator is now available as the usable travel range of the ball screw. This permits larger actuating angle ranges with constant diameters of the rollers of the driven shaft. Conversely, larger roller diameters and thus larger power transmission ratios can also be achieved. This can reduce the number of actuators and/or motors in robots and exoskeletons and/or increase strength or power.

A further advantage of the design examples mentioned is that the chain is always mounted close to the guided nut. This reduces oscillations and uncontrolled elastic behaviour. In addition, the actuation is completely identical in both directions; and do not show a stable traction behavior in one direction and an unstable push behavior in the other. This increases the controllable forces and speeds.

It is possible to replace the ball screw and the brushless DC motor with a linear motor (such as a linear, electric, brushless motor or piezo actuators). The high response time of this drive can be advantageous. It is also possible to stack several linear motors and have them drive a chain, ropes, etc. together, thus making use of the available volume to enable high forces and power.

It is also possible to integrate electrical or mechanical brakes into the actuators. This is preferably done directly on the motor. Because low braking torques there result in high braking torques on the driven axle.

All actuators can be equipped with obvious means with position encoders, angle encoders, torque sensors and limit switches. Cables are preferably routed from one actuator to the next through the shafts. For this purpose, openings may be provided in the shafts for inserting and removing cables.

For this purpose, openings may be provided in the shafts for inserting and removing cables. All actuators can be realized with chains, ropes, belts and suitable deflection and tensioning devices.

The actuators can also be used for other robotic systems, or any other application requiring high torque transmission. In order to achieve greater forces, two ball screws can also be used, each of which has the means described to attach a common chain. The spindles are then located on opposite sides of the sprockets (e.g. mirrored on the plane of the axis of the driven axis and the free axis) and each drive a different straight section of the chain. The nuts then drive the chain in the same direction of rotation, but in the opposite direction in space. If there are several straight sections of the chain, if there are several rotating wheels or driven wheels, more than 2 spindles, motors, etc. can also be used. Likewise, several spindles can drive parallel mechanisms, each of which drives a common drive shaft. This corresponds approximately to the illustration in FIG. 53, 54, except that there is only one driven shaft which is driven by all chains, motors and spindles etc. The storage would have to be adapted to this situation.

In order to achieve unlimited actuating ranges, it can be provided that, for example, in a system with 2 ball screws which drive a common chain, only one spindle at a time must engage in the chain with suitable means in order to perform work. The other spindle can then retract the connected nut and chain gripping mechanism, engage the chain, and begin to perform work or exert force. Then the other gripping mechanism can release itself from the chain, move to its new starting position, grip the chain and start performing work on the chain, or exert force. This procedure is similar to turning a steering wheel with two hands, where only one hand is needed at a time to keep control of the steering wheel. The torques, forces, speeds and/or positions on the chain must be precisely controlled, especially when engaging and disengaging, so that no discontinuities occur. Similar mechanisms can again be realized with ropes or belts. The design of suitable actuators and gripper profiles for gripping and holding chains etc. is obvious (e.g. rope clamps, cableways), pliers with tooth profiles on both sides. Also several ball screws can be used in parallel (similar to FIG. 53, 54, but with only one driven axis) to drive a common shaft. However, also here the structures can be designed in such a way that they can engage and disengage in the chains, etc., and thus arbitrary axial travel of the driven axis can be achieved. Likewise, the sprockets, axles, hubs, etc. can be equipped with coupling mechanisms. Then the chains can remain connected to the nuts/ball spindles and the sprockets or shafts can be decoupled and retracted before being operated again in drive direction and engaged to perform work or generate forces. The principle of engaging and disengaging drives of several rotating ball screws can also be applied to actuator examples with only one-sided chain loading. Then such an actuator, with two driven sprockets and two ball screws, is not or not substantially larger than an actuator with chain loading on both sides. Here it is also possible to use only one chain (or structure of phased chains), which is driven from one side each by a nut and ball screw. Here it must be prevented that the gripping mechanisms collide, if one is decoupled and driven back.

Exoskeletons for the teleoperation, i.e. to control governors in a virtual (avatars) or real environment (humanoid robots), use motion simulators to exert static or time-varying body accelerations on the user. Gimbal suspensions are also used for this purpose.

The following figures describe preferred motion simulators that can be used with an exoskeleton.

Figure 55:
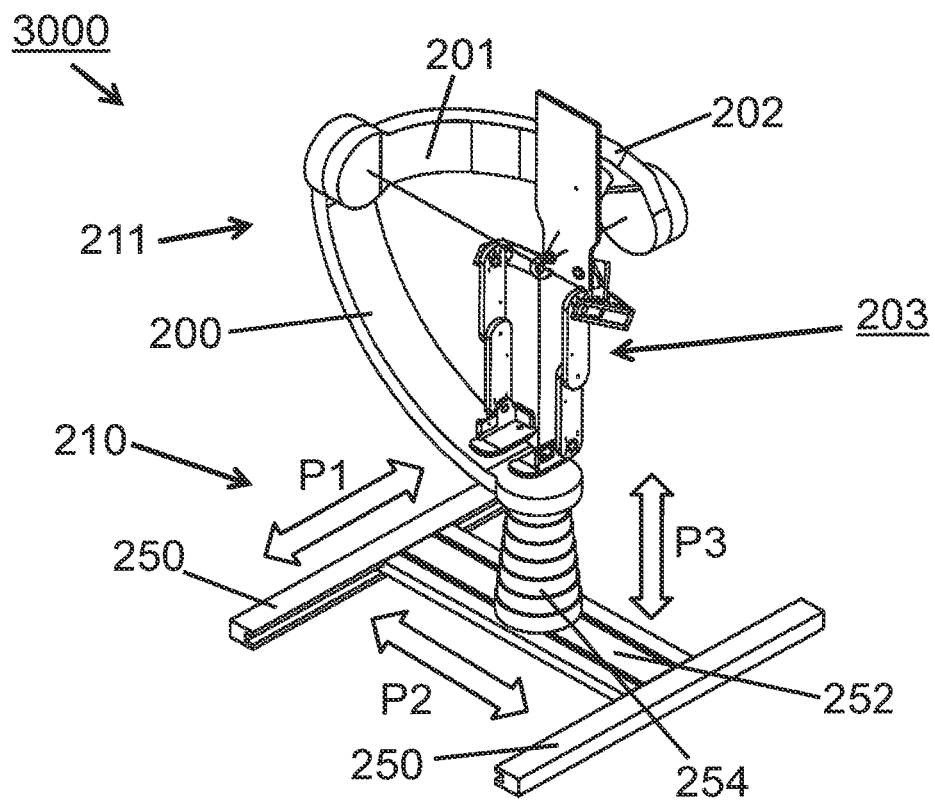
FIGS. 55-58 show different representations of the motion simulator 3000

FIG. 55 shows in a perspective view of a motion simulator 3000 to which an exoskeleton 203 with back mounting is attached. The Motion Simulator 3000 essentially consists of two main parts, namely
- a translation unit 210 with actuators 250, 252, 254 as well as suitable drive means, such as motors, shafts, ropes, etc., which are not shown here. This enables translational movements along the arrows P1, P2 and P3.
- a rotary unit 211 comprising a first rotary member 200, a second rotary member 201 and a third rotary member 202. These are each mounted rotatable relative to neighboring elements.

Figure 56:
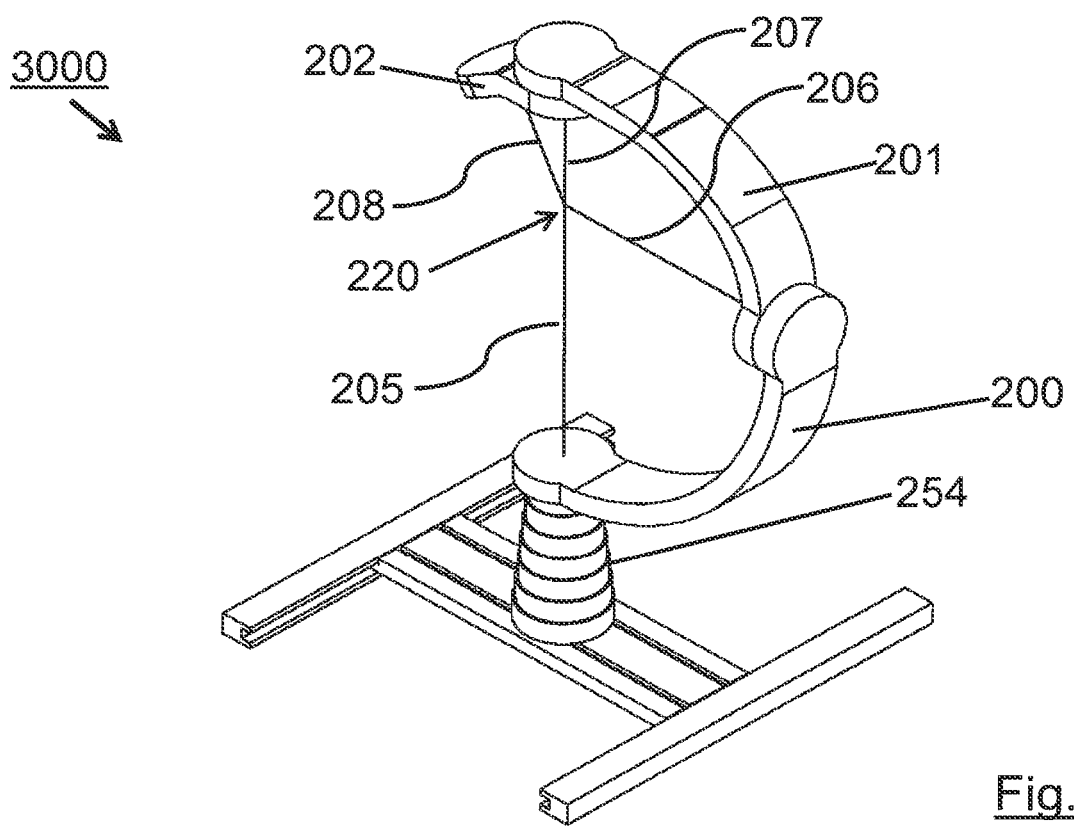

In the following, mainly the rotation unit 211 is described. FIG. 56 is also a perspective representation of the motion simulator 3000 and is used in the following to describe different rotation axes.

The first rotation element 200 is mounted with its first end at the linear actuator 254 rotatably around a first rotation axis 205, which in normal operation is essentially vertical and corresponds to the vertical axis of the linear actuator 254. At the second end of the first rotation element 200, the second rotation element 201 is mounted rotatably around a second rotation axis 206. At the other end of this second rotation element 201, the third rotation element 202 is bearing-mounted around a third rotation axis 207. At the other end of the third rotation element 202, the exoskeleton 203 is mounted rotatably about a fourth rotation axis 208. It should be noted that an appropriate bearing must be provided and arranged for each of the rotary axes mentioned. This is generally known to the expert, so that it will not be discussed further.

Figure 57:
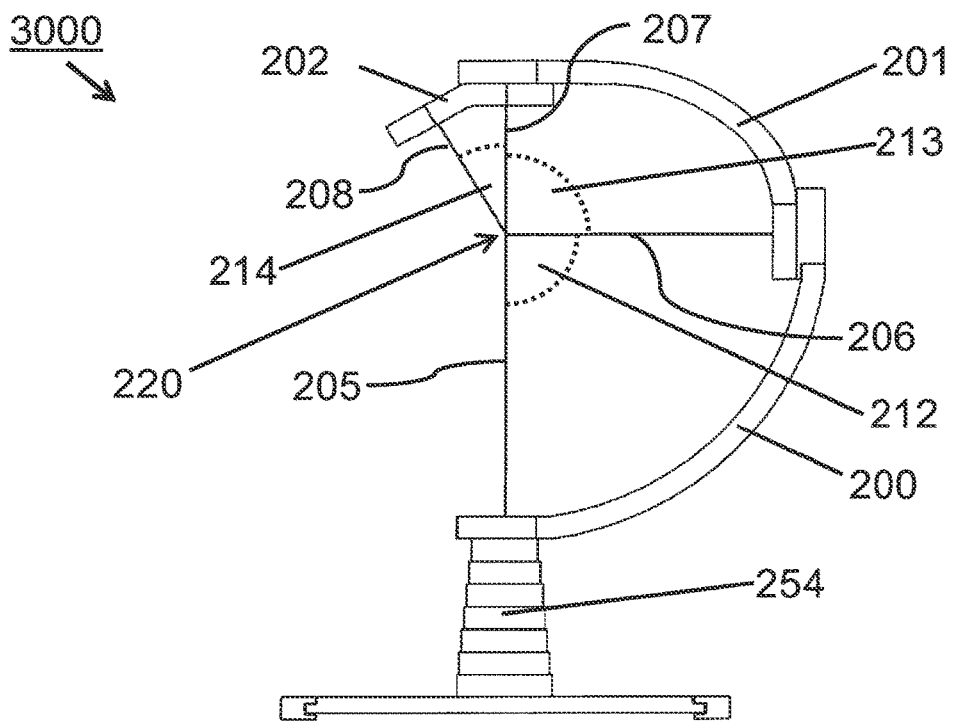

FIG. 57 shows that the rotation axes 205, 206, 207, 208 intersect at a point 220 and which angles are formed between the individual elements or axes, namely:
- the rotation axes 205 and 206 form an element angle 212
- the rotation axes 206 and 207 form an element angle 213
- the rotation axes 207 and 208 form an element angle 214.

The sum of the element angles must be greater than 180° to avoid a gimbal lock and to allow the user in the exoskeleton to assume all possible spatial orientations. In the figures, the rotation elements 200, 201, 202 are each equipped with only 2 axle bearings or axle mounting points (and not with two opposite ones on each side of the user). In particular, the first rotary element 200 and the second rotary element 201, counted from the attachment to the translation unit 210, can, however, also have 2 axle attachment points or axle bearings if they should be added mirror-symmetrically. However, it is advantageous not to supplement the second rotation element 201 in such a way and instead always to orient it in such a way that the legs of the exoskeleton are preferably oriented away from it. The second rotary element 201 is oval shaped to save weight and space. This, however, limits the size of the next rotation element 202 so that it can no longer be designed as a full or semicircle, otherwise the user inevitably has to collide with it.

According to the invention, the third rotation element 202 is designed as a simple, short and small arc or bracket, so it has only two fixing points for axles and axle bearings. In order to achieve the smoothest possible motion behavior in areas where the rotation unit 211 with only 3 axes would experience a gimbal lock, the angle of the third rotation element 202 is selected as large as possible.

In general, the exoskeleton 203 can then no longer rotate 360° around the axis 208 without colliding with the third rotation element 202 or colliding when the user adopts certain postures. However, these collisions must and can be prevented. In general, it is not necessary to actuate the 208 axis by 360°. (For smaller element angles 213, however, 360° actuation is possible. Then, however, the mentioned problems with high speeds and accelerations occur again increasingly.)

Figure 58:
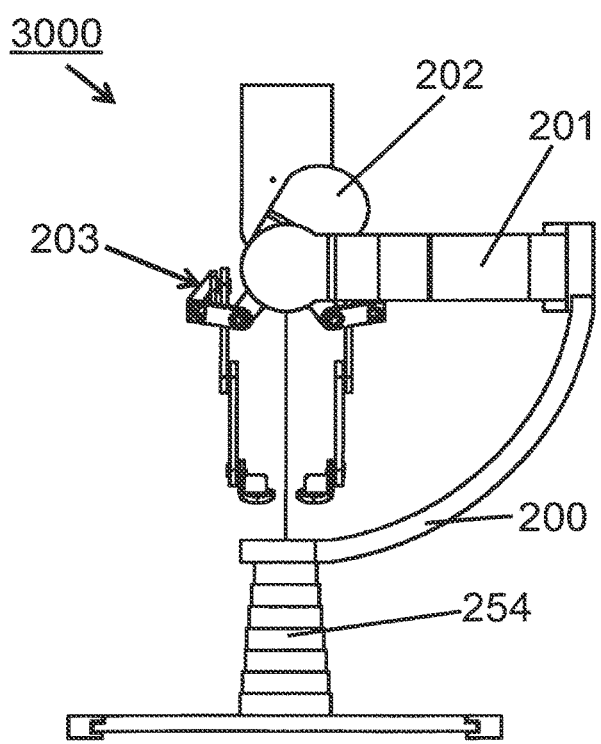
Figure 59:
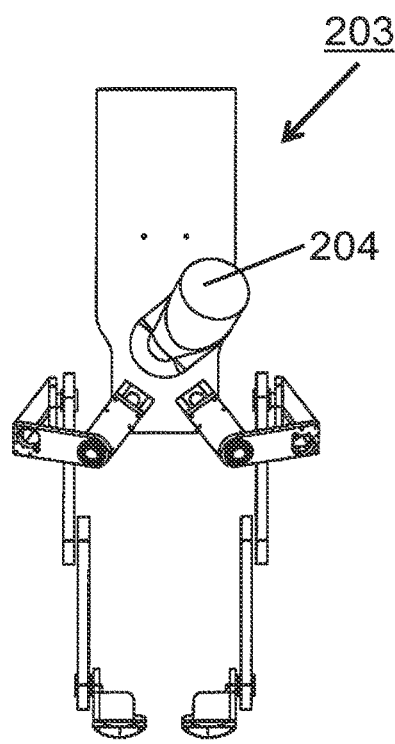
FIG. 59 shows the exoskeleton 203 with back mount

As can be seen in FIG. 58, the third rotation element 202 is preferably attached to exoskeleton 203 in such a way that it sits quite high overall, and the part which is attached to the second rotation element 201 sits at the bottom relative to the attachment point on the exoskeleton (in neutral position of the rotation unit, as shown in the figures). However, other types of mounting are possible. The figures also show that the third rotation element 202 is preferably mounted at an angle to the exoskeleton 203. This is achieved by a back mount 204, which can be described by two angles analogous to the axis 93 of the second element 82 of the hip (FIG. 2). It is important that the element axis 208 runs through the common intersection point of all element axes 205, 206, 207, 208. This lies preferably in the body of the user, e.g. in his head, or in his torso. Preferably a starting angle is chosen for the third rotation element 202 in the normal position and then a suitable back mount 204 is designed. This mount 204 then forms a rigid unit with the back plate (or hip plate, etc.) of the exoskeleton 203. In the example setup, element 202 is inclined by 30° from the vertical. This angle may also be different if element 202 does not collide with the back plate or other parts of the exoskeleton 203. The actuation angle of axis 208 must then be restricted to an area that is so small or smaller that the third rotation element 202 can never collide with the back plate. It is usually sufficient to select this range significantly smaller than the maximum if the effective remaining sum of the joint angles exceeds 180°. All other axes 205, 206 and 207 can be actuated over full 360°.

In the preferred design example, the element angles have the following values:

Angle 212=90°; angle 213=90°; angle 214=30° (see FIG. 57).

The control is done with methods of inverse kinematics with boundary conditions. Axis 208 is preferably controlled so that in the preferred execution example it is never deflected more than +/−35° with respect to the back plate of the exoskeleton (in the illustrations, this is 30°). This angle is used to control the mechanism so that the user with his arms is kept away from the second rotation element 201). Soft or hard restraints or potentials can be used for this purpose. The control method is, for example, to first take a target orientation, e.g. the spatial position of an avatar, or a corresponding target value from a motion cueing process. In the computer, in a dynamic simulation of a model of the motion simulator or parts thereof, the given target position of the user in the exoskeleton is applied as boundary condition or restrain to the exoskeleton or end effector of the motion simulator. Then the simulated movement simulator reacts in such a way that "automatically" the correct joint angles are adopted in order to achieve the required orientation. These joint angles can then be used as target angles for the real motion simulator. Of course, this procedure can also be simplified and accelerated mathematically by using precise mathematical models rather than numerical simulations. An advantage of this design is that the third rotation element 202 can be located very close to the exoskeleton. This makes it small, stiff, light and close to the center of rotation. It is therefore easy and quick to actuate. It can have a very large element angle, which would require a much larger and heavier element further out. Collisions can be prevented by actuating the 208 axis in an angle range smaller than 360°. Previously, the need to avoid collisions motivated the use of larger elements. Despite the limited angular range of the 208 axis, the mechanism covers the space of all rotations so well that fluid movements with only low speeds and accelerations of all 205-208 rotary elements are possible. A gimbal lock is avoided and the system always behaves "good-natured". The use of the described light element close to the user has further advantages with regard to the speed of the gimbal suspension. By the use of 4 axes and 3 elements, or more, for each or almost every orientation of the user in space, there are infinitely many, densely adjoining, actuation angles of the gimbal suspension to produce this orientation of the user. Should a new spatial position/orientation of the user be adopted quickly, generally all elements of the rotation unit must react quickly. However, this is particularly difficult with the outer elements, because they are usually large and heavy themselves and have large moments of inertia, on the one hand, and on the other hand, the entire inner structure of the motion simulator acts on them. If the inertia (approximated or precise) of the individual elements is also taken into account in the kinematic control of the rotation unit described above, it can be seen that soft acceleration behaviour occurs for the larger elements even with rapid changes in orientation and sudden reversal of the angular velocities. They can run out slowly, so to speak, and slowly reduce their rotational speed before reversing it. Fast or sudden changes occur almost exclusively in the innermost or second innermost actuator. These are small and can react quickly. This makes it possible to select larger, stiffer outer elements of the rotation unit with possibly weaker motors without slowing down the reaction of the system. Alternatively, faster movements can be performed.

In order to expand this advantage further, additional small elements can be attached to the inner element 202, just as this element 202 is attached to the exoskeleton. These additional elements, too, are generally only actuated over angle ranges smaller than 360°, especially for the desired large element angles. These additional elements, too, are generally only actuated over angle ranges smaller than 360°, especially for the desired large element angles. Thus even faster reactions of the inner elements can lead to the fact that the outer elements may react slower etc. and can be laid out accordingly.

Alternatively, it is possible to design only a gimbal suspension with 4 axes of 3 elements or more, so that individual element angles can be arbitrary, but the sum is above 180°, but preferably below 270°. This allows the resulting mechanism to avoid a gimbal lock. This allows the resulting mechanism to avoid a gimbal lock. The element angles are then generally smaller than 90°, the choice of previous motion simulators. The smaller the angle sum, the faster the joints have to be actuated and accelerated, but the construction becomes lighter and less inert. If only a limited orientation space is required, the sum of angles can be less than 180°.

Also with only 2 elements and 3 axes of the gimbal suspension it is possible to avoid a gimbal lock and still be able to take almost any orientation in space without high velocities during the actuation of the elements need to occur. For this, the sum of the element angles must first be greater than 180°. If both element angles are equal, there is only one position, with folded elements, where the axes are parallel, and degrees of freedom are lost. The larger the sum of the angles, the better-natured the speed and acceleration behaviour in the orientation space. All axes can still lie in one plane, but there are alternative joint angles which describe the same spatial position/orientation of the user and where the axes do not lie in one plane. This design saves actuators, weight and costs compared to designs with 4 axes.

The axis bearing of the elements shown here are very short and flat. However, they can also be long and thus e.g. resemble cylinders and thus bridge distances between the elements or from one element to the exoskeleton.

The described types of gimbal suspension can also find use for any other application.

The previously described exoskeletons can be further improved by a special design of the feet 90. Exoskeletons—and also humanoid robots—usually require two degrees of freedom of the foot in order to come close to human mobility. This requires corresponding effort during actuation, which in turn requires corresponding space and weight.

Figure 60:
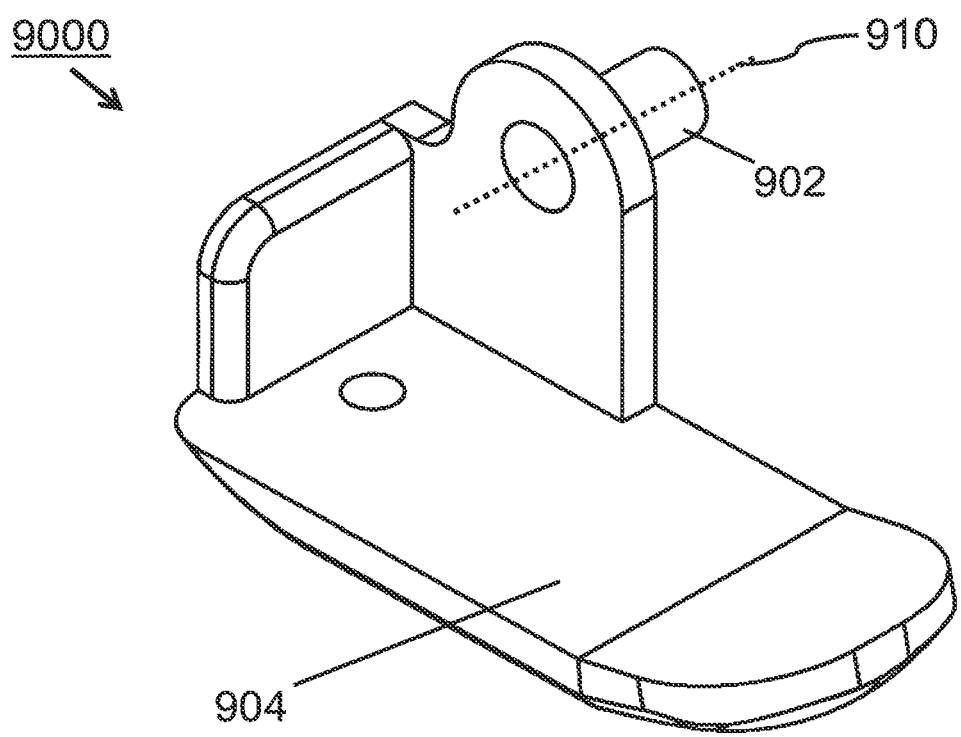
FIGS. 60-63 show different representations of the foot 9000

FIG. 60 shows a preferred design example for an Exo foot 9000 according to the invention. This foot 9000 has an axis 910 which is approximately parallel to the transverse axis of the user's ankle joint. Parallel to this axis, preferably a shaft 902 is used to attach the foot to an actuator. Alternatively this shaft 902 is part of the actuator.

Figure 61:
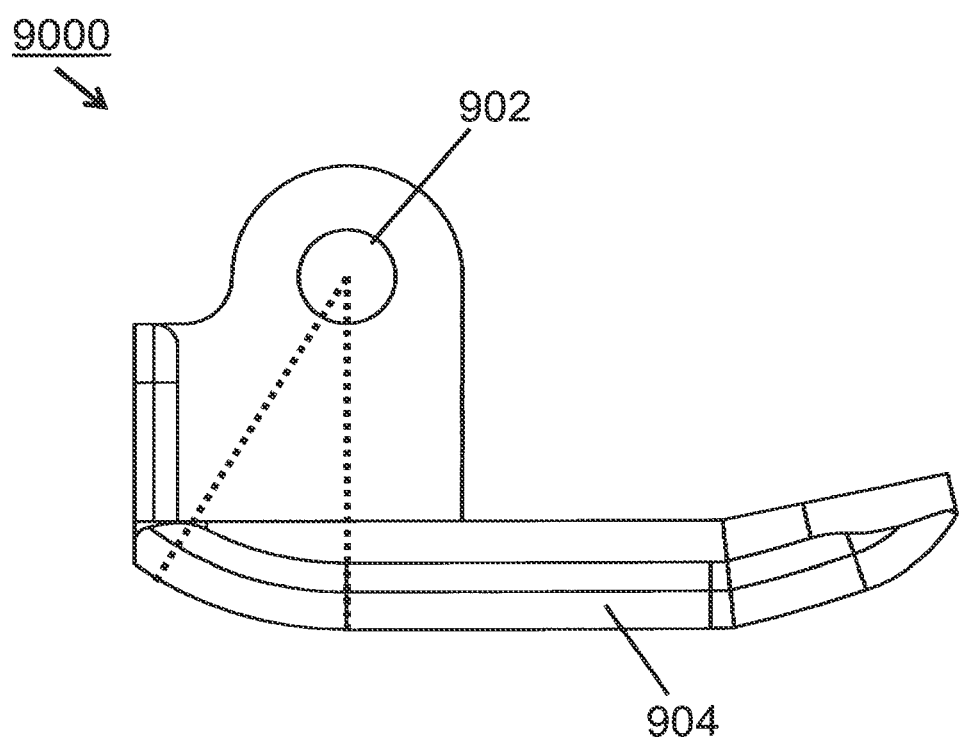

Supination and pronation of the foot can therefore not be actuated. In order to allow movement of a similar kind, although not actuated, the sole 904 of the foot 9000 is rounded off laterally, as shown in FIG. 61.

Figure 62:
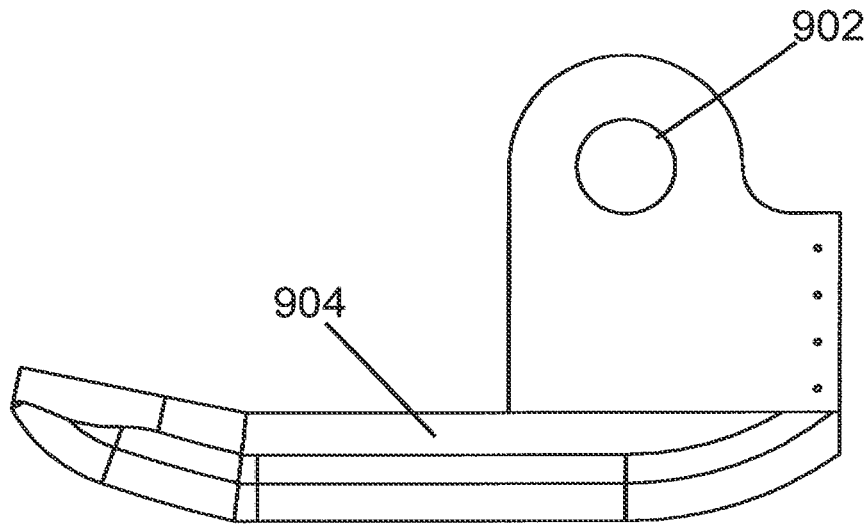
Figure 63:
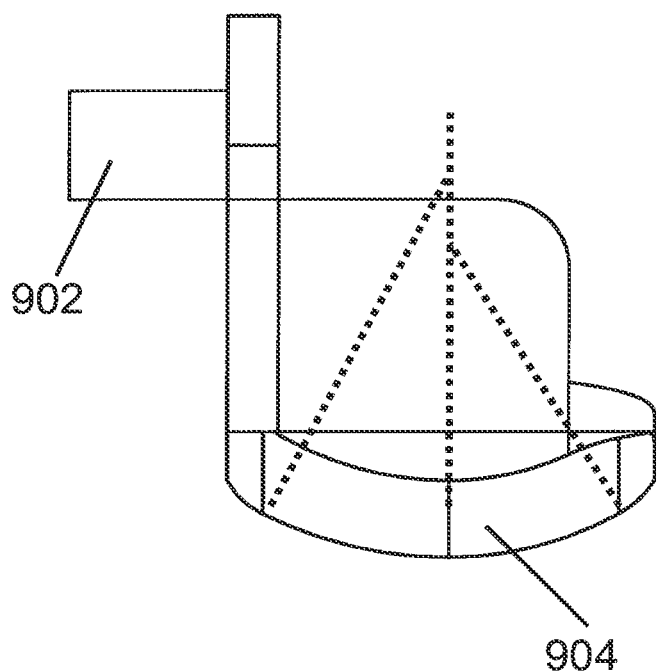

This is preferably done on the basis of a profile of two circular segments with different radii of circles or circular-like shapes, which have their centres close to the ankle joint of the user and lie parallel to the frontal plane of the user (FIG. 63). Smaller circle diameters facilitate unrolling, larger diameters allow a safer stand. It is preferable to facilitate pronation, i.e. to choose 9000 smaller radii on the inside of the foot. The profile is swept forward along the length of the foot, parallel to the sagittal axis, to define the surface of the sole in the middle of the foot 9000 (FIG. 62, 63). To define the heel area of the Exo foot 9000 the profile is rotated backwards around the axis of the ankle. In the middle part of the foot 9000, approximately forward from the ankle joint to the first toe joint, the surface of the sole 904 then forms the surface segment of a cylinder or a cylinder-like geometry on the left and right sides.

In the rear part of the foot 9000, approximately from the ankle to the back, the sole surface on the left and right resembles a surface segment of a ball or torus or the like.

The front part of the exo foot 9000 has the same cross-section at the transition from the middle part of the foot as the middle part. The front part can be flat but is preferably angled upwards to allow rolling. The transition from the central to the front part can also be made in the same way as the transition from the central to the rear part by rotating/sweeping the surface profile around a transverse axis. The distance of the transverse axis to the sole 904 is preferably much greater for the front part than the distance from the sole 904 to the ankle joint. This axis is preferably located near the lower leg in order to achieve easy unrolling.

The advantage of the given foot 9000 is that now the foot 9000 of the exoskeleton (also robot or virtual avatar or virtual machine) acts like a rolling bearing. When a step is taken and the foot 9000 with the rounded heel area touches the ground, the foot 9000 rolls on the heel surface until the middle foot area touches the ground. Until this time, the distance from ankle to floor is kept practically constant, unless foot 9000 should roll strongly from left to right at the same time. Even then, the change in distance would be slow and gradual. This practically constant distance when rolling also means that by rolling the foot 9000 a firm base is created, the ankle joint, which does not change its height and therefore does not work on the upper part of the body when the user walks at constant speed (otherwise braking or acceleration forces act in or against the direction of movement). The rolling is therefore perceived as very fluid and soft, even if the sole 904 of the foot 9000 is actually made of hard material.

If the front part of the foot is shaped in the same way as the rear part, but with a larger radius when rolling forward than the heel, the same effect occurs and the foot does not do any work on large parts of the body. However, the natural movement of the knee and ankle requires a larger radius. It is also possible to select a fixed ankle position where the center of this radius lies in the knee joint. This allows extremely soft rolling even without a movable ankle. The tangential transition of the profile radii allows rolling to the left and right at any time.

The middle part of the foot 9000 is straight seen from the side. This allows a stable standing and the user has a wide range over which he can shift his center of gravity without becoming unstable. This flat area can be reduced or increased by moving the rotation axes of the profile forwards and backwards to influence maneuverability. The transitional area to the front area of the foot 9000 can also be moved forwards and backwards.

At the side there is no such straight area with the shown Exo foot 9000. However, it can be added. Then the centres of the circle segments in FIG. 63 would not lie on top of each other, but would be offset to the left and right. At the bottom, the sole would then have a straight section, which preferably merges tangentially into the circle segments.

The outer edges of the foot 9000 are preferably rounded with small radii to allow extreme postures and prevent injuries. The sole 904 is preferably covered with rubber etc. and/or made of this material. This improves traction and shock absorption when walking. In particular, lateral rolling is also inhibited by an elastic, damping material, which can be helpful in a cross profile without a straight section to reduce the effort required to maintain balance when standing on one foot. It is possible to use this type of foot in exoskeletons, humanoid robots, virtual avatars or virtual machines.

Stewart platforms, also known as hexapods, are also suitable as motion platforms for exoskeletons in teleoperative (virtual or real governor) systems. Stewart platforms generally have six linear actuators or similar means attached to the floor or other base on one side and to a work platform or working plane on the other.

Figure 64:
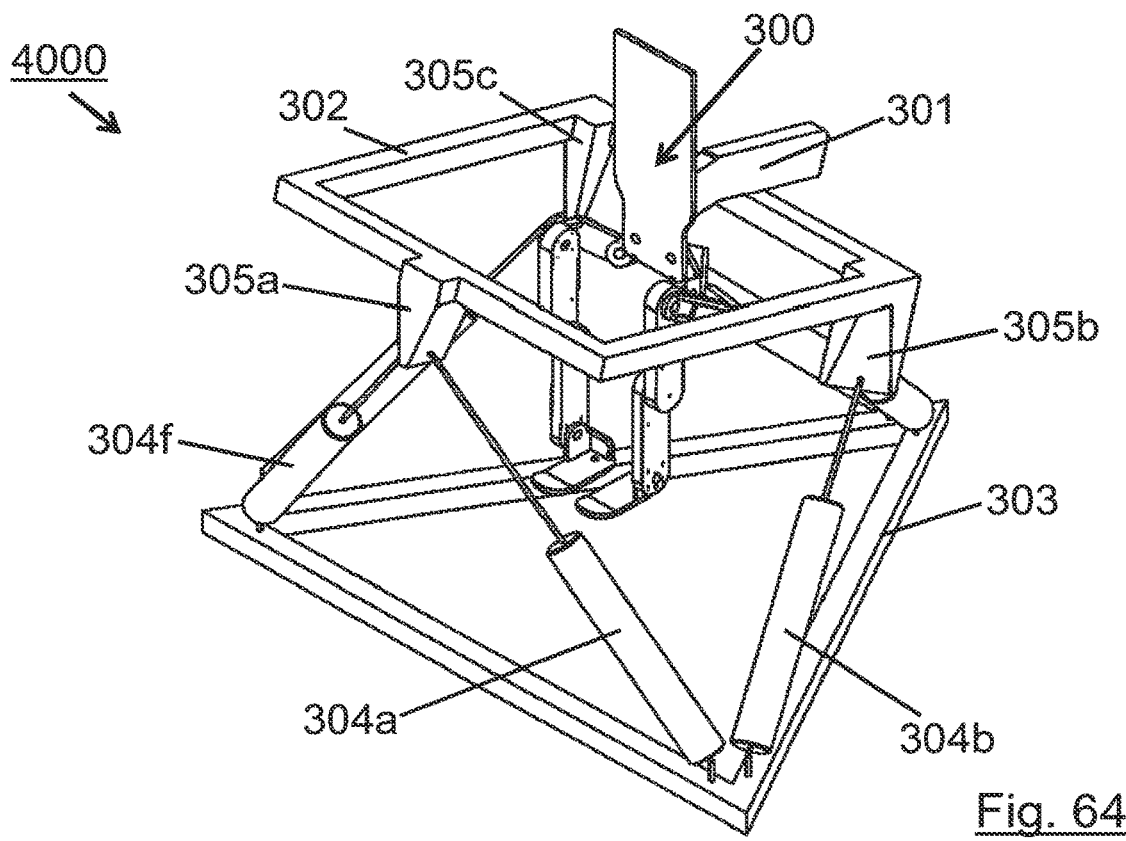
FIG. 64, 65 show different representations of the Stewart platform 4000
Figure 65:
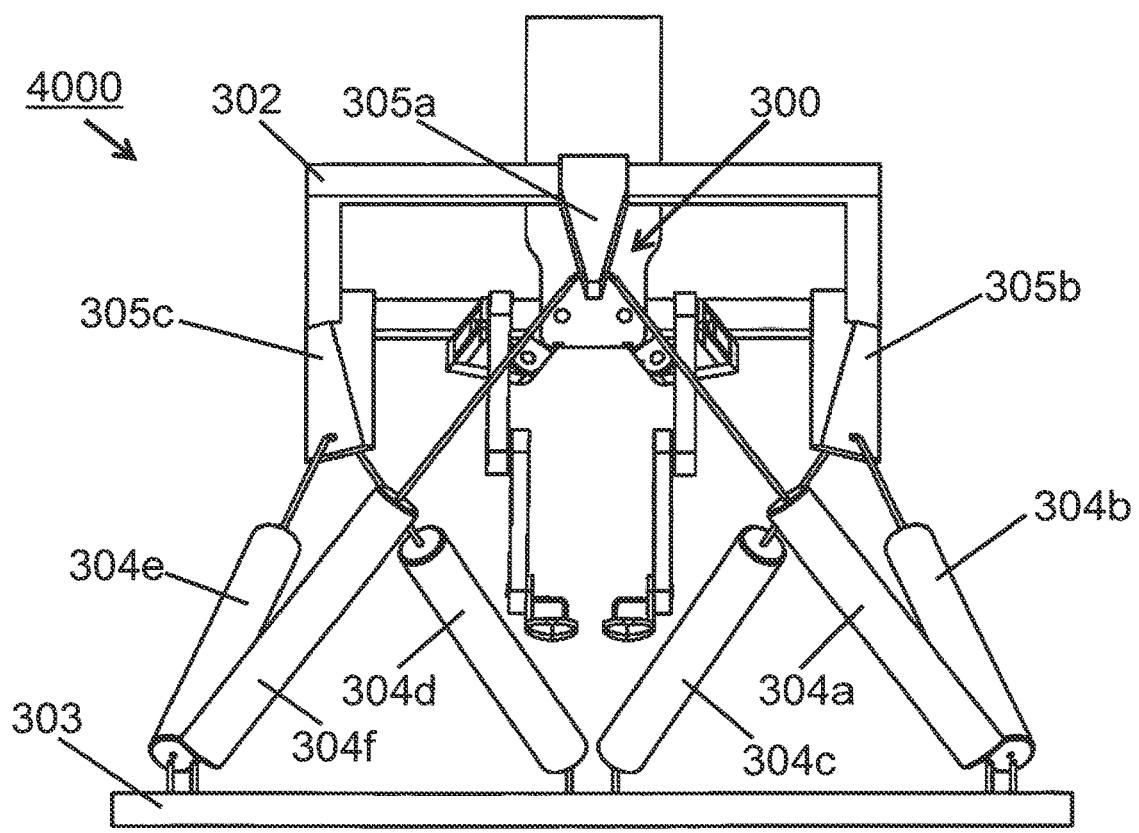

FIGS. 64 and 65 show an example 4000 of a Stewart platform according to the invention. FIG. 64 shows a perspective view and FIG. 5 shows a front view of the Stewart platform 4000.

The Stewart 4000 platform has a fixed frame 303, also known as the base. To this, a movable frame 302 is installed over a large number of actuators 304*a*-304*f*, which are preferably designed as linear actuators. An exoskeleton 300 is attached to this by means of a mounting element 301. For the Stewart platform 4000 the working platform is formed by the movable frame 302. The exoskeleton 300 is positioned in the frame 302 by means of the mounting element 301 in such a way that the user is centered between the mounting points of the actuators 304*a*-304*f* at the frame. The actuators 304*a*-304*f* are fixed to the movable frame 302 and to the fixed base 303 or to the floor or floor supports. The usual basic arrangement for Stewart platforms with fixing points offset from each other, as shown in FIG. 64, 65, is used. To make it easier to swing the legs and arms forwards without colliding with components of the body, it is advantageous to displace the exoskeleton 300 slightly backwards. It is also advantageous if the frame 302, with the user upright, is slightly tilted backwards, as the user generally tends never to walk completely upright, thus increasing the maximum forward tilting angles. The movable platform according to the invention is equipped with long supports 305a, 305b and 305c. These supports 305a, 305b, 305c are essential to maximize the working space of the motion simulator. They raise the frame, relative to the user, and thus reduce potential for the user to collide with the frame. They also allow the working platform, or the supports themselves, to sink very low between the actuators and still tilt, swivel, and accelerate linearly without colliding with the 304a-304f actuators. This is further facilitated by the fact that the distance between the 304a-304f actuators at base 303 and their minimum length is so large that the 304a-304f actuators are not yet fully retracted even if the above and lower attachment points are practically in a plane parallel to the floor. This means that translation and rotation can still be actuated even when the working platform is in a low position. In order to enlarge the rotary working space of the motion simulator even further, according to the invention it is provided that the exoskeleton 300 can also be rotated relative to the working platform 302 via additional rotation actuators. For example, the fastening element 301 can be designed so that it can be rotated about its longitudinal axis or its transverse axes or a combination of these. A rotation unit can also be provided directly on the exoskeleton 300. In general, a gimbal suspension or a serial robot arm can also be connected to the movable platform.

It is particularly advantageous to choose the first, preferably circular element of a gimbal suspension as frame 302. Then further elements of this suspension can preferably be mounted inside this first element. Then the actuators of the Stewart platform 4000 can be driven in such a way that they produce rotations and/or translations, or also, for example, only translations. In the latter case, the Stewart platform is used as a pure translation unit, while the gimbal suspension acts as a pure rotation unit. For the latter, the above-mentioned features according to the invention can again be adopted. A Stewart platform as a translation unit has the advantage of being very stiff and strong because it is a parallel mechanism. However, the Stewart platform can also generate rotations in addition to or in addition to the held gimbal suspension. Rotation units on the movable platform 302 can have any axis arrangement.

It can be advantageous to design the movable platform as a frame, which places the cross connections between the fixing points very high. This may for example resemble a hemisphere in strut construction, or a dome, but with long struts 305 to the attachment points with actuators 304. The cross struts can also be guided diagonally upwards between the mounting points and thus no longer lie in one plane, as in the illustrations. The base 303 is given in FIG. 64, 65 as a frame. However, this frame can also be omitted and the actuators can be fixed to the floor. The fixing points can also stand on columns. The platform can then be kept very low without the user running the risk of colliding with the floor. Then the working area of the motion simulator is enlarged, but the space requirement is increased.

Necessary joints for fixing the actuators to the platform and the base are missing in FIGS. 64, 65 and are preferably designed as Cardan shafts (U-joints).

The mounting element 301 is only indicated in the illustrations. It is preferably located behind the exoskeleton 300, but can be much stronger than in the illustrations. In particular, it can be connected to the working platform at several points, strutted, or even be part of the platform itself.

It is preferred to use telescopic linear actuators with more than 2 coaxial elements (in figures one fixed and one movable element=2 elements). These have a greater difference between maximum and minimum length. Therefore they allow a much larger working range. For example, telescopic ball screws or hydraulic cylinders can be used. Particularly when the working platform lies low or is angled steeply, this offers considerable advantages.

It may be useful to measure at the back of the exoskeleton 300, or at other points of the mechanism, the gravitational force held and/or other forces and torques. This makes it easier to control the exoskeleton 300 in teleoperative applications.

The advantages of the described motion simulator lie in its ability to hold the user in such a way, for example in its middle, that an enlarged usable working area can be used. The user can easily be rotated around points inside or near him without the need for particularly long actuator travel.

By using the supports on the movable working platform (or similar movable structures), translation can still be generated even with simple linear actuators in deep or far tilted/rotated spatial positions. The tilting range, swivelling range, turning range etc., i.e. the space of possible orientations is enlarged. These ranges are extended by using one or more additional rotation axes to pivot the exoskeleton 300. If the Stewart platform is designed to contain a gimbal suspension, arbitrary space positions can be assumed and classic boundaries of Stewart platforms are overcome. Then the Stewart platform serves as a very stiff and strong translation unit, but can also represent rotations.

The described motion simulators, with Stewart platform or translation unit and gimbal suspension, without exoskeleton, can also be combined with other input and output units for computers. Instead of the exoskeleton, an aircraft, helicopter or vehicle cockpit can be mounted to control virtual or real means of transport and to gain an improved impression of the forces acting on them in remote control or simulation applications.

The innovations described here can be combined in a variety of ways to achieve beneficial new properties in systems of teleoperation, robotics, motion simulation and actuation.

Any one of the devices or processes described, any combination of devices or processes or a combination of all devices or processes can be realized.

In the following some advantageous combinations are mentioned.

The described foot elements (FIGS. 60-63 and description) for humanoid robots, virtual or real machines and exoskeletons unfold their full advantages especially with exoskeletons, robots or virtual machines, which have a hip joint according to FIGS. 1-26 and above description. This hip joint allows better control of the legs and feet, even in critical situations, and can therefore derive maximum benefit from the additional degrees of freedom of the foot elements.

The described exoskeletons (also in combination with the described feet) can be combined with the described motion platforms and their variations.

The described actuators can be used in exoskeletons, remote-controlled humanoid robots and motion simulators in order to achieve larger actuating angle ranges, larger torques, lower energy consumption, smaller weight, back drivability, etc. in a small space. The exoskeletons, remote-controlled humanoid robots and motion simulators thus acquire properties that could not or only with difficulty be achieved with other actuators. In particular, the hip structure of the exoskeletons and humanoid robots described benefits from the actuators described, as the third axis in particular has to be able to perform a great deal of work and at the same time has to have a very large range of actuating angles so that the natural working range of the user is not significantly restricted. The same applies to the fourth axis 96 of the knee, although not to the same extent.

The described gimbal suspensions as motion simulator, their elements or parts thereof can be combined with the described exoskeletons, with improved hip joint, and the Stewart platform. This allows to take advantage of the improved mobility and strength of the exoskeleton, which would otherwise be constrained by limited movement simulators. For example, fast jumping, running, running, trampoline jumping, etc. are made possible by the exoskeletons described, but a suitable motion simulator is also needed to fully exploit this potential, which the motion simulators described provide.

The same applies to methods and devices for reducing or increasing the perceived force of gravity. They benefit from the described hip joints, foot elements and motion simulators, alone or in any combination. The methods and devices for reducing or increasing the perceived gravity allow, for example, the use of lighter exoskeletons when forces are reduced. However, in order to be able to perform the faster movements and position changes that are then possible, faster and better motion simulators, as described, are needed or at least helpful. If forces are increased, it is particularly important that every degree of freedom of the foot is actuated.

Fully actuated hip joints with 3 effective degrees of freedom and fully actuated feet, as described, allow heavier loads to be carried by freely moving exoskeletons that a user controls directly. If, instead, such robots are operated tele-operatively by a remote user in an exoskeleton on a motion simulator, this user benefits from the possibilities of gravity reduction described above, and by using the described foot. This also applies to virtual applications. The application of the described hips in exoskeleton and robot further improves the applicability.

The Stewart platforms described can be combined with the gimbal suspensions described. The actuators of the Stewart platform then directly or indirectly carry a gimbal suspension. The described innermost element 202, or several of them one behind the other, can also be used to mount an exoskeleton (if necessary with a mount such as 204) indirectly or directly to the mobile working platform of a Stewart platform in order to enlarge the rotational working space of the motion simulator.

It can be provided that an exoskeleton can be quickly detached from the movement platform at the back. This exoskeleton can then be used immediately as a mobile exoskeleton for force enhancement or as a humanoid robot. It is then advantageous to equip this exoskeleton with the described foot to allow easy rolling and better control etc. Then this exoskeleton or robot etc. can also have devices for gravity reduction or magnification.

When used as a "walking wheelchair", exoskeletons benefit from any combination of hip joint, the described foot, and the devices and procedures of gravity compensation or gravity magnification. They allow handicapped, weak or paralyzed people to move more naturally without having to carry their full weight with their legs. Likewise, the perceived weight can be gradually increased to achieve muscle growth or adaptation. For astronauts, an impression of gravity can also be achieved, which otherwise would not exist, but here can serve to reduce muscle breakdown.

Each of the described innovations, including the combinations described above, each combination of innovations or a combination of all innovations can be realized.

REFERENCE CHARACTER LIST

80*a* element 1, first element, exo hip or exo back plate
80*b* axle mounting region (mounting element) of 80*a*
81 shaft of axis 1
82 exo hip joint 1, element 2, second element
82*b* exo hip joint 1*b*, element 2*b*
82*c* exo hip joint 1*c*, element 2*c*
83 shaft of axis 2
84 exo hip joint 2, element 3, third element
85 shaft of axis 3
86 element 4, fourth element, exo thigh
87 shaft of axis 4
88 element 5, fifth element, exo-lower leg
89 shaft of axis 5
90 element 5, sixth element, exo-foot
91 centre of the hip joint
92 axis parallel to the sagittal axis through the center of the hip joint
93 axis 1, first axis
94 axis 2, second axis
94*b* axis 2*b*
94*b* axis 2*c*
95 axis 3, third axis
96 4th axis 4th axis
97 Axis 5, fifth axis
101 driven shaft/driven axle
102 deflection shank, idler shank
103 fixed shaft/fixed axle
104*a* bearing, front, driven axle
104*b* bearing, rear, driven axle
104*c* bearing, central, driven axis
105*a* bearing, front, free running axle
105*b* bearing, rear, free running axle
106*a* front base plate
106*b* rear base plate
107 base frame
108 driven, front sprocket
109 free-running front sprocket
110 front chain
111 driven, rear sprocket
112 free running, rear chain wheel
113 rear chain
114 ball screw
115 ball screw bearing A
116 ball screw bearing B
117 spindle nut, ball nut, nut
118 connecting block
118*b* connecting block with abutment for spring element
119 linear guide rail, rail
120 linear guide carriage
121 linear guide support
121*b* linear Guide Support combined with Base
122 shaft coupling
123 motor frame
124 motor
125*a* bearing, front, for free-running sprocket
125*b* bearing, rear, for free-running chain sprocket
126 spacers
127 spring element
128 chain-spring connection element 129 bearing for free-running sprocket
130 bearings for axles
200 element A, first rotation element
201 element B, second rotation element
202 element C, third rotation element
203 exoskeleton with back mount
204 back mount
205 axis A, first axis of rotation
206 axis B, second rotation axis
207 C axis, third axis of rotation
208 D axis, fourth rotation axis
210 translation unit
211 rotation unit
212 element angle A
213 element angle B
214 element angle C
220 intersection of 205-208
250 first linear actuator
252 second linear actuator
254 third linear actuator
300 exoskeleton
301 mounting element
302 movable frame/working platform
303 fixed frame/base
304 actuators
304a-f linear actuators
305 supports
305a-c individual supports
902 shaft
904 sole
910 axis through 902
1000-1003 exoskeleton
2000-2009 actuators
3000 motion simulator
4000 stewart platform
9000 exo foot
X driven component

I claim:

1. A human-machine-interface system comprising an exoskeleton, wherein the exoskeleton comprises an exo-back plate and/or an exo-hip plate as well as an exo-leg, comprising an exo-foot, an exo-lower leg, an exo-thigh element, and an exo-hip joint, wherein the exoskeleton comprises sensors and actuators configured to provide tele-operative force-feedback to a user of the exoskeleton via the exo-leg, wherein the exoskeleton is mounted to and suspended from a motion base of the system configured to carry the exoskeleton, wherein the motion base is further configured to generate and to convey translational and rotatory acceleration to the exoskeleton, wherein the exoskeleton comprises a carrying apparatus for the user of the exoskeleton, said carrying apparatus being configured to connect a torso, a hip and/or thighs of the user to the exo-back or the exo-hip plate, such that a user's weight acting on the exo-leg is reduced and an energy and power demand of the actuators for moving the exo-leg is reduced as well.

2. The system according to claim 1, wherein the carrying apparatus is configured such that it carries the complete body weight of the user in arbitrary load bearing directions while the hip of the user remains fixed with respect to the exo-back or the exo-hip plate.

3. The system according to claim 1, wherein a sole of the exo-foot is configured to be translated and actuated automatically, such that a length of the exo-leg is adjusted to an effective length of the user's leg, such that errors or changes in the position of the user relative to the exo-hip plate and/or the exo-back plate may be accounted for.

4. The system according to claim 3, wherein the length of the exo-leg is measured and automatically controlled.

5. The system according to claim 1, wherein the exoskeleton is attached to the motion base such that the exo-foot is not touching the ground.

6. The system according to claim 1, wherein the carrying apparatus comprises control members that are configured to relax or move the carrying apparatus.

7. The system according to claim 6, wherein the control members are further configured to be adjustable, such that a weight of the user acting on the exo-leg is controllable.

8. The system according to claim 6, wherein the control members comprise scale elements.

9. The system according to claim 1, wherein the carrying apparatus comprises a belt, particularly a six- or five-point belt, a strap, a shell, or a harness that are configured to firmly connect the torso, the hip, or the thighs of the user to the exo-back or the exo-hip plate.

10. The system according to claim 1, wherein exo-hip joint is an anthropomorphic exo-hip joint.

11. The system according to claim 10, wherein the anthropomorphic exo-hip joint is formed by a device (1000) including a first member (80a, 80b), a second member (82), a third member (84), and a fourth member (86), wherein
    the first member (80a, 80b) is connected to a first rotary joint (81) via which the second member (82) is rotatably supported about a first axis (93),
    the second member (82) is connected to a second rotary joint (83) via which the third member (84) is rotatably supported about a second axis (94),
    the third member (84) is connected to a third rotary joint (85) via which the fourth member (86) is rotatably supported about a third axis (95),
    the axes (93, 94, 95) pass substantially through a common point (91) and
    the first axis (93) with the second axis (94) forms a first angle ($\varphi 1$) and the second axis (94) with the third axis (95) forms a second angle ($\varphi 2$).

12. The system according to claim 11, characterized in that the first axis (93) is substantially perpendicular to the main plane of the first element (80a, 80b).

13. The system according to claim 11, characterized in that the first axis (93) is rotated about a vertical axis passing through the common point (91) by a third angle ($\alpha$) with a value unequal to zero.

14. The system according to claim 11, characterized in that the first axis (93) is rotated about a horizontal axis passing through the common point (91) by a fourth angle ($\beta$) with a value unequal to zero.

15. The system according to claim 11, characterized in that the sum of the first angle ($\varphi 1$) and the second angle ($\varphi 2$) is in the range of 85 to 120 degrees and the first angle ($\varphi 1$) is in the range of 15 to 45 degrees.

16. The system according to claim 1, wherein the system is configured to convey scaled forces and torques to the user of the exoskeleton, such that the exoskeleton is not required to be able to carry the whole weight of the user.

17. The system according to claim 1, wherein the exoskeleton is detachable from the motion base at a back of the exoskeleton, such that the exoskeleton may be used immediately as a mobile exoskeleton for force enhancement or as a humanoid robot.

18. A human-machine-interface system comprising an exoskeleton, wherein the exoskeleton comprises an exo-back plate and/or an exo-hip plate as well as an exo-leg, comprising an exo-foot, an exo-lower leg, an exo-thigh element, and an exo-hip joint, wherein the exoskeleton comprises sensors and actuators configured to provide teleoperative force-feedback to a user of the exoskeleton via the exo-leg, wherein the exoskeleton is mounted to and suspended from a motion base of the system configured to generate a motion to carry the exoskeleton, wherein the motion base is further configured to generate and to convey translational and rotatory acceleration to the exoskeleton, wherein the exoskeleton comprises a carrying apparatus for the user of the exoskeleton, said carrying apparatus being configured to connect a torso, a hip and/or thighs of the user to the exo-back or the exo-hip plate, such that a user's weight acting on the exo-leg is increased.

19. The system according to claim 18, wherein the system is configured to convey scaled forces and torques to the user of the exoskeleton.

20. The system according to claim 18, wherein the exoskeleton is detachable from the motion base at a back of the exoskeleton, such that the exoskeleton may be used immediately as a mobile exoskeleton for force enhancement or as a humanoid robot.

* * * * *